(12) United States Patent
Tritt et al.

(10) Patent No.: US 12,151,471 B2
(45) Date of Patent: Nov. 26, 2024

(54) MAINTAINED TARGET PRESSURE CIRCULATION SYSTEM FOR END EFFECTOR

(71) Applicant: ARTMATR, INC., Hod Hasharon (IL)

(72) Inventors: Benjamin Tritt, New York, NY (US); Jeff Leonard, New York, NY (US); Tal Achituv, Needham, MA (US); Owen Elias Trueblood, Brooklyn, NY (US); Bryce Peterson, South Orange, NJ (US); Yaakov Markovich, Rehovot (IL); Sang-won Leigh, New York, NY (US)

(73) Assignee: ARTMATR, INC., Hod Hasharon (IL)

( * ) Notice: Subject to any disclaimer, the term of this patent is extended or adjusted under 35 U.S.C. 154(b) by 0 days.

(21) Appl. No.: 17/190,384

(22) Filed: Mar. 2, 2021

(65) Prior Publication Data
US 2021/0187943 A1  Jun. 24, 2021

Related U.S. Application Data

(63) Continuation of application No. 16/188,252, filed on Nov. 12, 2018, now abandoned.
(Continued)

(51) Int. Cl.
*B05B 13/00*  (2006.01)
*B05B 13/04*  (2006.01)
(Continued)

(52) U.S. Cl.
CPC ......... *B41J 2/04505* (2013.01); *B05B 13/005* (2013.01); *B05B 13/0431* (2013.01);
(Continued)

(58) Field of Classification Search
None
See application file for complete search history.

(56) References Cited

U.S. PATENT DOCUMENTS

| 5,138,904 A * | 8/1992 | Lande | B05B 13/0431 74/661 |
| 2002/0001024 A1 * | 1/2002 | Wouters | B41J 2/18 347/89 |

(Continued)

FOREIGN PATENT DOCUMENTS

WO   2016071173 A1   5/2016

OTHER PUBLICATIONS

"Pausing Printing", retrieved from https://files.rolanddga.com/Files/VersaWorks_6/topic/tPausingPrinting.html on Nov. 18, 2018.
(Continued)

*Primary Examiner* — Binu Thomas
(74) *Attorney, Agent, or Firm* — Bochner PLLC; Andrew Bochner

(57) ABSTRACT

Apparatus and method for a painting machine are provided. The painting machine may include an end effector controlled by custom software. The painting machine may include a self-contained medium circulation system. The custom control software may be capable of coordinated n-axis manipulation of an end. Illustrative end effectors may include an inkjet head, brush, air brush or any suitable tool for applying ink, paint, color and/or texture to a surface. For example an end effector may utilize oil-based ink or ultraviolet-cured ink. Illustrative surfaces may include canvas, paper, brick, glass etc. The custom control software may control manipulation of the end effector based on a variety of electronic inputs. The custom software may manipulate different end
(Continued)

effectors in different ways depending on the input data, type of ink/paint being used, type of surface receiving the ink/paint or any other variable.

10 Claims, 33 Drawing Sheets

Related U.S. Application Data

(60) Provisional application No. 62/584,909, filed on Nov. 12, 2017.

(51) Int. Cl.
```
B05C 11/10      (2006.01)
B25J 9/16       (2006.01)
B25J 13/08      (2006.01)
B25J 15/00      (2006.01)
B41J 2/045      (2006.01)
G05B 15/02      (2006.01)
G05D 7/06       (2006.01)
B25J 19/00      (2006.01)
```
(52) U.S. Cl.
CPC ........... *B05C 11/1002* (2013.01); *B25J 9/162* (2013.01); *B25J 13/089* (2013.01); *B25J 15/0019* (2013.01); *B41J 2/04586* (2013.01); *G05B 15/02* (2013.01); *G05D 7/0676* (2013.01); *B25J 19/005* (2013.01)

(56) References Cited

U.S. PATENT DOCUMENTS

| | | | |
|---|---|---|---|
| 2004/0141784 A1* | 7/2004 | Patton | B41J 3/4073 400/323 |
| 2006/0017732 A1 | 1/2006 | Matskewich et al. | |
| 2006/0191476 A1* | 8/2006 | Nagase | B05C 1/02 118/244 |
| 2009/0073245 A1* | 3/2009 | Chung | B41J 2/17513 347/87 |
| 2011/0050794 A1* | 3/2011 | Koike | B41J 2/17596 347/85 |
| 2015/0042716 A1 | 2/2015 | Beier et al. | |
| 2017/0252765 A1* | 9/2017 | Medard | B41J 3/4073 |
| 2018/0111143 A1* | 4/2018 | Sute | B05B 13/0431 |
| 2019/0105917 A1* | 4/2019 | Meyer | B41J 2/18 |

OTHER PUBLICATIONS

"Take Your Creativity to New Heights: The Only Wide-Format UV Flatbed That Can Print on 6" Thick Material", retrieved from https://www.rolanddga.com/products/printers/versauv-lej-640ft-flatbed-uv-printer on Nov. 14, 2018.

"Flatbed Printing, Colour Matching", Factum Arte, retrieved from http://www.factum-arte.com/pag/15/Flatbed-printing-Colour-matching on Nov. 14, 2018.

"Digital Art Studio: Techniques for Combining Inkjet Printing with Traditional Art Materials", Amazon.com, retrieved from https://www.amazon.com/Digital-Art-Studio-Techniques-Traditional/dp/0823013421 on Nov. 14, 2018.

Dana, R. "Realizing the Possibilities of Digital Transfers & Acrylics", Just Paint, Jan. 1, 2009, retrieved from https://justpaint.org/realizing-the-possibilities-of-digital-transfers-acrylics/.

Laidler, P. "Collaborative digital and wide format printing: Methods and considerations for the artist and master printer", University of the West of England, Dec. 2011, retrieved from https://uwe-repository.worktribe.com/output/964903.

Screen captures from YouTube video clip entitled "robot based inkjet printing on curved surfaces", 77 pages, uploaded on Nov. 22, 2016 by user "profactorgroup", retrieved from https://www.youtube.com/watch?v=Xoi9BGquM8g.

"Digital Inkjet Printing with a Twist: Scribe Uses Robotics and UV Curing to Print on 3D Parts", retrieved from https://www.uvintegration.com/fileadmin/UV_Integration/Company/Downloads/Digital_Inkjet_Printing_with_a_Twist_106-2.pdf on Nov. 10, 2018.

"KM1024 Series: Wide-Width Head Featuring 72mm Print Width for Realization of High Productivity", retrieved from https://www.konicaminolta.com/inkjet/inkjethead/1024/index.html on Nov. 21, 2018.

"Anapurna M2540 FB", AGFA Graphics, retrieved from http://saonam.com.vn/sites/default/files/anapurna_m2540_fb_brochure_english.pdf on Nov. 10, 2018.

Screen captures from YouTube video clip entitled "Adaptive Control of Inkjet Printing on 3D Surface", 148 pages, uploaded on Apr. 12, 2017 by user "SeRViCE Lab", retrieved from https://www.youtube.com/watch?v=30EqLtgXjRM.

Screen captures from Vimeo video clip entitled "Turbulence: Watercolor + Magic, 2014", 200 pages, uploaded on Mar. 11, 2014 by user "Dr. Woohoo!", retrieved from https://vimeo.com/88789175.

Screen captures from Vimeo video clip entitled "Experiments w/a Robot: Behind the scenes footage, 2014", 213 pages, uploaded on Sep. 20, 2015 by user "Dr. Woohoo!", retrieved from https://vimeo.com/139877473.

Screen captures from YouTube video clip entitled "Artistic Pen Drawing on an Arbitrary Surface Using an Impedance-Controlled Robot", 161 pages, uploaded on May 16, 2018 by user "ICRA 2018", retrieved from https://www.youtube.com/watch?v=6u3GM8mlESw.

Screen captures from Vimeo video clip entitled "Marilyn Drawings", 290 pages, uploaded on Nov. 3, 2011 by user "Peter A Vikar", retrieved from https://vimeo.com/31532259.

Screen captures from YouTube video clip entitled "Pindar Van Arman Is Teaching Robot Artists to Paint Like Humans (HBO)", 319 pages, uploaded on Aug. 10, 2017 by user "VICE News", retrieved from https://www.youtube.com/watch?v=dkTjEi7O4Ic.

Screen captures from Vimeo video clip entitled "Novel Reel", 68 pages, uploaded on Jan. 19, 2018 by user "Novel", retrieved from https://vimeo.com/251894160.

"Novel Technologies + Future Mediums", retrieved from https://novel.af/ on Nov. 22, 2018.

Screen captures from Vimeo video clip entitled "Robotic Airbrush Portraits", 175 pages, uploaded on Apr. 11, 2012 by user "Peter A Vikar", retrieved from https://vimeo.com/40190823.

Screen captures from Vimeo video clip entitled "Realtime test Robotic Sciarc Robot House Sara Moomsaz", 74 pages, uploaded in 2013 by user "Sara Moomsaz", retrieved from https://vimeo.com/81974954.

Screen captures from Vimeo video clip entitled "Robotic Airbrush Painting", 175 pages, uploaded on Nov. 16, 2013 by user "Viola Ago", retrieved from https://vimeo.com/79570076.

Screen captures from Vimeo video clip entitled "Bits+Bots", 87 pages, uploaded in 2014 by user "Lily Nourmansouri", retrieved from https://vimeo.com/113590333.

Screen captures from Vimeo video clip entitled "No. 13 spring-summer 2004 interl-h264 576p 6500kbps", 121 pages, uploaded on Apr. 21, 2011 by user "Metropolitan Museum of Art", retrieved from https://vimeo.com/22711586.

Screen captures from Vimeo video clip entitled "Long Distance Art", 141 pages, uploaded on May 5, 2014 by user "robotsinarchitecture", retrieved from https://vimeo.com/94077417.

Screen captures from Vimeo video clip entitled "Sougwen Chung, OMNIA ( Collaboration with D.O.U.G._3 ), 2018 (Teaser)", 141 pages, uploaded on May 8, 2018 by user "sougwen", retrieved from https://vimeo.com/268608925.

Kraybill, J. "I Can't Paint, But Meet My Robot", HackerNoon, Apr. 24, 2018, retrieved from https://hackernoon.com/i-cant-paint-but-meet-my-robot-f167a60b2635.

Google Search: "Paintings Gantry Robot Art", retrieved from https://www.google.com/search?ei=6YrnW_vtG8yzzwLi2LTgAg&q=

(56) References Cited

OTHER PUBLICATIONS paintings+gantry+robot+art&oq=paintings+gantry+robot+art&gs_l=psy-ab.3...2706.5326..5497...0.0..0.78.438.6......0.... 1..gws-wiz.......0i71.pZLts4PM5fU on Nov. 21, 2018.

Van Arman, P. "The First Sparks of Artificial Creativity", Jan. 27, 2018, retrieved from http://www.cloudpainter.com/blog/2018/1/27/the-first-sparks-of-artificial-creativity.

Van Arman, P. "From Printing to Painting: Computationally Creative Robots", Feb. 17, 2018, retrieved from https://medium.com/@pindar.vanarman/from-printing-to-painting-the-emergence-of-computationally-creative-robots-cb2f41846dd0 on Nov. 21, 2018.

"RAP (Robotic Action Painter)", retrieved from http://www.leonelmoura.com/index.php/robot-art/rap/ on Nov. 22, 2018.

Van Arman, P. "Kickstarter: bitPainter—A Portrait Painting Robot", retrieved from https://www.kickstarter.com/projects/396659733/bitpaintr-a-portrait-painting-robot-by-pindar-van on Nov. 10, 2018.

"Pen Wiggler", retrieved from https://github.com/scanlime/wiggler on Nov. 21, 2018.

Screen captures from YouTube video clip entitled "Paint Mixer—Mechatronics Project UWM Spring/2014", 227 pages, uploaded on May 13, 2014 by user "Mateus Oliveira", retrieved from https://www.youtube.com/watch?v=A_tMqBoU7mc.

Screen captures from YouTube video clip entitled "RobotArt: Tulips", 81 pages, uploaded on Apr. 14, 2018 by user "Herman de Vries", retrieved from https://www.youtube.com/watch?v=JL0T250wD-s&t=76s.

Karimov, A. I. "Brushstroke Rendering Algorithm for a Painting Robot", 2017 International Conference "Quality Management, Transport and Information Security, Information Technologies" (IT&QM&IS), St. Petersburg, Russia, 2017, pp. 331-334.

\* cited by examiner

MAINTAINED TARGET PRESSURE CIRCULATION SYSTEM FOR END EFFECTOR

CROSS REFERENCE TO RELATED APPLICATION

This application is a continuation of U.S. patent application Ser. No. 16/188,252, filed on Nov. 12, 2018, which a nonprovisional of U.S. Provisional Application No. 62/584,909, filed on Nov. 12, 2017, all of which are hereby incorporated herein by reference in their entireties.

COMPUTER PROGRAM LISTING APPENDIX

This application includes a computer program listing as an appendix. The appendix includes thirteen (13) ASCII text files (submitted via EFS-Web). The appendix (all thirteen files) is hereby incorporated by reference herein in its entirety.

The table below lists the thirteen ASCII text files included in the appendix:

| File No. | File Name | Date Created | File Size (kilobytes) |
| --- | --- | --- | --- |
| 1 | GRBL.txt | Nov. 12, 2018 | 27.3 |
| 2 | ImageOperations.txt | Nov. 12, 2018 | 2.22 |
| 3 | Machine.txt | Nov. 12, 2018 | 8.86 |
| 4 | MotionControl.txt | Nov. 12, 2018 | 5.44 |
| 5 | motion-controller.txt | Nov. 12, 2018 | 9.58 |
| 6 | PreLoadPrintJob.txt | Nov. 12, 2018 | 6.25 |
| 7 | PrinterImage.txt | Nov. 12, 2018 | 5.22 |
| 8 | PrinterOS.txt | Nov. 12, 2018 | 9.29 |
| 9 | PrinterPL.txt | Nov. 12, 2018 | 20.3 |
| 10 | Program.txt | Nov. 12, 2018 | 14.9 |
| 11 | renderer.txt | Nov. 12, 2018 | 9.38 |
| 12 | stage.txt | Nov. 12, 2018 | 6.74 |
| 13 | X2_Ink_Handling.txt | Nov. 12, 2018 | 2.77 |

FIELD OF TECHNOLOGY

Aspects of this disclosure relate to painting machines for producing layered and textured marks.

BACKGROUND

Typically, a printer or other output device prints a "flat" image of an electronic file holding a creators input. For example, a creator may utilize a user interface to input creative marks or designs. Such input may include pressure applied by the creator to a tool used by the creator. Other illustrative inputs may include color, path, rotation and/or tilt of the tool handled by the creator. The user interface may create one or more electronic files corresponding to the input of the creator. However, typical output tools are not suitable for reproducing the richness and layering effects of the input.

For example, traditional (e.g., by a human being) painting with a brush may generate irregular and chaotic movements, colors, texture and marks. The brush may be moved (e.g., tilted) by the creator generating changes in viscosity of the color or texture being applied. Such irregularity is compounded when brush strokes cross or overlap each other. Such irregularity may be further compounded when brush strokes of different colors cross each other. Other tools may be associated with other irregularities and chaotic movements/marks, specific to properties of the tool and properties of a surface being worked on by the tool.

However, when attempting to produce computer generated output based on the creator input, such irregularity is difficult to reproduce. For example, typical printing software/hardware is configured and designed to move in regiments and orderly patterns (e.g., line by line or row by row) and cannot follow irregular or non-linear pathways. Nor can typical printing software/hardware reproduce the irregularities and chaotic elements input by the creator.

Typical printing software/hardware cannot reproduce sequential marks as recorded by a creator during a painting (digital or traditional) process or an ability to pause during printing to allow for creator supervisory control. Nor can typical printing software/hardware print on non-horizontal or irregularly shaped/contoured surfaces. Typical printing software/hardware cannot print using oil-based or acrylic paints.

Accordingly, it would be desirable to provide apparatus and methods for computerized end effector manipulation that overcome the technical challenges of layering, reproducing irregularities and chaotic elements input by a creator.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
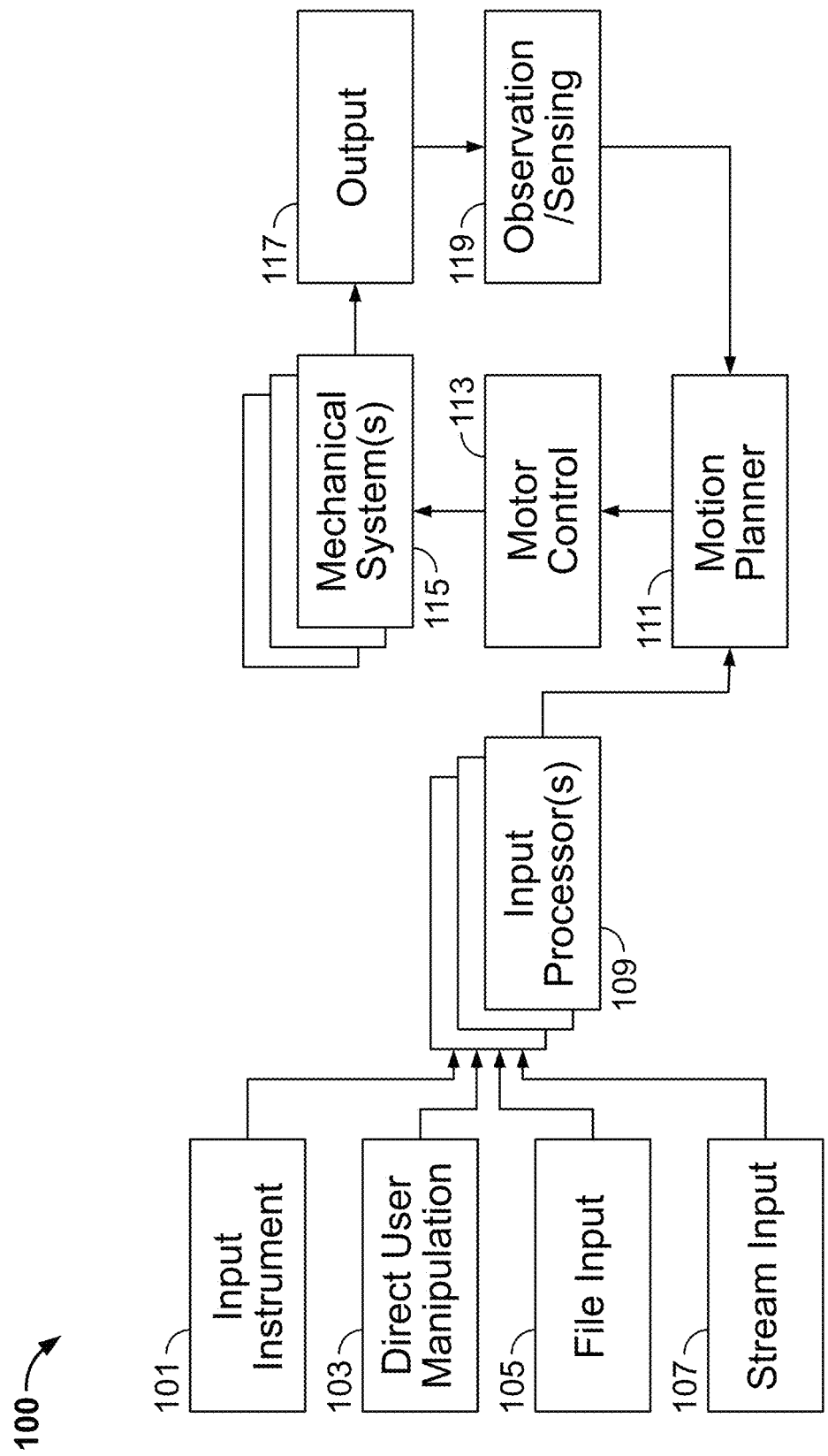
FIG. 1 shows illustrative apparatus in accordance with principles of the disclosure.

Apparatus and methods for a painting machine and associated painting systems are provided. The painting machine, as described herein, may provide larger degrees of freedom and creative control over the introduction of irregular, chaotic, or simply less predictable, mark making, when producing output based on creator input.

The painting machine may provide flexible tools for creators, including human creators, to create works dictated by their own vision, motor habits and experimental processes. The painting machine described herein may free creators, including human creators, from constraints imposed by "stylistic" components of other automated painting tools.

For example, the painting machine may not be constrained by specific algorithmic process for translating digital files into painted form. Such algorithmic processes may include processes for deconstructing a digital image based on algorithmic patterns and/or predetermined brush types/strokes. Such algorithmic processes typically do not provide a machine generated output that embodies stylistic components of the creator. The painting machine is not constrained by end effector limitations that may force a specific "stylistic" output. The painting machine may produce output that reflects a stylistic input of a creator.

To produce output that reflects a stylistic input of a creator, the painting machine may use custom mediums (ink, paint, ect.) and grounds (coatings on substrate) to control drying time and visual effects (blurring, dissolving, spreading, dripping, etc.) of marks produced by the painting machine. The painting machine may provide an ability to mix (wet or dry) desired materials.

The painting machine may incorporate human feedback into the machine output process. The painting machine may record a creator input process, whether executed digitally or physically, including creator changes applied to a machine output. The painting machine may recreate the creator input, including creator changes applied to a prior machine output.

The painting machine may paint raster images in non-linear fashion, as dictated by creator input. The painting machine may produce marks that equivalent to a brush type. A brush type may include a traditional brush type. A brush type may include a virtual brush, such a brush created using Adobe Photoshop available from Adobe Inc. of San Jose, California.

The painting machine may allow for a dynamic process using raster and vector processes to adjust, correct, and paint digital images or other creator input. For example, the painting machine may provide for printing an image (or other mark) in raster form and then choosing a digital paint brush and virtually painting over a digital image of the printed mark (or choose other items to overlay on the printed image) and then paint, in reality, the painting (as input using the digital brush) over the previously printed image.

The painting machine may produce a pattern that produces a mark by emulating an effect of a specific brush type on a specific surface. The painting machine may paint a desired section of an image using a desired brush type and associated strokes (as defined by a creator). The painting machine may produce output may overlaying marks on raster images, randomly selecting areas to reprint in linear or non-linear fashion, selecting discreet elements to layer in any order (e.g., masked items, colors, shapes)—all as defined by a creator.

A painting machine may utilize a combination of process and spot color. For example, process color may be used for underneath layers or areas of great detail. Spot colors may be used for recreating the effects of traditional painting (layering colors) and offset or screen printing (individual color separation layered for final effect). The painting machine may control opacity/transparency of each color by including white mixed with any other color and determining an impact of mixing white with other colors.

Output of the painting machine may be controlled by a creator's desired aesthetic criteria even when the desired aesthetic criteria are defined by complex multi-sensory movements or handling of traditional tools (brushes, markers).

Output of the painting machine may include painting with curable inks to achieve layered effects associated with traditional painting. For example, the painting machine may produce an output that provides a desired visual effect (e.g., relative transparency) due to a build-up of colors on a specific surface topology. The paint machine may utilize using high volume ink delivery (e.g., 150-5000 microns or above) and curable (e.g., by ultraviolet light) inks. The painting machine may provide translation of, or parsing of, digital input to paint all or some of the digital input as discrete marks, as raster images or as recreated as tool paths with the corresponding printed pattern or brush style.

The painting machine may include custom software. The custom software may be configured to receive electronic input data. The electronic input data may be generated by a creator. The creator may be any living being. The creator may be a human. The creator may be a machine. The creator may generate the electronic input data by making irregular and chaotic movements using a variety of colors, texture and marks.

The electronic input data store one or more properties that define the creator input. The creator input may include one or more marks generated by the creator. Two or more marks may overlap each other. Illustrative properties may include color, tool used to generate a mark, path/curve data, layer and mask information, patterns, gradient, brightness, contrast and filters applied. Color may include CMYKW (cyan, magenta, yellow, black and white) settings, hue/saturation or any custom color palette. The path/curve data associated with a mark may be defined by pixels and/or vectors.

Illustrative properties of a tool used by a creator may include thickness of brush bristles, number of bristles, size of brush, line thickness, path/motion of the tool as the mark was being generated and orientation of tool as the mark was being generated.

Custom software may control an end effector to produce output based on properties of the electronic input data. For example, illustrative output may include ink or color applied by the end effector that adheres to a surface with specific properties. The custom software may control the end effector such that ink is dispersed on the surface and/or builds-up on the surface. The custom software may control different end effectors in different ways depending on the properties of the electronic input data, type of ink/paint being used, type of surface receiving the ink/paint or any other variable.

The custom software may control the end effector such that marks are painted on a first side of a surface and the marks produce a desired visual effect on a second side of the surface. The first and second sides may be opposing sides of the surface.

The painting machine may receive electronic input data that includes vector and/or raster based images, commands and/or files. Illustrative electronic input data may include files generated using raster graphics editors such as Adobe Photoshop, available from Adobe Inc. of San Jose, California.

Illustrative electronic input data may include files generated using vector graphics editors such as CorelDRAW, available from Corel Corporation of Ottawa, Canada. Vector based approaches may simulate motion of a human hand and create output effects that simulate the "look and feel" of marks produced by a human hand.

Mechanically, and through the custom software, the painting machine may produce output having varying degrees of "controlled chaos" within prescribed mark making. For example, the custom software may interrupt a tight confinement of marks along a highly defined set of parameters.

Other examples of controlled chaos that may be produced by the painting machine and its associated custom software include producing output that includes a desired effect such as watercolor effects (e.g., dispersion) using a print head, blur effects, tightening or loosening edges and adding noise.

These effects may be visual to the human eye. These effects may not be visual to the human eye. These effects may be visible to the human when applied to the surface in a threshold number of marks. These effects may be produced based on digital manipulation from within custom software, or by introducing mechanical anomalies to movement of an end effector along its projected path. These effects may be produced by (dynamically) moving the end effector longitudinally along the z axis, (dynamically) rotating the end effector about the z axis, misfiring nozzles of a print head, adding air current to a print head, applying custom coatings to disturb the ink after it has been applied to a surface, applying vibrations as ink is being applied to a surface and/or after it has been applied to the surface. These impacts may be produced by utilizing any signal (e.g., noise function, sensor data, such as pre-defined file, feedback, etc.) to alter one or more properties of electronic input data and corresponding movement of an end effector.

The painting machine may include an end effector. An end effector may be affixed or otherwise coupled to a robotic device that moves the end effector relative to the surface. Generally, an end effector may include a terminal end of a device designed to interact with the environment.

Illustrative end effectors may include an inkjet head, brush, air brush or any suitable tool for applying ink, paint, color and/or texture to a surface. Illustrative print heads include Toshiba CF1B and the Toshiba CF1BXL. Illustrative airbrush end effectors include Iwata-Medea Eclipse HP BCS Dual Action Bottle Feed Air Brush ECL 2000.

An end effector may be configured to apply oil-based ink or ultraviolet-cured ink to a surface. An end effector may spray/diffuse a medium. An end effector may apply a medium that is neither paint nor ink. For example, an end effector may apply a chemical for priming a surface or thinning paint (e.g., an alcohol).

A surface may include any desired surface for receiving color and/or textures generated by a creator. Illustrative surfaces may include canvas, paper, brick and glass.

The custom software may include a user interface. The user interface may receive and/or generate electronic input data. For example, the user interface may provide tools for generating creator input. Such tools may include digital masking tools and fill commands for prescribed areas of a surface. The user interface may allow a creator to instruct the end effector to produce: repeatable patterns, image fragments, algorithmic mark making and/or output that mimics human movement.

The user interface may allow a creator to reprogram electronic input data (e.g., Photoshop or similar files) to output sequential marks as recorded during a digital painting process. The user interface may allow a creator to switch between real-time control over the painting machine for producing the output or using the painting machine to record creator input for later output. The user interface may allow a creator to pause production of painting machine output and allow for human supervisory control. Human supervisory control may include changing or otherwise manipulating marks produced by the painting machine. Such changes may be recorded by the painting machine as electronic input data.

Multiple changes may occur simultaneous or in sequential order. For example, two or more humans or machines may change or otherwise manipulating marks produced by the painting machine. The two or more humans or machines may be collaborating or merely working at the same time but not in collaboration.

The painting machine may include a mounting system. The mounting system may be designed to move the end effector. The mounting system may be designed to move multiple end effectors. The mounting system may be designed to move an end effector over different types of surfaces. The end effector may be affixed to the mounting system.

The mounting system may move the end effector across any suitable surface in any orientation. For example, the mounting system may include wall mounted tracks. Other embodiments of the mounting system may include flying apparatus, such as drones and other mechanisms (or combinations thereof) for effecting movement of an end effector, such as tracks, treads, legs, etc.

A mounting system may be designed for moving multiple end effectors. A mounting system may be designed for a specific use case. Different use cases may include different surfaces, different mediums, different digital simulation tools (on the user interface), different translation software between the interface used to create the electronic input data and properties of the end effector. Such properties may include thickness of bristles, number of bristles, size of brush, aperture size of a nozzle or any suitable requirement or capability of the end effector.

Embodiments may include mechanisms (hardware and associated control software) for moving an end effector relative to a target surface in any suitable direction. Such a mechanism may allow the end effector(s) to move in any suitable direction relative to the target surface. Exemplary movements may include pan, tilt, truck, dolly, follow, pedestal or orienting the end effector in any suitable position with respect to the surface.

Embodiments may include mechanisms (hardware and associated control software) for moving the surface relative to the end effector. Embodiments may include mechanisms (hardware and associated control software) for moving both the end effector and the surface.

The custom software may control operation of the mounting system. The custom software may control operation of the mounting system such that the end effector outputs or paints a mark on the surface in the way the mark was generated by the creator. A mark output by an end effector may include any suitable effect on a surface. A mark may be visible to a human eye. A mark may not be visible to the human eye. A mark may include a point, a line, a brush stroke or an entire painting. The painting machine may generate marks are different from "flat" images printed by conventional devices.

The custom software may provide the painting machine with specific functionality and design elements for painting, tracing, coating and/or plotting. For example, based on the electronic input file, the custom software may control movement of the end effector to generate a mark that replicates motions of the creator when the creator generated the mark. Motions of the creator may be defined as one or more properties of a mark in the electronic input data.

The end effector may include a brush. The mounting system may be configured to move the brush in any suitable manner. For example, a brush may include a number of bristles, each bristle have a specific thickness. The mounting system (as controlled by the custom software) may be configured to move the brush to leverage any suitable characteristic of the brush when painting on the surface. The mounting system may be configured to tilt the brush or alter a speed/acceleration at which the brush moves across the surface.

The mounting system may dip the brush into paint to obtain a target amount of paint. The target amount of paint may be specified in the electronic input data. The target amount of paint may be determined by the custom software based on one or more properties of the mark, as defined in the electronic input data.

The end effector may include an airbrush. The custom software may be configured to control movement of the mounting system and end effector based on specific property of the end effector. The custom software may control movement of the mounting system and end effector to paint marks as defined by non-linear pathways defined within the electronic input data. The custom software may be configured to control movement of the mounting system and end effector to paint an overlapping mark as defined by non-linear pathways defined within the electronic input data. A non-linear pathway may include a linear segment, single and multi-dimensional pathways.

The electronic input data may define marks based on properties of a specific artist tool used to create the mark. For example, the electronic input data may include properties such as orientation of an airbrush with respect to a surface, a viscosity of paint applied by the tool and/or a color of the paint applied by the tool. The custom software may configure the mounting system and/or end effector to produce a mark based on properties of the specific artist tool. Based on the one or more properties stored in the electronic input data, the custom software may configure end effector to produce a mark that visually appears to have been traditionally (e.g., by hand) painted by an artistic tool.

For example, output generated by the painting machine may be textured. Output generated by the painting machine may include marks produced by moving the end effector along a non-linear pathway over a surface.

A non-linear pathway may cross itself and the painting machine may follow the non-linear pathway to generate a mark that included two or more layers (e.g., an "overlapping mark").

The painting machine may generate output that includes irregular and/or chaotic markings. The irregular and chaotic markings may provide an output that is different from marks produced using conventional printer software/hardware. For example, a marks produced by the painting machine may be indistinguishable, to a human eye, from marks produced by creators using traditional painting techniques. In some embodiments, marks produced by the painting machine may appear different, to a human eye, from marks produced by creators using traditional painting techniques and different from marks produced using conventional printer software/hardware.

For example, the custom software may be configured to add random noise to the electronic input data. The custom software may configure the end effector to deposit marks on a surface based on merging the electronic input data (or properties included in the electronic input data) and the random noise. Marks generated by the painting machine may appear (when observed by a human eye or analyzed by a computer algorithm) to include a known style of a creator. The random noise may be configured to retain the known creator style and provide a noticeable visual change (when observed by a human eye or analyzed by a computer algorithm) to one or more marks generated by the creator and stored in the electronic input data.

The known creator style may include a signature painting style associated with a human artist. For example, a creator style may include signature movements or visual effects of a known human artist. The known creator style may include colors associated with a human artist. The creator style may include a visual effect on a surface recognized as being associated with the human artist. The creator style may include any suitable recognizable characteristic of works produced by a creator. The electronic input data may store one or more properties that define the creator style.

The end effector may include a print head. A print head may be an inkjet head. Generally, a print head refers to devices that deposit droplets of ink (or any other medium) from one or more embedded nozzles to produce a mark on a surface. An exemplary print head may include a digital controller which determines how and when to fire each nozzle of the print head.

A print head nozzle may direct ink, paint or any other medium onto a surface. Release of the medium by the nozzle may be controlled by the custom software. For example, the custom software may intentional misfire a nozzle to create a desired visual effect on the surface. For a given set of properties in the electronic input data, the custom software may generate a paint plan for producing output based on the set of properties. The paint plan may also account for a particular surface and a particular medium that will deposited on the surface by the end effector.

Generating a paint plan may include "slicing" a mark defined by the electronic input data into bands. Each band may be the width of the end effector (e.g., an inkjet head) or thinner. Such a slicing process may be referred to as raster image processing ("RIP"). Paint planning may include plotting motion of the end effector based on limits of the painting machine. Paint planning may include plotting motion of the end effector such that a target region on the surface to be painted will be traversed by the end effector.

Paint planning may include plotting motion of the end effector such that the medium deposited by the end effector onto the surface will be deposited on target locations on the surface to form the intended mark.

Paint planning may include plotting motion of the end effector such that the medium deposited by the end effector is arranged on the surface in a pattern that best approximates target properties for the mark in the electronic input data. In the context of inkjet or other printer heads, this process may be generally known as "dithering."

However, unlike conventional dithering, the custom software may calculate an arrangement of end effector output needed generate a multi-layered mark along a non-linear pathway. A multi-layer mark may produce a desired visual effect (e.g., to a human eye) that includes color, texture, shape or any other suitable property that may be generated by traditional, free-hand painting.

The custom software may generate a paint plan such that output of the end effector produces a visual effect defined based on properties of the electronic input data. Paint planning may also include plotting motion of the end effector such that a target density of the medium deposited by the end effector (e.g., dots per inch) is achieved.

Paint planning may include a generating color plan for the mark. The color plan may include using spot color to produce a desired output. The color plan may include using process color to produce a desired output.

Paint planning may include utilizing a combination of process and spot color. For example, process color may be used for underneath layers or areas of great detail. Spot colors may be used for recreating the effects of traditional painting (layering colors) and offset or screen printing (individual color separation layered for final effect).

The custom software may perform motion planning. Motion planning may include generating a motion plan and motion control instructions to implement the motion plan. Motion planning may include generating motion control instructions for moving the end effector and painting a mark on the surface. The motion control instructions may implement the paint plan. Motion control instructions may be transmitted to a motion controller. The custom software may include the motion controller.

The motion controller may be implemented in firmware. The motion controller may interpret motion commands from motion plans generated by the custom software. Based on the motion commands, the motion controller may execute the commands and drive one or more motors. The firmware may run on an embedded device in the painting system. The motion controller may be included in a mounting system, end effector or any other suitable component of the painting system or machine.

Motion control instructions may be generated by a motion controller. The motion controller may generate signals necessary to physically move the end effector across a target region of the surface. The signals may include low-level signals. Low level signals may include signals that are directly understandable by hardware of the end effector and/or mounting system.

The motion controller may monitor real-time movement of the end effector. The motion controller may adjust real time movement of the end effector based on the motion control instructions. For example, the motion controller may trigger synchronization signals transmitted to the end effector. The motion controller may generate synchronization signals at appropriate times so that the end effector deposits medium on the surface on a timeline that matches movement of the end effector over a surface.

For example, the end effector may include an inkjet printer head. The inkjet head may include one or more nozzles that control release of a medium stored within the inkjet head. Each nozzle may be moveable. A nozzle may release medium in response to receiving an electrical signal.

The custom software may trigger an electrical signal that causes a nozzle to release a target amount of the medium. The custom software may trigger an electrical signal that causes a nozzle to release a target amount of the medium at a target time. The target time may be any time along a timeline associated with movement of the end effector over the surface. Each nozzle in a print head may be independently controllable to release medium. Each nozzle may be independently moveable.

Apparatus may include a painting subsystem. The custom software may include one or more aspects of the painting subsystem. The painting subsystem may convert paint planning output into instructions that are understandable by the end effector hardware. When the end effector is a print head, the painting subsystem may generate a "firing pattern" for nozzles of the print head to release medium as the end effector moves across the surface (in accordance with the motion control instructions).

The painting subsystem may account for specific features of a print head such as nozzle size, number of nozzles and chemical properties of the medium. The painting subsystem may monitor and receive status information from end effector hardware. The painting subsystem may provide an interface for accessing low-level configuration settings of end effector hardware. The painting subsystem may provide an interface for accessing low-level configuration setting of mounting system hardware.

The painting subsystem may manage transfer/buffering of data through each level of end effector control hardware. End effector control hardware may include mechanical components needed to move an end effector or release medium from the end effector. Exemplary end effector control hardware for a print head may include a print controller card ("PCC"). A PCC may be described as a "printer's motherboard." An example of an illustrative PCC is model number PCC-E 2941-5210 Rev J.

An exemplary PCC may include hardware that accepts print data received over a network. The PCC may include hardware for passing the paint plan data to a head driver card ("HDC"). The HDC includes hardware that manages one or more print heads. The HDC supplies specific power requirements of a print head and implements low level digital control protocols needed to drive operation (e.g., firing of nozzles to release medium) of a print head. An example of an illustrative HDC is model number HDC-4CF 2941-5300 Rev B.

End effector control hardware may include a microcontroller. The microcontroller may receive data from one or more pressure sensors. A pressure sensor may monitor pressure in a conduit that carries ink or any other medium from a reservoir to a print head. The pressure sensor may monitor positive pressure (relative to atmospheric pressure). The pressure sensor may monitor negative pressure (relative to atmospheric pressure).

A pressure sensor may monitor pressure in a conduit that carries ink or any other medium from a print head to a reservoir. The pressure sensor may monitor positive pressure (relative to atmospheric pressure). The pressure sensor may monitor negative pressure (relative to atmospheric pressure).

The microcontroller may receive pressure data from two or more pressure sensors. Based on the pressure data received from pressure sensors, the microcontroller may trigger an appropriate voltage to be applied to a pump that maintains a target pressure in an ink circulation system. The target pressure may be a target meniscus pressure. Meniscus pressure may be determined, based on pressure at an ink inlet port of the print head (relative to the atmospheric pressure), and pressure at an ink outlet port of the print head relative to the atmospheric pressure.

The microcontroller may include a button that initiates a purging process of the print head. The microcontroller may include a button that powers on the print head. The microcontroller may include a button that powers off the print head. Powering off the print head may include shutting down the pump. Powering off the print head may include closing a valve that prevents ink from leaking out of the print head when the pump is shut down.

The PCC or HDC may include the microcontroller.

Methods for robotic painting are provided. Methods may include painting a mark by depositing color on a surface. The mark may be deposited on the surface by a machine, without—i.e., independent of—human intervention. Methods may include receiving electronic input data. The electronic input data may include input generated by a creator. The electronic input data may include one or more digital files.

The electronic input data may include one or more properties of one or more marks. The properties may include color data, pressure applied data, brush type data and path data. The properties may include relationships between one or more marks. For example, a mark may be defined by layering two or more marks at a target location on a surface.

Methods may include transmitting electronic control commands to an end effector. The end effector may be controlled by custom software running on a computer system. The electronic commands may direct the end effector to reproduce a mark based on the properties of the creator input file. Methods may include, in response to receiving the electronic control commands, moving the end effector in a fashion that traces path data stored in the electronic input data. Methods may include, using the end effector, depositing marks onto a surface such that the deposited marks produce a mark defined by properties in electronic input data.

For example, the end effector may produce a mark having color as defined in the electronic input data. The end effector may produce a mark by applying pressure to a surface as defined in the electronic input data. The end effector may produce a mark that looks like it was produced by a brush type defined in the electronic input data. Methods may include producing a mark by extracting one or more properties from the electronic input data and generating a set of control instructions that direct the end effector to produce a mark based on mimicking steps taken by a creator to generate the electronic input data.

Methods may include moving the end effector and depositing medium on a surface such that the deposited medium builds up on the surface. Methods may include moving the end effector and depositing medium on the surface to generate a three dimensional ("3D") mark on the surface.

Methods may include moving the end effector and depositing medium on a surface such that the deposited medium provides a visual effect of the mark defined by the properties in the electronic input data. For example, methods may include depositing medium on the surface that provides a perception of a three dimensional mark.

Methods may include generated and painting 2.5 dimensional ("2.5D") marks. 2.5D marks (which may include images or other visual scenes) refers to marks that are composed of layers. Such 2.5D marks may appear "flat" but are actually composed by minutely layered elements that may be difficult to detect with the human eye or even with diagnostic tools.

The 3D appearance may be generated by a shape of a mark, shading or other graphical simulations that the software calculates and are deposited by the end effector on the surface. The custom software may account for a texture or other features of the surface. For example, the surface may be a specific color, include protrusions and/or depressions. Methods may include producing 2.5D and 3D marks on a surface.

The custom software may account for a vantage point of a target viewer. For example, the surface may include a billboard that is viewed by highway drivers. The custom software may calculate how to deposit medium on the surface such that marks deposited by the end effector on the surface, collectively, provide a target visual impression to the target viewer.

The custom software may change/manipulate resolution, layering effects and mark thickness based on a marks expected distance from a viewer (e.g., in large public spaces) and lighting effects, surface variability and viewing the mark through (or on) a glass surface. The custom software may configure the end effector to produce a tangible output that provides a target visual impression to a viewer from a target vantage point.

Methods for depositing liquid paint on a surface are provided. Methods may include receiving, at a computing device, a user-input command. The user-input command may include a color. The user-input command may include a three-dimensional shape. The user-input command may include a brush type.

A brush type may include any traditional brush type. Such brush types include: fan, oval wash, sword, angle, flat, bright, filbert, rigger, and/or round. A brush type may include a custom or virtual brush type. For example, a customized brush type may be designed using Adobe Photoshop software. Customized brushes may include adjustable characteristics. Exemplary characteristics include hardness, diameter, roundness, spacing, angle, flip axis, jitter, scattering, pressure, texture, opacity and many others. A brush type may be created to produce a desired visual effect.

The user-input command may include a mark type. The user input command may include electronic input data. The color, three-dimensional shape, brush type and mark type may be properties of the electronic input data.

Methods may include transmitting, to a painting machine, the user-input command. In response to receiving the user-input command, methods may include moving a painting module. The painting module may be moved "free hand" by a human artist. The paint module may be moved along a support. The painting module may include a receptacle. The painting module may include an end effector. The painting module may include a mounting system for moving the end effector. The painting module may include custom software for controlling movement of and output of the end effector.

The receptacle may be configured to hold liquid paint. The receptacle may be configured to release targeted amounts of the liquid paint. The targeted amounts of liquid paint may be applied, by an end effector, to a surface. The painting module may include a pump that moves the liquid paint out of the receptacle. In some embodiments, the end effector may be moved along the support and the receptacle may remain stationary. The receptacle may be fluidly linked to the end effector via a conduit.

Methods may include ejecting or otherwise transferring liquid paint from the receptacle and onto a brush or other suitable end effector. The brush may be associated with the bush type.

The moving of the end effector and ejecting of the liquid paint as the end effector moves may form a mark on the surface. The mark may be a three-dimensional shape. The three-dimensional shape may be formed, at least in part, based on the mark type.

Apparatus for a system that paints a mark are provided. "Painting" may include any method or apparatus for making a mark on a surface. For example, painting may include printing a mark using a print head. Painting may include etching a mark into a surface.

The system may paint a mark along a non-linear pathway. The non-linear pathway may include a curved pathway. The non-linear pathway may include straight line segments. The non-linear pathway may overlap itself.

The system may include an end effector for painting onto a surface. The system may include software. The software may be run on a processor. The software, when run on the processor, may capture electronic data. The electronic data may include one or more properties of the mark. Illustrative mark properties may include color, pressure, type of artistic tool, orientation of the artistic tool (e.g., with respect to a surface), properties of the artistic tool (e.g., number of bristles) and speed at which the artistic tool moves along the non-linear pathway.

Properties within the electronic input data may define the non-linear pathway. For example, the electronic input data may include linked data structures that define the non-linear pathway. The linked data structures may include a graphical data structure that includes nodes, and edges linking the nodes. The electronic input data may include vectors that define the non-linear pathway.

The system may configure the end effector to produce a mark by following the non-linear pathway. The end effector may produce the mark by depositing ink or any other medium onto a surface while following the non-linear pathway.

The end effector may include an inkjet head. The system may include ink or any other medium suitable for producing marks on a surface. The ink may be a white ink. The ink may be comprised of particles that are small enough to pass through one or more nozzles in the inkjet head. A nozzle may have an open state and a closed state. The particles may be small enough to pass though the nozzle (and onto the surface) when a nozzle is in the open state. The particles may be large enough to be retained within the inkjet head when a nozzle is in the closed state.

Apparatus and methods may include custom inks/paints. Such custom inks may include white colored ink. White ink may be mixed with other colors and applied at any level of opacity/transparency. Conventional printers typically work transparently, using the white of the surface as the white color instead of white ink. Using conventional printers, colors, when layered, can only get progressively darker. Conventional printers that do use white ink use process color (CMYK) and introduce white ink via a separate channel. Such use does not allow the white ink to be combined/layered with other colors to build light colors over darker colors.

Custom ink/paint may be created using oil. A medium may include custom inks/paints that are UV curable. A medium may be created to have a target drying time. For example, the target drying time may allow a creator to manipulate the ink after being deposited on a surface by an end effector. The target drying time may range from minutes to months after ink is deposited on the surface.

The custom software may control an opening/closing of nozzles in the inkjet head. The custom software may control an opening/closing of nozzles in the inkjet head as the inkjet head follows a non-linear pathway. The non-linear pathway may cross itself.

The end effector may be configured to paint by depositing the ink onto a surface. The software may configure the end effector to generate a multi-layered mark. The end effector may generate the multi-layered mark by depositing ink along the non-linear pathway.

The custom software may configure the end effector to paint a mark (multi layered or single layered) on a stationary surface. The software may configure the end effector to paint a mark (multi layered or single layered) on a moving surface. The custom software may control movement of the surface. A mounting system may move the surface.

The non-linear pathway may pass through a multi-dimensional space. The multi-dimensional space may include 2, 3, 6 or more dimensions. The software may configure the end effector to move along the non-linear pathway and through the multi-dimensional space.

Dimensions may include an orientation and/or position of the end effector with respect to the surface. For example, the end effector may include a paint brush. The paint brush may define a longitudinal axis (e.g., defined by a ferrule, handle or belly of the brush). Different orientations of the longitudinal axis with respect to the surface may produce different marks on the surface. For example, different orientations of the brush with respect to the surface may produce marks having different textures, paths, appearance (e.g., transparency/opacity) or color.

The system may include one or more sensors. The sensors may detect when an end effector is approaching a change in surface contour. The custom software may receive topographical data of a surface from the sensors. Based on the topographical data, the custom software may configure the end effector to paint a mark at a target location on the surface and avoid a collision with the surface.

Illustrative sensors may include a depth/distance sensor. Such a sensor may be an infrared or ultrasonic distance sensor that provides a one-dimensional measurement of distance from the end effector to the surface. The system may include LIDAR sensor. LIDAR sensors operate using the principles of radar and use light from a laser. LIDAR sensors may generate a 2D depth-map of a surface, capturing textural data for reintegration into the painting/control system.

The system may include a robotic arm. The end effector may be affixed to the robotic arm. The custom software may control movement of the robotic arm. An illustrative robotic arm may include a KR 16 robotic arm manufactured by KUKA Aktiengesellschaft of Augsburg, Germany. Low-level control of the KR 16 robotic arm may be accomplished using control software provided by Haploid LLC of Brooklyn, New York. The custom software may communicate control signals to the KR 16 via the low-level control software provided by Haploid LLC. The custom software may generate control signals based on paint and motion plans associated with a mark.

An illustrative robotic arm may include a UR5 robotic arm manufactured by Universal Robots A/S of Odense, Denmark. Custom software may control an end effector affixed to the UR5 for painting applications.

Custom software may interface with V-REP robot simulation applications provided by Coppelia Robotics GmbH of Zurich, Switzerland. For example, the custom software may synchronize a UR5 robotic arm with simulated motion of the UR5 robotic arm that occurs within a V-REP robot simulation application. The custom software may utilize inverse kinematics, motion planning, and physics simulation capabilities provided by the V-REP robot simulation application to drive painting motion of an end effector affixed to the UR5 robotic arm.

Custom software may include a real time control system for controlling movement of a robotic arm. Such control software may be based on open source work available in the Robot Operating System (ROS) project.

For example, custom software may configure a UR5 robotic arm by loading code into the UR5's controller. The custom software may include a messaging system that runs on top of the V-REP robot simulation application. The messaging system may use V-REP's built-in scripting functionality. The messaging system may drive the UR5 robotic arm based on a simulated motion that occurs within the V-REP robot simulation application.

The messaging system may also be used to drive a simulation within the V-REP application based on control instructions provided to the UR5's controller.

Illustrative custom software applications may configure a robotic arm to paint interactively based on a pen digitizer input. The pen digitizer may be received from a creator. Custom software may include painting applications for robotic arms developed using open source Processing environment and the Java programming language.

The custom software may include computer code that runs in the V-REP robot simulation application. Such code may be developed using the Lua programming language. The custom software may include applications that are run external to the V-REP robot simulation application. Such code may be developed using the Python programming language.

Additional open source libraries that may be used to develop applications for painting with a robotic arm such as the UR5 robotic arm are available at https://github.com/artmatr-engineering.

Apparatus may include a system for painting a multi-layer mark on a surface. The system may include an end effector. The end effector may be coupled to a mounting system. The system may include custom software. The custom software, when run on a processor may transform creator input into painting instructions. The painting instructions may be readable by software and/or hardware components of the painting system. The painting instructions may be executable by software and/or hardware components of the painting system.

The creator input may include electronic input data. The electronic input data may include a mark defined by non-linear pathways. The electronic input data may include a multi-layered or overlapping mark. Based on the computer readable painting instructions, the custom software may configure the end effector to paint a multi-layered mark on the surface.

The end effector may be an output end effector. The system may include an input end effector. The input end effector may be manipulatable in a multi-dimensional space. The input end effector may be manipulatable by a creator to generate creator input. The creator may be a machine. The creator may be a living being. For example, the creator may be a human artist.

The end effector may include one or more sensors. The sensors may track a position of the end effector relative to the surface. The end effector may include one or more sensors. The sensors may track movement of the end effector relative to the surface. The custom software may configure the end effector to paint a multi-layered mark onto the surface independent of position and/or movement of the end effector relative to the surface.

For example, the system may include a modular inkjet end effector. The modular inkjet end effector may include a self-contained ink circulation system. The self-contained ink circulation system may control ink pressure and ink circulation using a single actuator/pump. The modular inkjet end effector may be operated in any orientation. The self-contained ink circulation system may regulate pressure within the modular inkjet end effector independent of fluid pressure (of the ink) due to gravitational forces.

The modular end effector may be moved relative to a surface by a human painter. Sensors may monitor a location and orientation of the modular end effector relative to the surface. Regardless of the location and orientation of the modular end effector, the custom software may configure the modular end effector to paint a desired mark on the surface. The custom software may configure the modular end effector to paint the desired mark based on electronic input data associated with the desired mark and determining how to paint the desired mark given the real-time position, orientation and/or movement of the modular end effector.

As a further example, sensors may ascertain position, orientation and/or movement of the end effector with respect to the surface. Based on the position, orientation and/or movement, the custom software may determine an appropriate mark that should be produced by the end effector to produce a mark having a target visual impression on target location on the surface.

The target visual impression may be determined based on the electronic input data. The target visual impression may be determined by adding a tunable level of noise to the creator input before painting a mark on the surface. The custom software may merge the tunable level of noise to one or more properties of the electronic input data. The noise may be randomly generated.

The noise may be designed to achieve a specific visual effect or impression. The effects of noise may be similar to effects created traditionally by interaction between a surface used for painting (such as canvas, linen, specialty papers, etc.) the medium being applied to the surface and the application used to apply the medium. A surface may impact the visual effect/impression of a mark due to its texture, absorbability, stretchability and coatings. Marks produced using painting machines described herein may include an underlying pattern or "noise" typically generated by interaction between the surface, medium and applicator. Other visual effects/impressions that may be output include grids, spots, transparencies, bumps, or algorithmic patterns.

The painting instructions generated by the custom software may include a property of the surface. The property of the surface may include a width, length, texture, contour and/or thickness of the surface. The property of the surface may include a coating applied to the surface. For example, a gesso may be applied to a surface before paint is applied to the surface. The property of the surface may include a texture of contour of the surface.

Texture/contour may include areas of the surface that are not to be painted. For example, the system may be configured to paint on the side of a building. Windows or other areas of the building may remain unpainted. The software may generate executable painting instructions that account for the unpainted areas. The software may account for the unpainted areas by determining where to deposit marks such that a desired visual effect is achieved despite the unpainted areas. The software may account for the unpainted areas by controlling the end effector such that paint is not deposited on the areas expected to remain unpainted.

The painting instructions generated by the software may include a property of paint applied by the end effector to the surface. The paint property may include a viscosity of the paint. The paint property may include an expected visual effect after the paint is deposited on the surface. The visual effect may depend on a chemical composition of the paint. For example, oil-based paints may provide a different visual effect than water-based or acrylic paints. The visual effect may depend on a texture of the surface. The paint property may be a color of the paint.

The painting instructions may include a non-linear path that the end effector follows as it deposits paint on the surface. The non-linear path may be determined based on a property of the surface and/or a property of the paint. For example, based on the paint being applied and the surface to which the paint is being applied, the end effector may need to make multiple passes (e.g., multiple coatings) along the non-linear path to provide a desired visual effect.

The system may include an XYZ gantry. An XYZ gantry may move the end effector along X, Y and Z axes. The XYZ gantry may move the end effector to any target location on the surface. The XYZ gantry may move the end effector to any target location relative to the surface. For example, the XYZ gantry may move the end effector to a target height above an area on the surface. Movement of the XYZ gantry may be controlled by the custom software.

Methods for painting a mark are provided. Methods may include painting the mark by depositing paint on a surface along a non-linear pathway. Methods may include painting the mark by depositing paint on a surface along a linear pathway. Methods may include painting the mark by depositing paint on a surface along a non-linear pathway. A non-linear pathway may include one or more linear segments. Methods may include painting the mark by depositing multiple layers of paint on a surface along the non-linear pathway. The multiple layers of paint may be deposited while the surface remains stationary.

Methods may include receiving electronic input data. The electronic input data may include one or more properties that define the mark. The electronic input data may include one or more properties that define the non-linear pathway.

Methods may include generating paint properties associated with a medium deposited by an end effector on a surface. Custom software may compute the paint properties based on achieving a desired visual effect by depositing the medium on a particular surface.

Methods may include generating a motion plan for moving the end effector along the non-linear pathway over the surface. The motion plan may include control instructions for moving the end effector relative to the surface. The motion plan may include speed of the end effector. The speed of the end effector may be measured relative to the surface. In some embodiments, the surface may move concurrently with the end effector. Custom software may compute the motion plan and associated motion control instructions based on achieving a desired visual effect on a particular surface by depositing the medium along the non-linear path.

Based on the paint properties and motion plan, methods may include electronically controlling of the end effector and painting the mark along the non-linear pathway on the surface. Custom software may electronically control of the end effector. Electronic control of the end effector may include controlling when and where the end effector deposits the medium on the surface. Electronic control of the end effector may include controlling motion of the end effector.

Electronically controlling the end effector may include controlling movement of the end effector such that the end effector follows the non-linear pathway. Electronically controlling the end effector may include how the end effector deposits medium on the surface during the movement. For example, the end effector may be a print head that includes 100s of nozzles. Which nozzle(s) fire (to deposit paint) and which do not, and when each nozzle fires, as the end effector moves, may all be electronically controlled by the custom software.

The custom software may include software tools provided by Meteor Inkjet Ltd. ("Meteor") of Cambridge, United Kingdom. Meteor provides software for managing print hardware and a runtime library for controlling printing operations. However, Meteor software alone is unable to provide painting functionality.

Painting produces a target visual effect that is different from conventional flat printing techniques. To achieve the target visual effect, marks may be layered on top of each other. Layering marks provides texture and color that cannot be produced using conventional printing technology. For example, layering marks provides for interaction between the layers that yields unique color impressions and other visual effects. Furthermore, to achieve the target visual effect, marks may be layered along one or more non-linear paths.

Conventional printing software and hardware are also unable to provide motion and paint planning necessary to paint layered marks. Furthermore, conventional printing hardware does not provide a range of motion for moving an end effector along non-linear pathways or in accordance with other properties of an electronic input data generated by a creator. Conventional printing software and hardware are also unable to dynamically rotate, or otherwise move a print head up, down or around 3D surfaces (e.g., follow a non-linear path) to produce a mark having a desired visual effect.

To achieve a visual effect associated with traditional (e.g., by hand) painting, custom software and hardware tools may be built. The custom software/hardware tools may allow for robotic painting in a way that is not technically achievable using conventional software/hardware printing tools.

For example, the custom software and hardware tools described herein may control movement of an end effector such that the end effector layers a medium on a surface along a non-linear pathway. The custom software and hardware tools described herein may control movement of an end effector such that the end effector deposits medium onto a surface in an orientation not technically achievable using conventional software/hardware printing tools.

The custom software may provide paint planning. The custom software may provide motion planning. Motion planning may include providing motion control functionality. The custom software may utilize a HTTP server for processing motion control. The custom software may generate HTTP requests to control motion of the end effector and control release of medium from the end effector (e.g., an inkjet head). Custom software tools described herein may utilize aspects of conventional software tools.

For example, custom software for painting using a printer head affixed to an XYZ gantry may provide paint planning functionality and motion control. The custom software may utilize Meteor runtime libraries to manage a painting subsystem. The custom software may communicate with hardware components of an XYZ gantry using Grbl motion control software (available at https://github.com/grbl).

The custom software may generate a motion plan and associated control instructions for controlling movement of the end effector. The custom software may generate control instructions in G-Code format. G-code format refers to a numerical control programming language used to control automated machine tools.

Hardware for controlling motion of the XYZ gantry may be built using the open source Arduino microcontroller development platform (available at www.arduino.cc). The Arduino open-source electronic prototyping platform is hereby incorporated by reference herein in its entirety.

The custom software may provide a graphical user interface ("GUI"). The custom software may include a GUI that allows a creator to load images for painting and plan how the images will be painted on a surface. The custom software may not be specific to any particular printing hardware and can control any suitable mounting system. Illustrative mounting systems include XYZ gantries and robotic arms. Based on the mounting system in use, the custom software may generate an appropriate configuration file that controls motion of the end effector. The configuration file may also include instruction for controlling the mounting system.

Using the GUI a creator may load an image (or other electronic input data) into the painting system. The GUI may provide functionality for selecting and arranging the desired output and desired visual effect. The creator may then click a button within the GUI to initiate the painting process. Behind the GUI, the custom software handles paint planning, motion planning and the high-level motion control. In some embodiments, the custom software may not communicate directly with the end effector. Instead, the custom software may generate HTTP requests that are translated into instructions that control movement of the mounting system and painting by the end effector.

The custom software may include custom firmware that manages motion control of a mounting system. For example the custom firmware may manage motion control of XYZ gantry hardware instead of Grbl. The custom software may include a custom protocol designed to communicate motion plans to firmware running the Arduino microcontroller platform.

The custom protocol may obtain live feedback of the painting process for display in the GUI and implement real-time modification of the painting/motion plans. Real-time modification of the painting/motion plans may be initiated by a creator through the GUI. The custom protocol may replace use of G-Code to communicate motion plans and associated motion control instructions to the motion controller.

Custom software may be written in any suitable programming environment or language. For example, illustrative custom software may be written in the C#programming language using Windows Forms. Illustrative custom software may be written in the Java programming library using the open source Processing environment for cross-platform support and prototyping.

Illustrative custom software may be written as an Electron application. Electron (www.electronjs.org) is a technology that allows rapid implementation of cross-platform applications using standard Web technologies. It includes many portions of the Chrome Web browser and V8 JavaScript runtime (developed by The Chromium Project for Google Chrome and Chromium web browsers and available at https://v8.dev/).

Custom software may be written in JavaScript and may leverage open source libraries to implement its functionality. For example, custom motion control firmware may be implemented in C++ on top of an open source Arduino environment.

The custom software may include one or more components that are run on one or more computer systems. For example, a GUI may be run on a creator's own computer and generate commands that are transmitted to a server running Meteor libraries.

The electronic input data may include a "flat" image. Methods may include segmenting the flat image into layers. Methods may include, for each layer, generating paint properties associated with the medium deposited by the end effector to paint the layer. Methods may include, for each layer, generating motion properties for moving the end effector over a surface to paint the layer on the surface. Motion properties may include motion planning and/or motion control instructions.

Based on the paint and motion properties associated with the layer, methods may include, electronically controlling the end effector and painting the layers on the surface. Painting the layers on the surface may generate a desired visual effect that is different from painting the flat image on the surface using conventional printing software/hardware.

Conventional printing software/hardware may take sequential marks as defined in electronic input data and compress them into one flat layer. Such flattening typically eviscerates visual effects that result from layering marks. Conventional printing technologies are unable to produce color and textural visual effects associated with layering marks.

On the other hand, custom software, hardware and chemistry described herein may generate an output that maintains effects of layering marks associated traditional (e.g., by hand) painting techniques. The generated output may be 2.5D. Such layered painting has applicability in the fields of painting, architectural facades, interior design, industrial design and advertising.

Methods may include detecting a change to a mark. The mark may be a layered or overlapping mark. The change may be detected after the mark is painted by the end effector on the surface. The change may not be made by the end effector. The change may be made by manipulating paint deposited by the end effector.

For example, a creator may blow on wet paint deposited by the end effector. A creator may brush wet paint deposited by the end effector. A creator may add additional marks to the surface after paint is deposited by the end effector. A creator may layer additional marks after paint is deposited by the end effector.

Methods may include generating properties for reproducing the change. Such properties may include capturing one or more digital images of the change. Photogrammetric sensing techniques may be applied to generate the properties for reproducing the change based on the images. One or more cameras may capture the change. Cameras for capturing the change may be external to the painting machine.

Cameras for capturing the change may be embedded in any suitable component of a painting machine or system. For example, cameras may be embedded in axes, belts, rails or any other components of an XYZ gantry. Cameras may be embedded in a robotic arm. The end effector may include one or more embedded cameras for capturing the change. Cameras may be embedded in the surface. Sensors for capturing properties for reproducing the change may be embedded in the medium deposited on surface.

Properties for reproducing the change may include paint properties for painting the change on a surface. Properties for reproducing the change may include motion properties for moving the end effector over the surface to paint the change. Based on the properties for reproducing the change methods may include electronically controlling the end effector and painting the change on the surface.

Electronic input data may be first electronic input data. Methods may include using the one or more sensors, capturing second electronic input data corresponding to the change. Methods may include generating the properties of the change based on computing differences between the first electronic data and second electronic data.

Methods may include adding a tunable level of noise to electronic input data. The noise may be randomly generated noise. The noise may be any suitable distortion or change to the electronic input data. The noise may be added before instructing the end effector to paint the mark on the surface. When added to the electronic input data, the tunable level of noise may generate marks having a visual effect that is different from marks painted without adding the tunable level of noise.

Methods may automatically recognize, analyze, and transfer painting style. For example, based on electronic input data, methods may include generating paint and motion plans for an end effector to produce marks (e.g., brush strokes) using a painting style extracted from the electronic input data. A painting style may be extracted based on properties associated with a plurality of electronic input data. A painting style may be extracted based on property patterns within the plurality of electronic input data.

A plurality of electronic input data may be input into the custom software. The custom software may extract a painting style from the plurality of electronic input data. In some embodiments, electronic input data may be provided that defines a painting style.

Using a painting style, a painting system may create a work having the painting style. Using a painting style, a painting system may complete an incomplete work by continuing where a human painter has left off. The painting system may complete the incomplete work by replicating the style of the human painter and filling in gaps in accordance with the painting style of the human painter. The painting style of the human painter may be determined based on the incomplete work.

Apparatus for a painting machine is provided. The painting machine may include a moveable mounting system. The moveable mounting system may include an XYZ gantry. The moveable mounting system may include a robotic arm. The painting machine may include an end effector. The end effector may be coupled to the mounting system. The end effector may be releasably coupled to the mounting system.

The painting machine may include custom software. The custom software may be configured to receive electronic input data. The electronic input data may define an overlapping mark. The electronic input data may include properties that define the overlapping marks. The electronic input data may include properties that define a plurality of overlapping marks.

The custom software may control movement of the mounting system such that the end effector paints the overlapping marks on a surface. The custom software may control movement of the mounting system such that the end effector paints the overlapping marks on a surface based on the properties stored in the electronic input data.

The end effector may be coupled to a receptacle. The receptacle may hold a medium. The medium may be a liquid. The medium may be a paint and/or ink. The medium may include a liquefied substance such as a polymer, a resin, a plastic, a rubber, a composite a metal and/or a combination of the foregoing.

A conduit may link the receptacle and the end effector. The conduit may fluidly link the medium in the receptacle to the end effector. The end effector may include an applicator that applies the medium to the surface. The applicator may include any suitable tool for making a mark on a surface. Illustrative end effectors may include one or more of the following tools: a paint brush, an air brush, a paint roller, a scraper or a cutting tool.

The end effector may include an inkjet head. The inkjet head may include a nozzle. The inkjet head may include two or more nozzles. For example, an inkjet head may include 320, 700, 1280 or more nozzles. The inkjet head may include a receptacle for holding a medium such as ink or paint. A nozzle may controllably release the medium from the inkjet head. The software may control release of the medium from each nozzle. The custom software may control release of the medium from each nozzle and concurrent movement of the inkjet head to paint overlapping markings on the surface. The custom software may intentionally misfire a nozzle or desynchronize firing of nozzles to achieve a mark having a desired visual effect.

The software may control movement of an end effector by controlling movement of the mounting system. The software may control movement of the mounting system such that the end effector paints the overlapping markings on the surface at a speed that is faster and/or slower than a speed defined in the electronic input data.

The mounting system may be moveable over the surface such that the end effector is configured to paint the overlapping marks on the surface while the surface remains stationary. The mounting system may be configured to maneuver the end effector at speeds and/or with motions outside a range of humanly capable speed and/or motion.

The software may be configured to register a position of the end effector relative to a first mark painted on the surface. Based on the position, the software may align the end effector to paint a second mark on the surface. Registering an end effector to any target position on a surface is a challenge for conventional printing systems. This challenge is exacerbated when it comes to real-time improvisational painting, such as when a creator does not have a clear idea where a new mark is going to be made on a surface.

To address this challenge, the custom software may automatically position the end effector with-respect-to current work. Such positioning may allow a creator to start/stop the painting process as desired and continue from any desired location on the surface, mark deposited on the surface or time stamp during the painting process.

The painting machine may include an input tool. The input tool may be moveable by a creator. The input tool may include any device that may function as an end effector. The painting machine may include a tracking controller. The tracking controller may be configured to track movement of the input tool. The custom software may be configured to paint overlapping marks on a surface by controlling movement of the end effector in accordance with the tracked movement of the input tool.

Illustrative tracking control may be implemented using Lighthouse Tracking technology provided by the HTC Vive VR system. A tracking device may be affixed to an input tool. For example, a tracking device may be affixed to a paintbrush handle. The tracking device may monitor a position and orientation of the input tool. As the input tool moves (e.g., is used by a creator to paint on a surface) the 6D pose (3D rotation+3D translation or position+orientation) of the input tool may be recorded. A 6D pose may be defined by three translational axes (typically denoted X, Y, Z axes) and three rotational axes (A, B, C).

Illustrative tracking may include tracking eye movement of a creator as the creator moves the input tool. Eye-movement may be tracked using eye-tracking sensors.

The position and rotation of the input tool may be mapped to a position and orientation of an end effector. Based on the position and orientation of the input tool, the end effector may paint on a surface. The custom software may configure the end effector to mimic tracked motion of the input tool.

For example, the painting machine may track brush strokes of a creator while the creator produces a work using traditional painting techniques. The custom software may configure the end effector to produce marks that appear to have been painted by a brush type. Illustrative brush types include: fan, oval wash, sword, angle, flat, bright, filbert, rigger, and/or round. The custom software may configure the end effector to produce marks may share one or more features of two or more brush types.

The painting machine may mimic the tracked brush strokes but apply different colors, using a different output tool to a different surface to create a new work of art.

Custom software may configure the end effector to follow the tracked motion of the input tool and add deviation to the tracked motion. The deviation may provide a visual effect that includes a signature or core stylistic character associated with the tracked motion and includes unique stylistic effects of the deviation. For example, the deviation may include mimicking a path (linear and/or non-linear) of tracked brush strokes of a human creator but at a speed faster or slower than the tracked brush strokes. Deviations may include any suitable mark, paint or surface property. Deviations may include changes to any property in electronic input data.

The end effector may be releasably coupled to the mounting system. When the end effector is coupled to the mounting system, the custom software may be configured to control release of paint from the end effector such that the end effector paints an overlapping mark on a surface based on the electronic input data.

When the end effector is decoupled from the mounting system, a creator may use the end effector to apply marks on a surface by moving the end effector free-hand across the surface. The creator may use a modular end effector. The custom software may be configured to control release of paint from the end effector such that the end effector paints overlapping marks on a surface based on the electronic input data. The custom software may control release of the medium from an end effector based on a position/orientation of the end effector with respect to a surface.

Apparatus for a painting machine is provided. The painting machine may paint marks on a surface. The painting machine may receive electronic input data defining a non-linear path. The painting machine may include a housing. The painting machine may include an end effector. The end effector may be configured to be affixed to the housing. The end effector may be configured to paint on the surface.

The housing may be designed to be hand-held by a creator. The housing may be designed to be hand-held by a human creator. The housing may be designed to be affixed and moved by any suitable way. For example, the housing may be attached to a plant and the end effector may be moved by motion of plant as the plant is blown by wind.

A painting machine may include two or more end effectors. The two or more end effectors may move relative to one another. Movement of the end effectors, relative to each other, may be controlled by the custom software. The housing may be capable of mating with two or more end effectors.

The painting system may include a mounting system. The mounting system may be configured to mate with the housing. When mated to the housing and end effector, the mounting system may maneuver the end effector to paint on the surface along the non-linear path.

The mounting system may be configured to move the end effector along any one of three orthogonal axes. The mounting system may be configured to rotate the end effector about a rotational axis. The rotational axis may be any suitable axis defined by one or more of the three orthogonal axes. The rotational axis may be any suitable axis within a multi-dimensional space. The rotational axis may be aligned with a longitudinal axis of the end effector. The rotational axis may be misaligned with a longitudinal axis of the end effector.

The mounting system may orient the end effector at a target position relative to the surface and move the end effector along the non-linear path.

The mounting system may include a robotic arm. The mounting system may include at least one electric motor. The mounting system may include at least one axle rotationally coupled to the electric motor. The mounting system may include a plurality of electric motors. Each electric motor may be configured to operate in concert to maneuver the end effector in accordance with a paint/motion plan.

For example, the mounting system may include an XYZ gantry. XYZ gantries described herein may provide longitudinal movement of an end effector along one or more of x, y and z axes. XYZ gantries described herein may provide rotational movement of the end effector about any suitable rotational axis. For example, an XYZ gantry may provide rotational movement of the end effector about one or more of x, y and z axes. An XYZ gantry may provide rotational movement of the end effector about an axis defined by the end effector (e.g., a central longitudinal axis).

Movement along one axis of the XYZ gantry may be implemented using wheels instead of rails, tracks or belts. Using wheels instead of rails/tracks/belts does not limit movement of the end effector along that axis.

A painting machine may include "smart" servomechanisms for the wheel-based axis and stepper motors for other axes. Motion control may be accomplished using an Arduino microcontroller platform running custom firmware developed in the Arduino programming environment. A cable bundle may be routed from the painting machine to power supplies. A computer system may provide control of the motors and end effector of the painting machine.

For general operation, three DC power supplies may be used, 9V for the Arduino microcontroller, 24V for the stepper motors, and 75V for the smart servomechanisms. When an inkjet head is coupled to the painting machine as the end effector, an additional 48V power supply may be added to the painting machine.

End effectors may be mounted to a standardized tool plate on the last motion stage of a painting machine. End effectors mounted on a painting machine may be moved vertically, horizontally, or forward/back by driving each independent motion axis. Illustrative end effectors have included an inkjet printing system, paintbrushes, airbrushes and pens.

The mounting system may include a first track aligned along a first longitudinal axis. The mounting system may include a second track aligned along a second longitudinal axis. The second longitudinal axis may be oblique or perpendicular to the first longitudinal axis. The mounting system may operate according to a Computer Numerical Control (CNC) protocol. A CNC protocols may include standard CNC protocols known to those skilled in the art. For example, a standard CNC protocol may include a computer-aided design (CAD) protocol that converts spatial designs into a series of numbers.

The painting machine may include one or more sensors. The sensors may detect a position and/or motion of the end effector relative to a surface. The painting machine may configure the end effector to paint marks on the surface in response to detected position and/or motion of the end effector.

Apparatus for a painting machine are provided. The painting machine may be configured to paint an overlapping mark on a surface. The painting machine may receive a first electronic input data. The first electronic input data may define a first mark. The painting machine may include an end effector. The end effector may be configured to paint the first mark, as defined by properties in the electronic input, at a target location on the surface at a first time.

The painting machine may include custom software. The custom software may extract one or more properties from the first electronic input data and control movement of the end effector based on the extracted properties.

The painting machine may include a sensor. The sensor may capture second electronic input data. The second electronic input data may define a second mark. The second mark may be present at the target location on the surface at a second time. The custom software may calculate how to change the first mark into the second mark. Based on the calculated change to the first mark, the custom software may configure the end effector to duplicate the second mark.

The sensor may be embedded in the surface. The sensor may be embedded in the end effector. The sensor may be included within a medium deposited on the surface.

A system for painting a medium is provided. The system may paint the medium along a path. The path may be a vector path. The path may be non-linear and overlapping. The system may include an end effector. The end effector may be configured to apply the medium to a surface. The system may include a receptacle. The receptacle may hold the medium applied by the end effector.

The system may include a single reservoir self-contained circulation system. A self-contained circulation system may control pressure and ink circulation in the system using the same actuator/pump.

The end effector may include an ingress port. The ingress port may allow the medium to enter the end effector. The end effector may include an egress port. The egress port may allow the medium to exit the end effector. The medium may flow through the end effector. The system may include a conduit. The conduit may transfer the medium from the receptacle to the end effector. The medium may be pressurized within the end effector. The medium may be pressurized within the conduit.

The system may include custom software and custom hardware. The custom software and custom hardware may control movement of the end effector. The custom software and custom hardware may control how the medium is applied by the end effector to the surface. The custom software and custom hardware may control movement of the end effector relative to the surface.

The receptacle may be a first receptacle. The system may include a second receptacle. The second receptacle may hold the medium extracted from the end effector. The system may include a pump. The pump may be configured to transfer the medium from the second receptacle to the first receptacle. The pump may be configured to push the medium out of the first receptacle, through the end effector, into the second receptacle and back into the first receptacle.

The system may include a vacuum pump. The vacuum pump may be configured to generate negative pressure. The vacuum pump may generate negative pressure by extracting air from a receptacle. The vacuum pump may extract air from the second receptacle. In some embodiments, the vacuum pump may extract air from the first receptacle. The system may include a pressure sensor. The pressure sensor may monitor changes in pressure generated by the vacuum pump. The vacuum pump may adjust the negative pressure in response to pressure readings received from the pressure sensor.

The custom software may regulate a quantity of the medium applied by the end effector to the surface. The end effector may be any suitable end effector. For example, the end effector may be an inkjet head, an airbrush, a paintbrush or a paint roller.

The custom software may regulate how ink is applied to the surface by the end effector based on pressure applied to the tablet or physical media used by a creator when creating electronic input data. For example, pressure applied by the creator when drawing on a tablet may be translated by the custom software to configure a threshold number of nozzles of the end effector fire thereby producing a mark having a target width. Pressure applied by the creator when drawing on a tablet may be translated by the custom software to configure the end effector to release more ink at a target location thereby producing a mark having a target darkness.

The medium may include particles small enough to pass through a nozzle in an inkjet head without clogging the nozzle.

The end effector may apply the medium based on pressure applied to the medium and control signals generated by the custom software. The control signal may trigger a change in the pressure within the inkjet head. The control signal may trigger a firing of an inkjet head nozzle and release of the medium from the nozzle.

A system for painting a medium along a non-linear path is provided. The system may include an end effector. The end effector may apply the medium to a surface. The system may include a receptacle. The receptacle may hold the medium applied by the end effector. The system may include a conduit. The conduit may transfer the medium from the receptacle to the end effector. The conduit may transfer the medium from the end effector to the receptacle.

The system may include a pump. The pump may move the medium through the conduit. The pump may maintain a target pressure in the conduit. The pump may include an Archimedes screw. An Archimedes screw may include a screw within a hollow pipe. Turning the screw moves liquid though the pipe.

The Archimedes screw may provide a fluid pump which induces a constant pressure in the conduit. Conventional pumps rely on mechanisms which move fluid in oscillating bursts, leading to pressure waves in the fluid/conduit carrying the fluid. In the context of an inkjet system in which a pump is forcing a flow of medium through nozzle channels, pressure waves may create a turbulent flow which may reduce quality and consistency of painting output. The Archimedes screw may be positioned in the conduit. The Archimedes screw may be rotated as the armature in an electric motor.

The system may include custom software. The custom software may control movement of the end effector. The custom software may control depositing of the medium (by the end effector) along a non-linear path.

The system may include a valve. The valve may regulate a flow of the medium within the conduit. The value may regulate a flow of the medium from the receptacle into the conduit.

The system may include a pressure sensor. The pressure sensor may detect changes in the pressure within the conduit. The pump may be responsive to the changes in the pressure detected by the pressure sensor. For example, in response to a detected loss of pressure, the pump may increase the pressure to achieve a target pressure. In response to a detected increase in pressure, the pump may stop pumping or release pressure, to achieve the target pressure. Collectively, the pressure sensors and pump may form a feedback loop that maintains a target pressure in the conduit and/or an ink circulation system.

The pump may maintain a target pressure during movement of the receptacle, conduit or end effector. Movement may include rotation of the receptacle, conduit or end effector.

The system may include a filter. The filter may allow air to enter the receptacle. The filter may prevent unwanted particles from entering the receptacle.

The receptacle may be a first receptacle. The first receptacle may hold a first medium. The first receptacle may be removable from the system. The first receptacle may be replaced with a second receptacle. Removable receptacles may allow ink colors to be easily changed. The second receptacle may hold a second medium. The first medium may be a first color paint. The second medium may be a second color paint. The first or the second medium may be a white colored paint. The first or second medium may be any medium that when applied produce a visual effect of white ink.

A medium may be opaque or translucent variations of colors. The custom software (and associated creator interface) may provide digital simulation of effects produced by use of such mediums. The custom software (and associated creator interface) may provide digital simulation of volumetric components of one or more layers to achieve a desired visual result. Each layer, and digital simulation (and digital effects) associated with layer may be saved by the custom software. Each layer, and digital simulation (and digital effects) associated with layer may be saved as one or more properties of electronic input data. The system may configure an end effector to produce tangible output that embodies the visual effect digitally simulated by the creator interface.

A medium may include custom inks/paints created using oil. A medium may include custom inks/paints that are UV curable. A medium may be created to have a target drying time. For example, the target drying time may allow a creator to manipulate the ink after being deposited on a surface by an end effector. The target drying time may range from minutes to months after the ink is deposited on the surface.

The system may include a mixing chamber. A plurality of foundational ingredients may be mixed in the mixing chamber to form the medium.

A system for a modular inkjet end effector may be provided. A modular inkjet end effector differs from a conventional inkjet system in a few ways. The modular inkjet end effector may include a self-contained circulation system. The self-contained circulation system may control pressure and paint circulation using the same actuator/pump.

The modular inkjet end effector may be operated in any orientation. The self-contained circulation system may control pressure independent of fluid pressure. Fluid pressure may be caused by gravity or movement of the medium due to gravity.

A system for depositing medium along an arbitrary vector path is provided. The system may include an end effector. The end effector may be configured to apply the medium to a surface. The system may include a housing. The housing may be configured to rotate the end effector.

The system may include a receptacle. The receptacle may hold the medium applied by the end effector. The system may include a conduit. The conduit may transfer the medium from the receptacle to the end effector. The system may include a pump. The pump may move the medium through the conduit. The pump may maintain a target pressure in the conduit.

The system may include custom software. The custom software may control movement of the end effector. The custom software may control depositing (timing and location) of the medium on the surface, along the arbitrary vector path.

The end effector may be mounted to the housing using an embedded bearing. The embedded bearing may define a rotational axis. The housing may include a planetary gear system. The embedded bearing may be enclosed within the planetary gear. The planetary gear system may be configured to rotate the end effector about the rotational axis.

The housing may define a rotational axis. The housing may be configured to rotate the end effector 360° about the rotational axis.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus and/or method embodiment.

FIG. 1 shows illustrative components of painting system 100. A painting system 100 includes input instrument 101. Input instrument 101 may be any suitable tool for making marks on a surface. Input instrument 101 may include a virtual reality ("VR") tool. A creator may move the VR tool and motion of the VR tool may be tracked. The tracked motion may be saved as electronic input data.

Painting system 100 may capture direct user manipulation 103. Direct user manipulation 103 may include a creator producing an artistic work in digital or traditional form.

Painting system 100 includes file input 105. File input 105 may include files created using vector or raster graphics editors. File input 105 may be or include electronic input data.

Painting system 100 includes stream input 107. Stream input 107 may include real-time input. Stream input 107 may include simulated input, such as motion simulated using the V-REP robot simulation application discussed above. Stream input 107 may include real-time tracked motions of a creator and/or input instrument 101.

A GUI may allow a creator to provide inputs 101, 103, 105 and 107. Behind the GUI, inputs 101, 103, 105 and 107 may be processed by input processors 109. Input processors 109 may include one or more computer systems. Input processors 109 may include custom software running on the one or more compute systems.

Based on inputs 101, 103, 105 and 107, input processors 109 execute motion planner 111. Motion planner 111 may include generating motion control instructions for producing output based on the inputs. Motion planner 111 may be a component of the custom software. The motion control instructions generated by motion planner 111 may implement motor control 113.

Motor control 113 may include controlling operation of one or more motors. Motor control 113 may actuate mechanical systems 115. Mechanical systems 115 may include an XYZ gantry. Mechanical systems 115 may include a robotic arm. Mechanical systems 115 may include an end effector. Mechanical systems 115 may include an inkjet print head. Mechanical systems 115 may include an ink circulation system for an inkjet print head. Mechanical systems 115 may include a pressure regulation system for an inkjet print head.

Actuation of mechanical systems 115 may produce output 117. Output 117 may include one or more marks on a surface. Output 117 may include layered or overlapping marks or marks that follow a non-linear pathway. Output 117 may have a visual effect commensurate with the visual effect associated with traditional (e.g., by hand) painting.

Painting system 100 includes observing/sensing 119 components that capture changes or manipulation to output 117. Observing/sensing 119 components may include cameras or motion sensors, tracking technology or any other suitable devices for detecting changes or manipulation to output 117.

Changes or manipulation captured by observing/sensing 119 components may generate electronic input data. Changes or manipulation captured by observing/sensing 119 components may be input into motion planner 111 for producing a revised output 117 based on the changes or manipulations.

Figure 2:
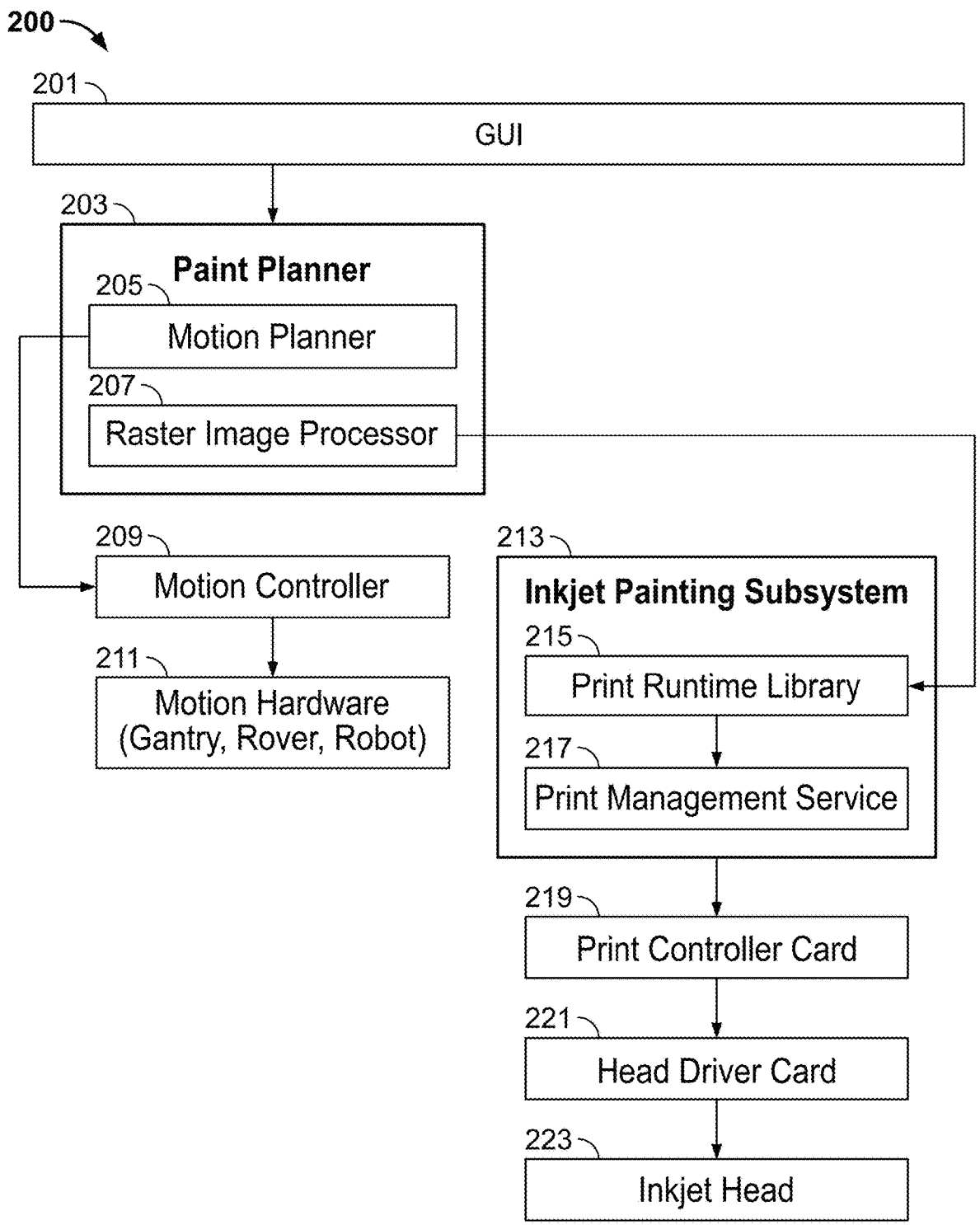
FIG. 2 shows illustrative apparatus in accordance with principles of the disclosure.

FIG. 2 shows illustrative components of painting system 200. Painting system 200 includes GUI 201. GUI 201 may provide an interface for remixing and iterating certain painting processes that may be implemented by painting system 200. Such processes may include serializing multiple layers of an image, repeating a desired mark and patterned repeat of a desired mark. A mark may be composed of two or more marks. A mark may include an entire layer or two or more layers. A mark may be an image.

GUI 201 may display an expected output that will produced by painting system 200. GUI 201 may highlight operations or steps a creator instructed painting system 200 to perform to produce the output.

GUI 201 may load digital images (or other electronic input data) to be painted into the painting system. GUI 201 may adjust properties of the image (or other electronic input data) based on a surface (e.g., paper versus canvas) that will be used to produce the output. GUI 201 may configure painting by allowed a creator to adjust settings (e.g., paint properties) such as physical width and height, droplet size, resolution, paint rate, etc.

GUI 201 may submit the image (or other electronic input data) to paint planner 203. In some embodiments, GUI 201 may submit the image (or other electronic input data) to inkjet (or other end effector) paint subsystem 213.

Painting system 200 includes paint planner 203. Paint planner 203 may include custom software for slicing the image (or other electronic input data) into bands which are the width of a toe of an end effector or thinner. When the end effector is a print head, slicing the image includes raster image processing 207.

Paint planner 203 includes motion planner 205. Motion planner 205 may plan motion of the end effector such that motion is constrained to limits of painting system 200 (including an associated mounting system for actuating the end effector). Motion planner 205 may plan motion of the end effector such that a desired region of the surface identified using GUI 201 receives the output.

Motion planner 205 may plan motion of the end effector such that a medium deposited by the end effector lands in desired locations on the surface. When the end effector is a print head, motion planner 205 may plan motion of the print head such that medium (e.g., ink droplets) deposited by the print head land in target locations on the surface to form the intended mark.

When the end effector is a print head, motion planner 205 may plan motion of the print head such that ink droplets are arranged in a pattern on the surface that approximates desired properties for the image (or other electronic input data). Desired properties may be identified using GUI 201. Desired properties may include color reproduction or presence/quality of visible repeating patterns.

Motion planner 205 may execute a dithering process. Motion planner 205 may plan motion of a print head such that a target ink droplet density (e.g., dots per inch) is achieved on the surface.

Painting system 200 includes motion controller 209. Motion controller 209 receives the planned motion from motion planner 205. Motion controller 209 executes the planned motion. For example, motion controller 209 may include hardware for emitting synchronization signals to inkjet painting subsystem 213. The synchronization signals may be generated and emitted at appropriate times so that a painting timeline matches movement of the end effector.

Motion controller 209 may generate low-level motor control signals necessary to physically move a print head across a desired paintable region of the surface. The low-level motor control signals generated by motion controller 209 may control movement of motion hardware 211.

Inkjet painting subsystem 213 may receive image (or mark) data from paint planner 203. Painting subsystem 213 may convert image data into droplet firing patterns specific to an inkjet head. Painting subsystem 213 may establish a communication link to the print hardware to transmit images and configuration settings. A communication link may utilize any suitable transmission medium or protocol (e.g., wired, wireless, fiber optic, infrared, radio). The configuration setting may include the firing patterns. The communication link may also be used to receive status information from the print head hardware.

Painting subsystem 213 may expose low-level configuration of the inkjet head and support systems. Painting subsystem 213 may access low-level configuration of the inkjet head and support systems using print runtime libraries 215. Illustrative runtime libraries for print heads may be provided by Meteor Inkjet Ltd.

Painting subsystem 213 includes print management service 217. Print management service 217 may manage transfer/buffering of image data through each level of the inkjet control hardware. Inkjet control hardware may include print controller card 219, head driver card 221 and inkjet head 223.

Print controller card 219 may be a hardware device that accepts print data over a network and passes it on to head driver card 221 for painting. Print controller card 219 may including a central processing unit, memory and connectors for other input and output devices.

Head driver card 221 may be a hardware device that manages one or several inkjet heads, such as inkjet head 223. Head driver card 221 may provide specific power requirements of inkjet head 223. Head driver card 221 may implement low-level digital control protocols for driving inkjet head 223. Driving inkjet head 223 may include controlling a firing (e.g., releasing ink or other medium) of nozzles within inkjet head 223. Driving inkjet head 223 may include controlling pressure applied by a medium that cycles through inkjet head 223. Driving inkjet head 223 may include controlling pressure applied by a medium on nozzles of inkjet head 223.

Inkjet head 223 may be a device which fires ink droplets from embedded nozzles to produce an output, such as an image. Inkjet head 223 may include a digital controller that determines how and when to fire each nozzle.

Figure 3A:
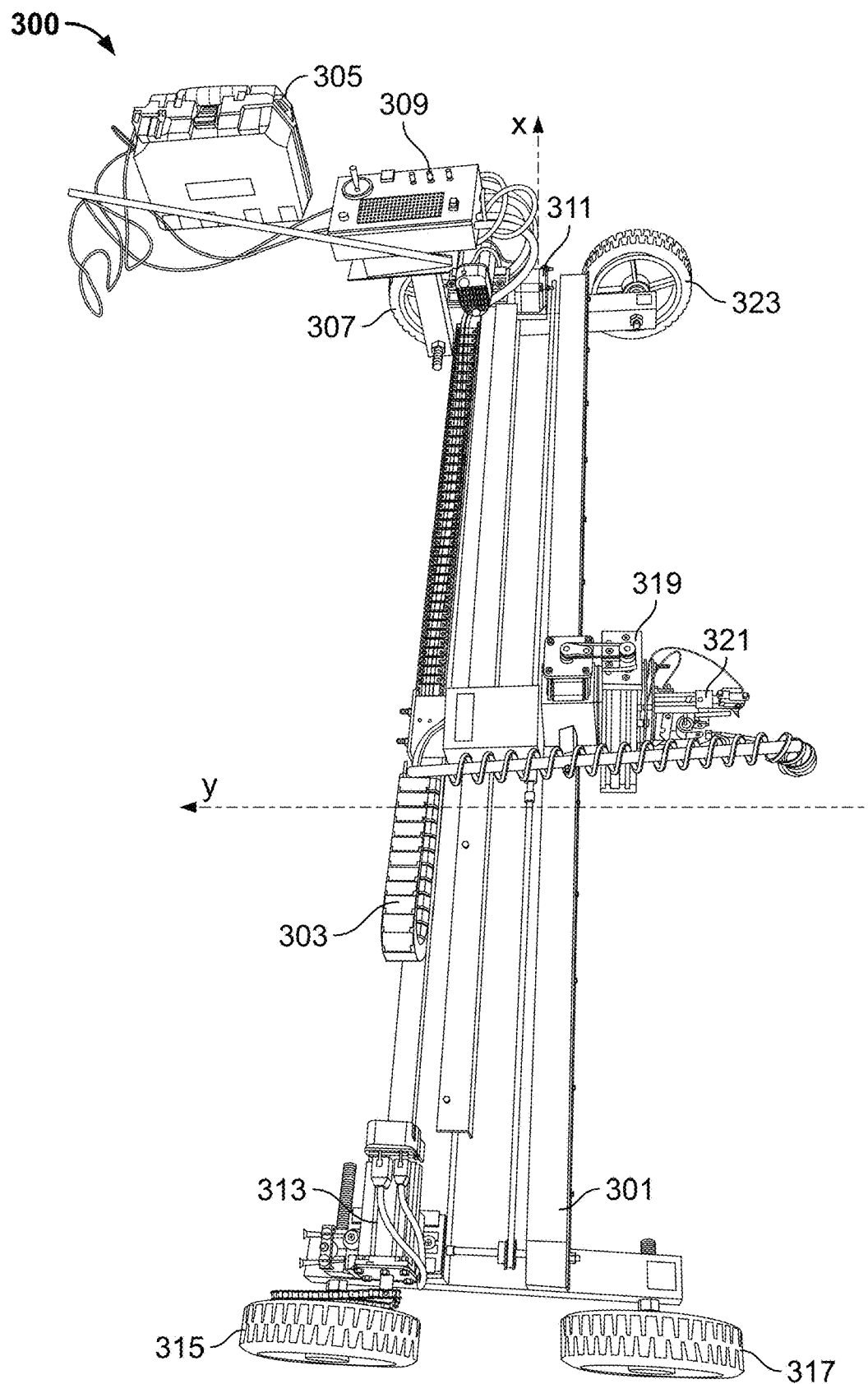
FIG. 3A shows illustrative apparatus in accordance with principles of the disclosure.

FIG. 3A shows illustrative painting machine 300. Painting machine 300 includes a mechanical mounting system for moving end effector 321 along X, Y, and/or Z axes. Painting machine 300 may be considered an XYZ gantry. Painting machine 300 may be designed to operate according to a Computer Numerical Control (CNC) protocols. Such CNC protocols may include standard CNC protocols known to those skilled in the art. A standard CNC protocol may include a computer-aided design (CAD) protocol that converts spatial designs into a series of numbers.

Painting machine 300 includes wheels 317 and 315. Wheel 315 is mechanically coupled to motor 313 and is a drive wheel. Painting machine 300 includes wheels 307 and 323. Wheel 307 is mechanically coupled to motor 311 and is a drive wheel. Motors 313 and 311 may be electric motors.

Motors 313 and 311 may be servomechanisms. Servomechanisms may include error-sensing feedback to ensure that desired movement is being achieved. Motors 313 and 311 may include built-in encoders or other position feedback mechanisms. Each servomechanism may be connected to a 75V DC power supply.

Motors 313 and 311 may be synchronized to move end effector 321 along axis y. Electrics motors 313 and 311 may be configured to move end effector within a plane defined by (or parallel to) axes x and y.

Painting machine 300 includes belt 303. Belt 303 may move end effector 321 along rail 301. Belt 303 may move end effector 321 along axis x. Belt 303 may be driven by a stepper motor. The stepper motor may be coupled to a 24V DC power supply.

Painting machine 300 may be constructed in a modular fashion such that rail 301 connecting wheels 315/317 to wheels 307/323 may be as short or as long as desired. For example, Rail 301 may be 1-12 feet in length.

Embodiments (not shown) of painting machine 300 may include a single motor and drive axle to synchronize movement of end effector 321 along the y axis.

End effector 321 may be mechanically coupled to two motors. Illustrative motor may include a stepper motor coupled to a 24V DC power supply. One motor may drive rotational movement of end effector 321 about an axis perpendicular to the x and y axes (the "z axis"). Another motor may drive longitudinal movement of end effector 321 along the z axis. Embodiments of painting machine 300 may include one, three or more motors for manipulating end effector 321. For example, motor 319 may move end effector 321 along a z axis.

Motion control of end effector 321 may be implemented using an Arduino microcontroller platform running custom firmware developed in the Arduino programming environment. The Arduino microcontroller platform may be coupled to a 9V power supply. When end effector 321 includes an inkjet head, a 48V power supply may be added to painting machine 300. Item 309 may represent an illustrative Arduino microcontroller platform. Item 305 may represent a portable power source and computer system for controlling of painting machine 300.

Figure 3B:
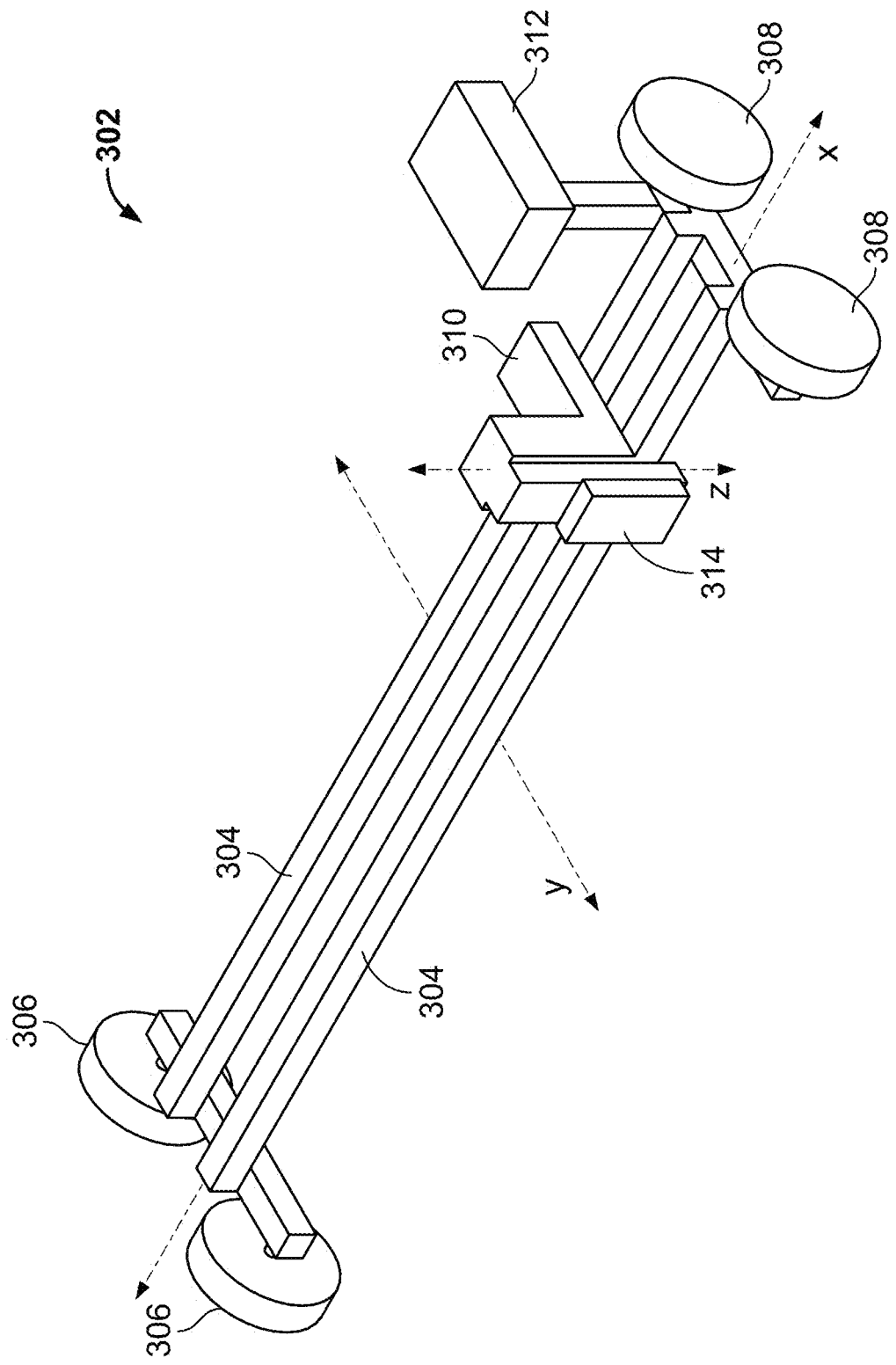
FIG. 3B shows illustrative apparatus in accordance with principles of the disclosure.

FIG. 3B shows illustrative painting machine 302. Painting machine 302 may include one or more features of painting machine 300 (shown in FIG. 3A).

Painting machine 302 includes end effector 314. End effector 314 is moveable along the z axis. End effector 314 may be rotatable about the z axis. Bracket 310 may move end effector 314 along rails 304 and along the x axis. Wheels 306 and 308 may move end effector 314 along the y axis. Wheels 306 and 308 may move end effector 314 in a plane parallel to the x and y axes.

End effector 314 may be mounted to a standardized tool plate (not shown). End effector 314 be moved vertically (along z axis), horizontally (along x axis), or forward/back (along y axis). End effector 314 may be moved by driving each independent motion axis. End effector 314 may be an inkjet system, paintbrushes, airbrushes and/or pens.

Painting machine 302 includes mounting bracket 312. Motors or microcontrollers may be mounted on mounting bracket 312.

Figure 4:
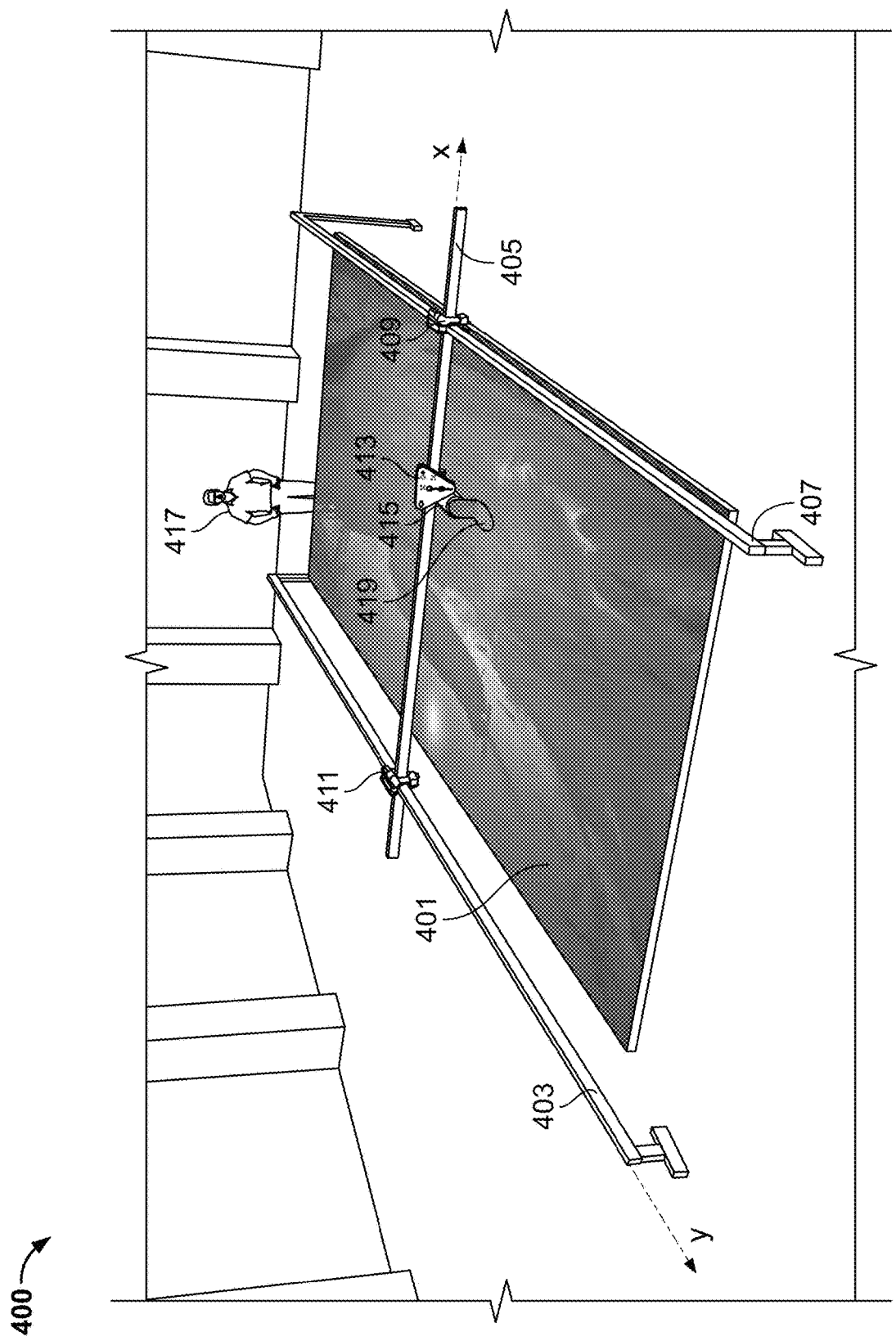
FIG. 4 shows an illustrative apparatus and painting scenario in accordance with principles of the disclosure.

FIG. 4 shows illustrative painting scenario 400. Scenario 400 shows a painting machine producing output 419 on surface 401 based on an input of creator 417.

The painting machine shown in FIG. 4 includes rail 403. The painting machine includes "drillbot" 411. Drillbot 411 may be configured to move along rail 403. Drillbot 411 may include a motor, drive axle, wheels, frame and other components shown and described herein.

The painting machine includes rail 405. The painting machine includes drillbot 413. Drillbot 413 may be configured to move along rail 405. Drillbot 413 may include a motor, drive axle, wheels, frame and other components shown and described herein.

The painting machine includes rail 407. The painting machine includes drillbot 409. Drillbot 409 may be configured to move along rail 407. Drillbot 409 may include a motor, drive axle, wheels, frame and other components shown and described herein.

The painting machine includes end effector 415. End effector may be a pail of paint. Drillbots 409, 411 and 413 may be configured to move end effector to any target location on surface 401. Drillbots 409, 411 and 413 may be controlled by custom software.

The custom software may coordinate movement of drillbots 409, 411 and 413. The custom software may coordinate movement of end effector 415 coupled to drillbot 413. Drillbots 409, 411 and 413 may execute paint and motion plans generated by the custom software. For example, the custom software may configure drillbot 413 to dump paint at target location above surface 401. The target locations may be specified by creator 417 using a GUI.

The target locations may be specified by the custom software using a machine learning algorithm. The machine learning algorithm may "learn" a painting style associated with creator 417 and the custom software may produce output 419 on surface 401 in accordance with the painting style. The machine learning algorithm may learn a painting style based on analysis of electronic input data associated with works produced by creator 417.

A painting machine may include any number of drillbots. For example, two or more drillbots may operate on rail 403. A painting machine may include more rails than rails 403, 405 and 407. For example, a painting machine may include a rail (and associated drillbot) that is oriented perpendicular or oblique, to surface 401. A painting machine may also include two or more end effectors. Each drillbot may be coupled to one or more end effectors.

A painting machine as shown in FIG. 4 may be used for painting large surfaces. The painting machine may position an end effector over portions of surface 401 (e.g., a middle of the surface) that are not easily accessible by creator 417.

Figure 5:
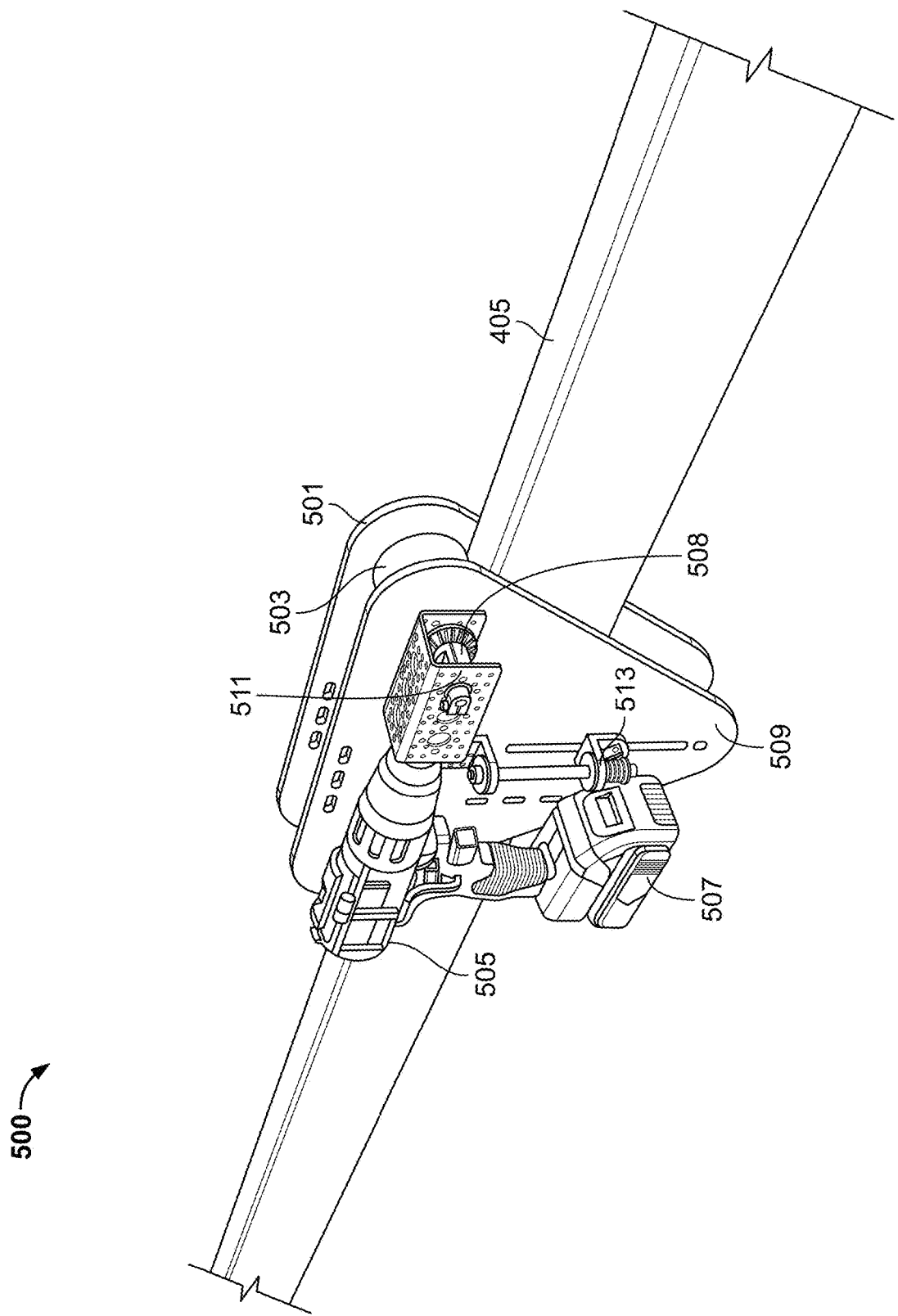
FIG. 5 shows illustrative apparatus in accordance with principles of the disclosure.

FIG. 5 shows illustrative drillbot 500. Drillbot 500 may include one or more features of drillbots 409, 411 and 413 (shown in FIG. 4). Drillbot 500 is shown on rail 405. Drillbot 500 is powered by drill 505. Drill 505 may be powered by battery pack 507.

A drill bit affixed to drill 505 may be coupled to drive axle 508. Using dill 505 to drive axle 508 may provide operational advantages. For example, using dill 505 to drive axle 508 may provide relatively high torque, ease of portability, battery compatibility (with other drillbots), ergonomics and a dual speed clutch. Drill 505 may drive axle 508 even when a drillbot is carrying a heavy payload, such as a full 1 or 5 gallon can of paint.

Drive axle 508 is mounted onto frame 509 by bracket 511. Rotational movement provided by drill 505 may turn drive axle which may, in turn, drive wheel 501. Wheel 501 may include a coefficient of friction that allows drill 505 to drive wheel 501 along rail 405 without losing traction. Wheel 501 and drive axle 508 may be secured to frame 509 by opposing frame 501.

Drillbot 500 may include a microcontroller (not shown). The microcontroller may control torque applied by drill 505 to drive axle 508. For example, the microcontroller may determine a direction of the torque. A direction of the torque may determine which direction drillbot 500 moves along rail 405.

The microcontroller may control a magnitude of torque applied by drill 505 to drive axle 508. The magnitude of the torque may determine how fast drillbot 500 moves along rail 405. The microcontroller may receive motion control instructions from custom software. The custom software may coordinate motion of control of two or more drillbots. The microcontroller may communicate with drill 505 via wired or wireless communication links. The microcontroller may communicate with the custom software via any suitable communication link.

As disclosed herein, illustrative communication links may utilize any suitable protocol over any suitable transmission medium. For example, illustrative communication links may include radio transmission, wired, auditory, light/infra-red etc.

Drillbot 500 includes adjustability mechanism 513. Adjustability mechanism 513 may adjust how snugly drillbot 500 is secured to rail 405. In some embodiments, adjustability mechanism 513 may be dynamically controlled by the microcontroller or custom software.

Dynamic adjustment of adjustability mechanism 513 may inject a tunable level of noise or "controlled chaos" into marks produced by a painting machine that includes drillbot 500. Likewise, dynamic adjustment of torque supplied by drill 505 may inject a tunable level of noise or "controlled chaos" into marks produced by a painting machine that includes drillbot 500.

Figure 6:
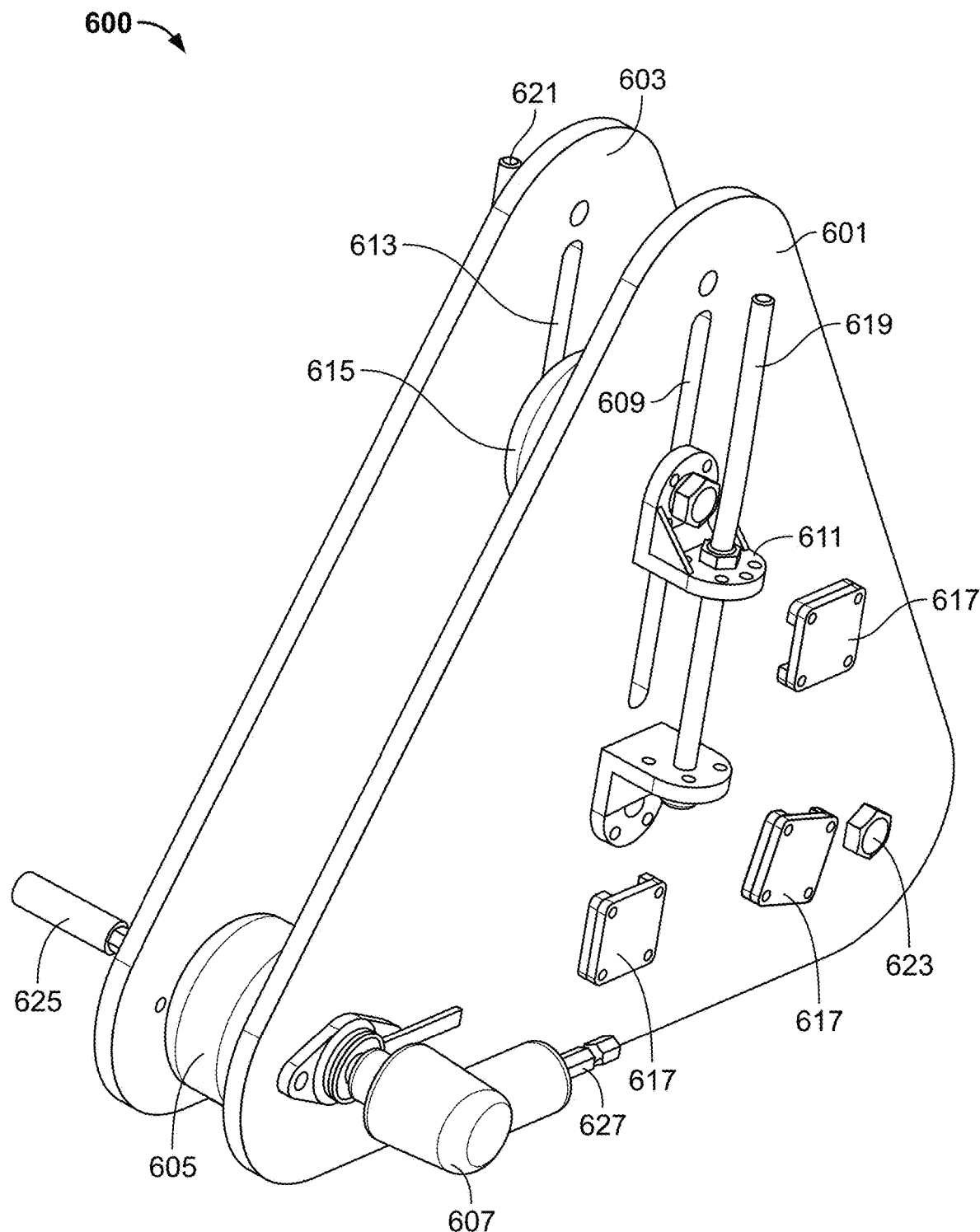
FIG. 6 shows illustrative apparatus in accordance with principles of the disclosure.

FIG. 6 shows illustrative drillbot components 600. Components 600 include frame 601. Frame 601 includes adjustability channel 609. Components 600 include frame 603. Frame 603 includes adjustability channel 613. A position of wheel 615 may be adjusted by moving bracket 611, and an associated axle running though wheel 615, along posts 619 and 621. The axle running though wheel 615 may be moveable within channels 613 and 609. Frames 601 and 603 may provide support for wheel axles such as wheel axle 623.

Components 600 include spacers 617. Spacers 617 may position a drill (such as drill 505, shown in FIG. 5) on frame 601 with respect to drill bit 627. Drill bit 627 may be rotational coupled to drive axle 625 via coupling 607. Coupling 607 may transfer rotation of drill bit 627 (provided by drill 505) into rotation of drive axle 625. Drivel axle 625 may drive wheel 605.

Figure 7:
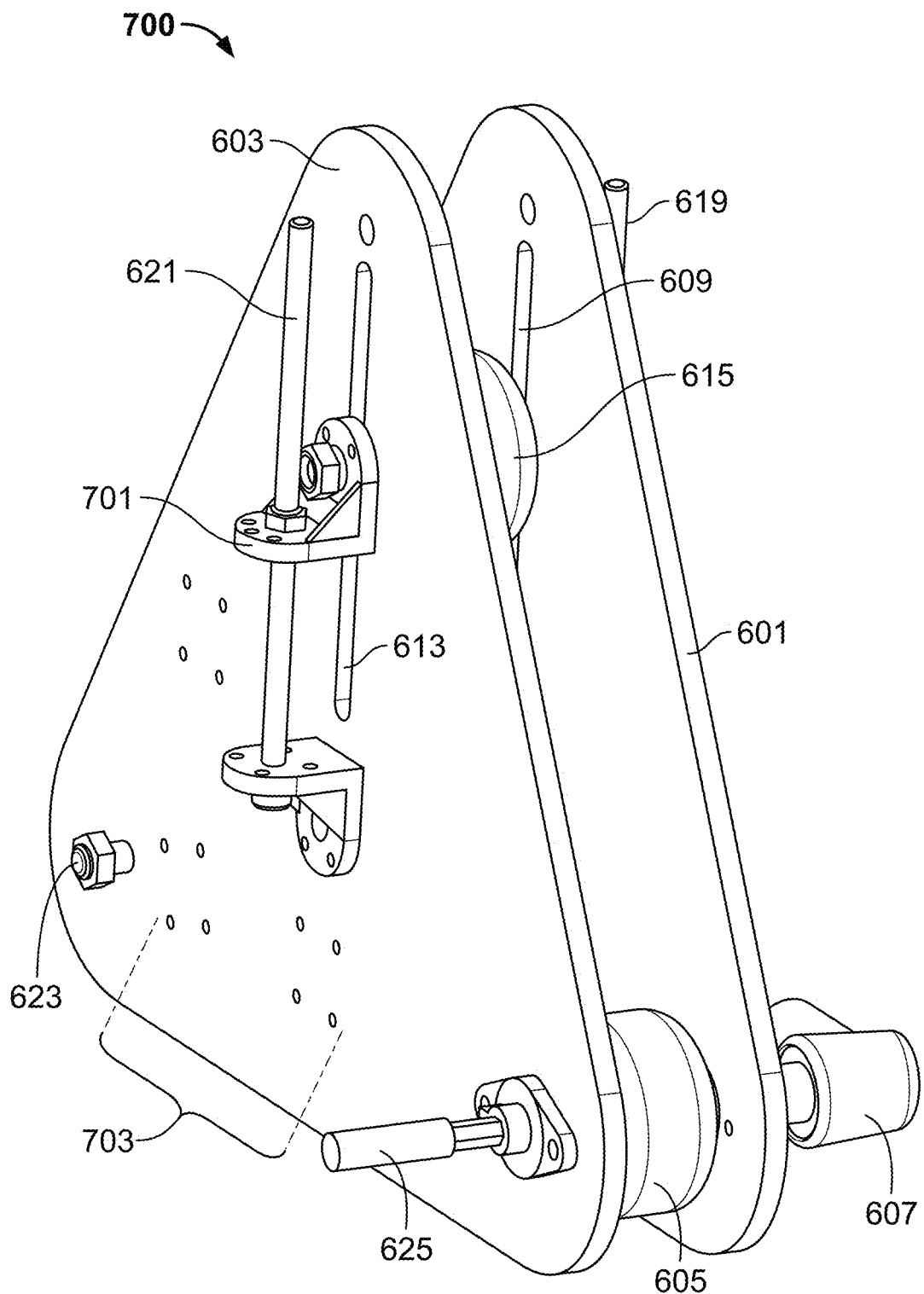
FIG. 7 shows illustrative apparatus in accordance with principles of the disclosure.

FIG. 7 shows illustrative view 700 of drillbot components 600 (shown in FIG. 6). View 700 shows that frame 603 includes holes 703. Spacers, such as spacers 617 (shown in FIG. 6) may by attached to frame 603 via holes 703. The spacers may position a drill, such as drill 505, on frame 603.

View 700 also shows bracket 701. A position of wheel 615 may be adjusted by moving bracket 707, and an associated axle running though wheel 615, within channels 613/609 and along posts 619/621.

Figure 8:
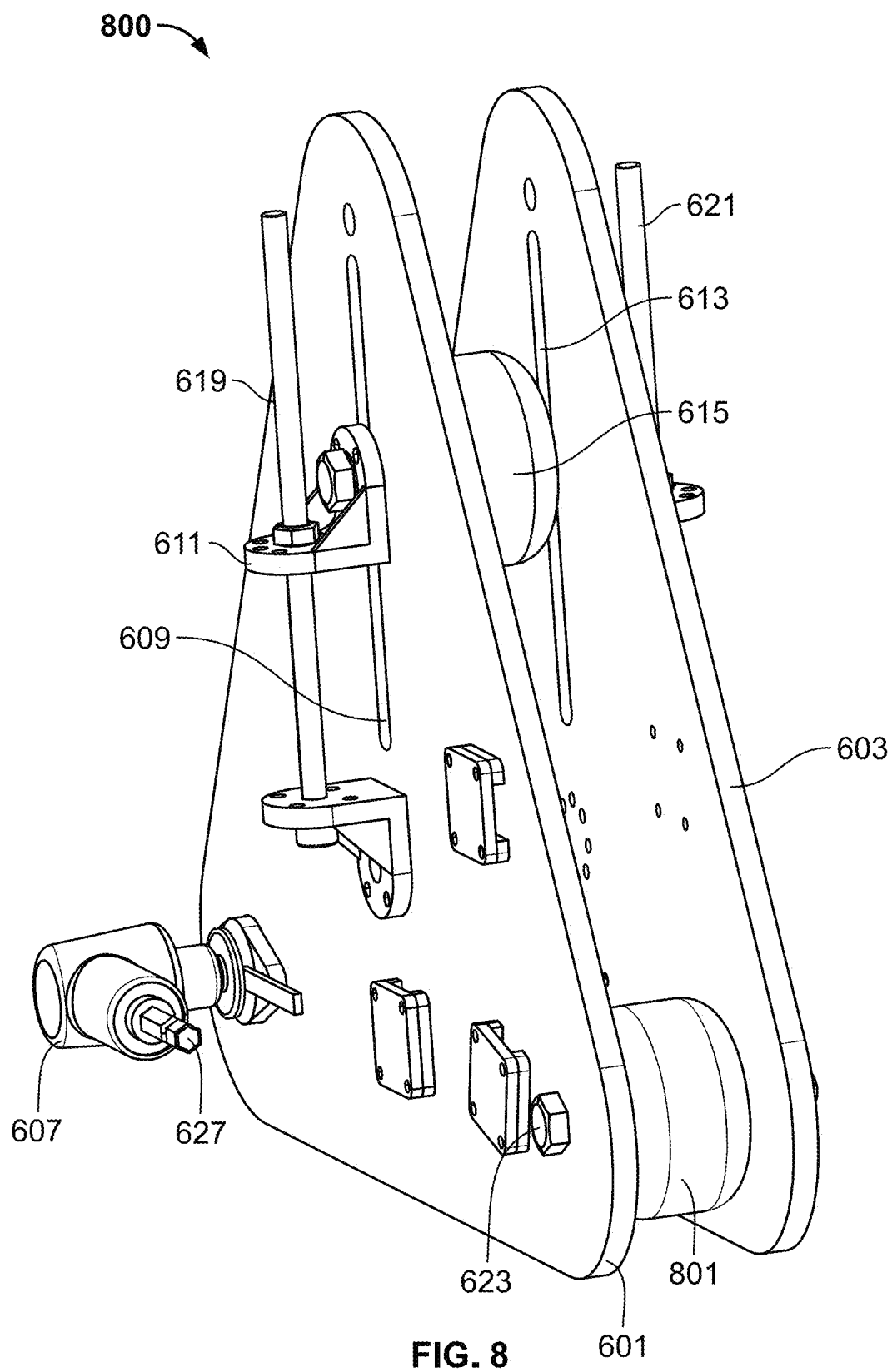
FIG. 8 shows illustrative apparatus in accordance with principles of the disclosure.

FIG. 8 shows illustrative view 800 of drillbot components 600 (shown in FIG. 6). View 800 shows wheel 801. Frames 601 and 603 may support axle 623 that runs through wheel 801.

Figure 9:
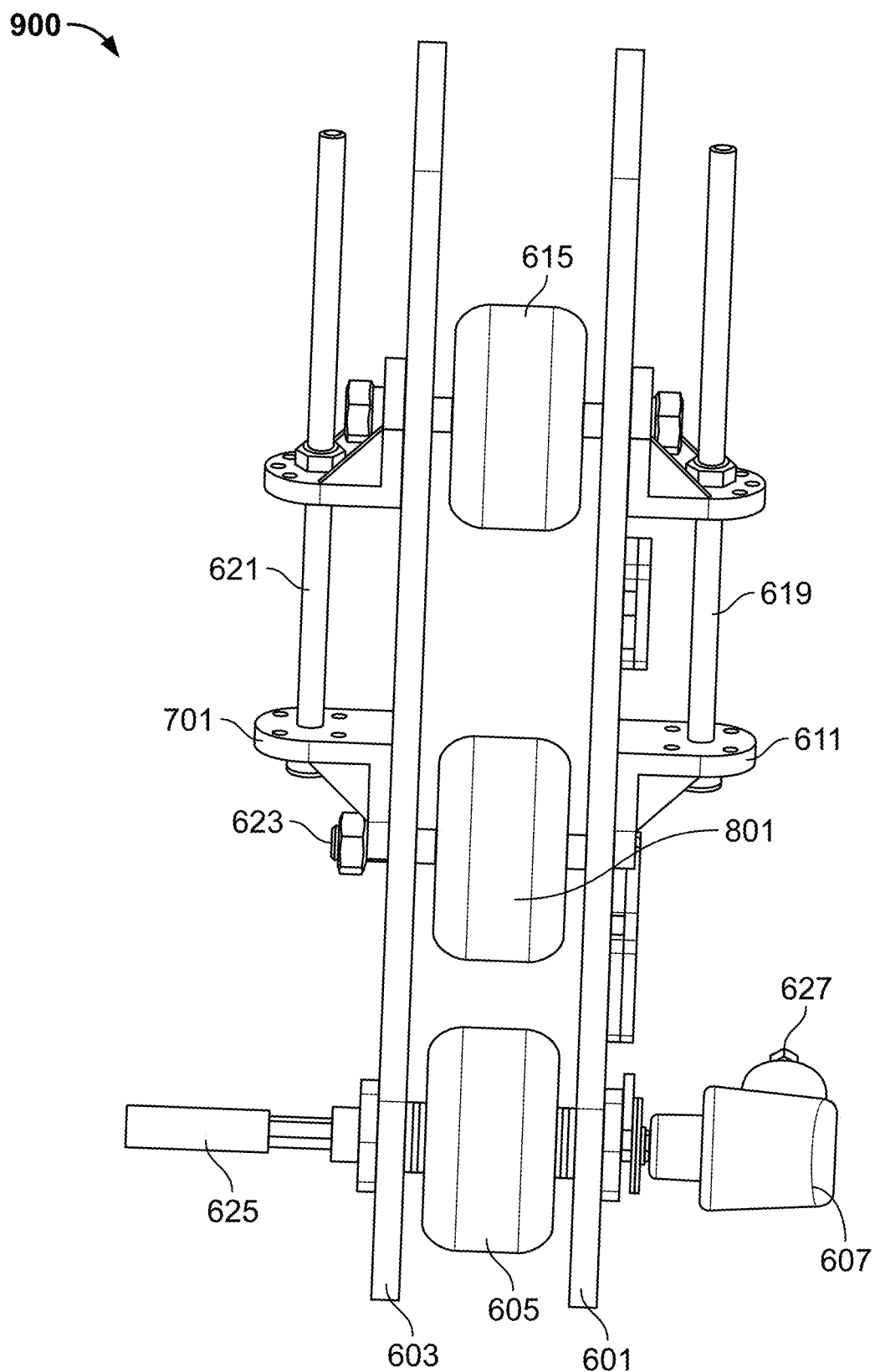
FIG. 9 shows illustrative apparatus in accordance with principles of the disclosure.

FIG. 9 shows illustrative view 900 of drillbot components 600 (shown in FIG. 6). View 900 shows wheels 605, 801 and 615. Wheel 605 may be drive wheel and is coupled to drive axle 625. Drive axle 625 may be driven by drill 505 (shown in FIG. 5). Drive axle 625 may turn wheel 605 and move a drillbot along a rail. Wheels 605 and 801 may be positioned on a first side of a rail. Wheel 615 may be positioned on an opposing side of the rail.

A triangular shape of frames 601 and 603 may allow a particular wheel to be positioned on any desired side of a rail. For example, drive wheel 605 may be positioned on a first side of a rail and wheels 801 and 615 may be positioned on an opposing side of the rail.

Figure 10:
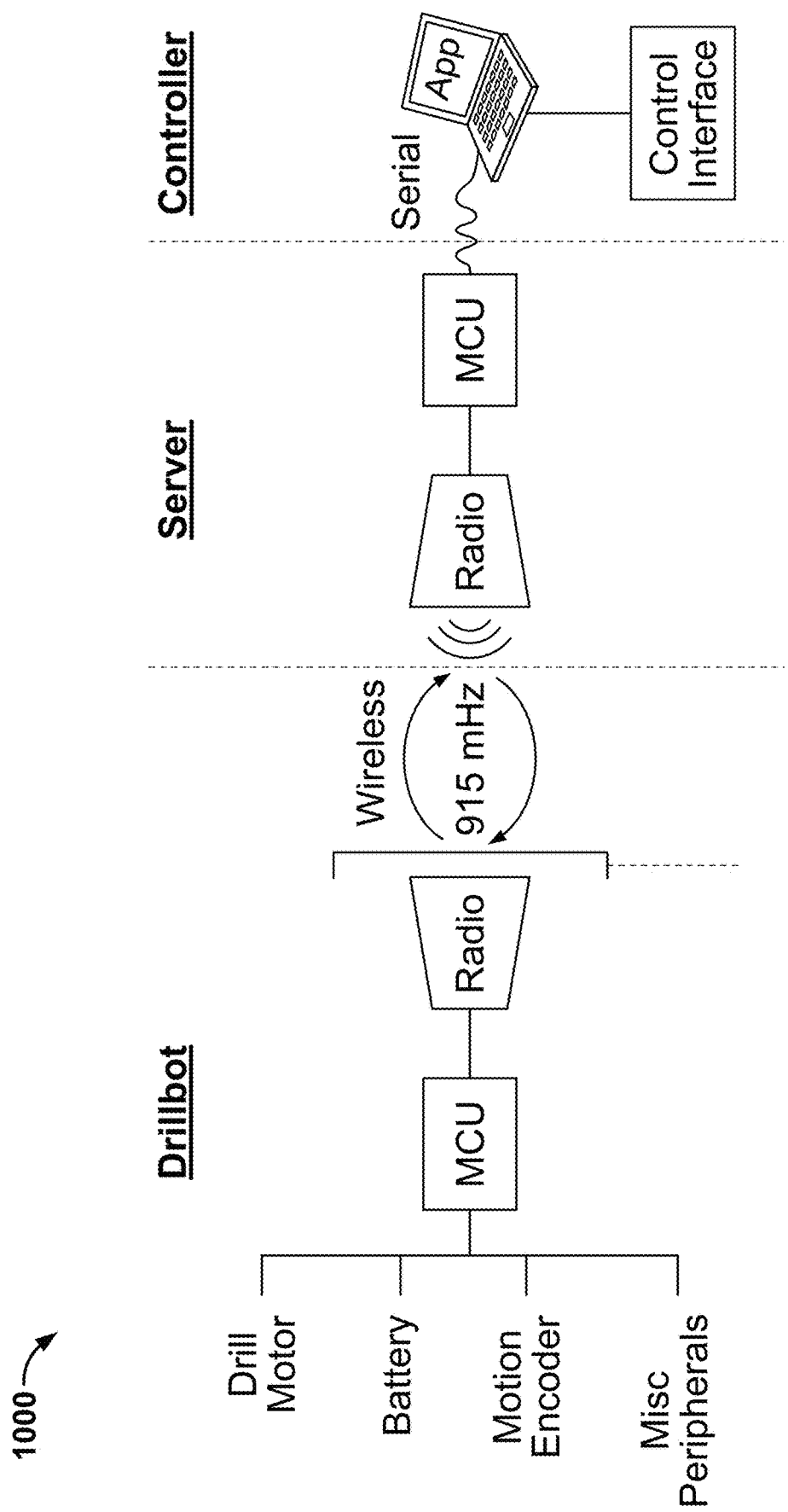
FIG. 10 shows illustrative apparatus in accordance with principles of the disclosure.

FIG. 10 shows illustrative system components 1000 of a painting machine that includes drillbots. System components 1000 include drillbot components. Drillbot components include a drill motor. Drillbot components include a battery. The battery may be used to power the drill motor. The battery may be used to power movement of an end effector coupled to a drillbot.

Drillbot components include a motion encoder. The motion encoder can be used for velocity of positional feedback. Drillbot components may include miscellaneous peripheral devices.

A drillbot may include a microcontroller unit (MCU). The MCU may control operation of the drill and/or drillbot. For example, the MCU may adjust torque generated by the drill motor. The MCU may change a direction of torque generated by the drill motor. The MCU may change a magnitude of torque generated by the drill motor. The MCU may control the drill motor such that a wheel driven by the drill motor moves the drillbot along a rail without losing traction. The MCU may alter a speed/acceleration of a drillbot based on motion commands generated by the custom software.

Such motion commands may accounts to a variable payload carried by a drillbot. For example, scenario 400 (shown in FIG. 4) shows a drillbot carrying a paint can and applying paint from the can to surface 401. The MCU may alter a speed/acceleration of a drillbot based on paint remaining in the can.

FIG. 10 shows that the MCU may receive control signals or other instructions using a wireless radio interface. The MCU may include a communication circuit. The communication circuit may include the network interface, adapter or other hardware for receiving and transmitting communication signals. FIG. 10 shows that a MCU may wireless communicate using a 915 mHz signal.

FIG. 10 shows that the MCU on the drillbot may receive wireless signals from a radio transmitter. The radio transmitter may be controlled by another MCU of a computer server.

A computer server may include hardware, such as one or more integrated circuits that form a chipset. The hardware may include digital or analog logic circuitry configured to perform any suitable (e.g., logical) operation. A computer server may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: electronic input data, paint plan data, motion plan data or any other suitable information or data structures. Components of a computer server may be linked by a system bus, wirelessly or by other interconnections. Server components may be present on one or more circuit boards. In some embodiments, the components may be integrated into a single chip. The chip may be silicon-based.

The server may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Custom software applications may be stored within the non-transitory memory and/or other storage medium. The custom software applications may provide instructions to the processor for executing paint and motion planning. Alternatively, some or all of computer executable instructions of the custom software may be embodied in hardware or firmware components of a drillbot, mounting system or other painting machine components.

As shown in FIG. 10, a computer server may operate in a networked environment. The server may be part of two or more networks. The server may support establishing network connections to one or more remote servers. Network connections may include a local area network ("LAN") and a wide area network ("WAN"), and may also include other networks. When used in a LAN networking environment, a node may be connected to the LAN through a network interface or adapter.

When used in a WAN networking environment, a server may include a modem, antenna or other circuitry for establishing communications over a WAN, such as the Internet. The communication circuit may include the modem.

The existence of any of various well-known protocols such as TCP/IP, Ethernet, FTP, HTTP and the like is presumed, and a server can be operated in a client-server configuration to permit a user to retrieve web pages from a web-based server. Web browsers can be used to display and manipulate data on web pages.

FIG. 10 also shows the computer server may be linked to a controller. The controller may a mobile device such as a tablet, laptop or other personal computing devices. The controller may also be a smartphone, other "smart" devices (e.g., watches, eyeglasses, clothing having embedded electronic circuitry) or any other suitable device for receiving, storing, transmitting and/or displaying electronic information.

The controller may provide access to a control interface. The control interface may include a GUI.

Figure 11:
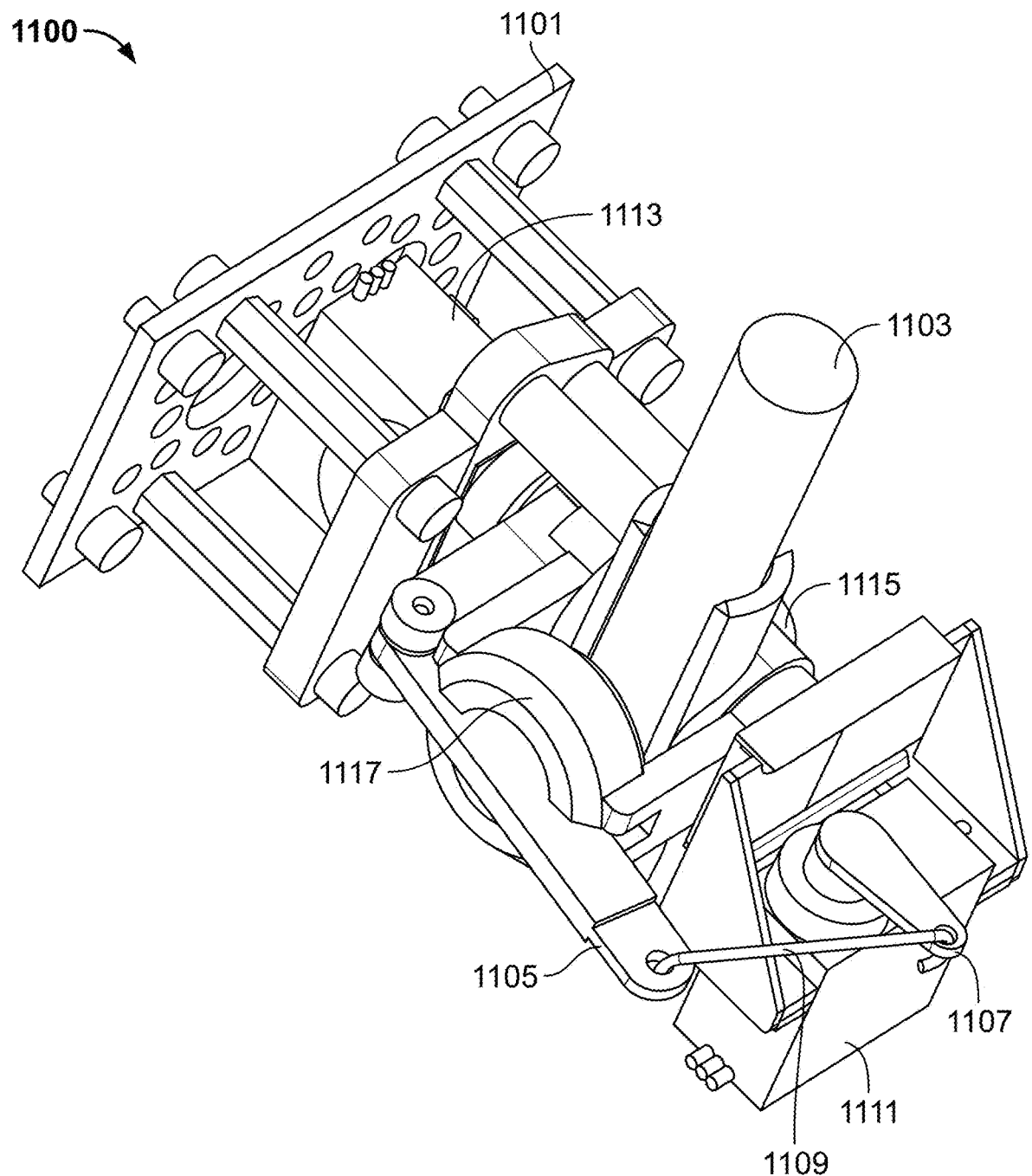
FIG. 11 shows illustrative apparatus in accordance with principles of the disclosure.

FIG. 11 shows illustrative end effector 1100 that includes an air brush tool. End effector 1100 may be mounted to tool plate 1101. Tool plate 1101 may be affixed to a mounting system of a painting machine. End effector 1100 may include paint stored in a reservoir. Paint from the reservoir may be mixed with compressed air carried via conduit 1115.

The compressed air may atomize the paint spraying fine "mist" of paint onto a surface. Marks made by an airbrush may be controlled by regulating a proportion of air and paint mixed within airbrush body 1103. End effector 1100 includes actuator 1105. Actuator 1105 may regulate an amount of compressed air that enters airbrush body 1103. End effector 1100 includes actuator 1107. Actuator 1107 may regulate an amount of paint that enters airbrush body 1103. Actuator 1105 may also control an amount of paint that enters airbrush body 1103.

Actuator 1105 may be mechanically linked to actuator 1107 via member 1109. Member 1109 may allow a movement of actuator 1107 to trigger movement of actuator 1105. Member 1109 may allow a movement of actuator 1105 to trigger movement of actuator 1107.

Actuators 1105 and 1107 may be moved by member 1117. End effector 1100 may combine two actuators into a single actuator. An airbrush may include a button that controls flow on/off, and this button can be angled to control flow rate. Member 1117 is a cylinder positioned around the button and allows the button to be angled by coupling member 1117 to a servomechanism (e.g., 1113 or 1111). Member 1117 is crossed by actuator 1105, which may be depressed to actuate the button using another servomechanism (e.g., either 1113 or 1111).

End effector 1100 includes motor 1111. Motor 1111 may be a servomechanism. Motor 1111 may control movement of actuator 1107. End effector 1100 includes motor 1113. Motor 1113 may be a servomechanism. Motor 1113 may control movement of actuator 1105.

End effector 1100 may include a single-action mechanism that regulates air flow into airbrush body 1103. End effector 1100 may include a dual or double-action mechanism that allows for simultaneous adjustment of both air and paint/color.

End effector 1100 may include two or more reservoirs of paint. Paint stored in a first reservoir may be mixed with paint stored in a second reservoir to create a desired color or consistency. In some embodiments, paint stored in a reservoir may not be regulated by actuator 1105.

Movement of actuators 1105 and 1107 may be controlled by custom software and paint/motion plans generated by the custom software. For example, the proportion of air and paint mixed within airbrush body 1103 may be controlled by the custom software. The custom software may control the proportion of air and paint mixed within airbrush body 1103 based on electronic input data. The custom software may control the proportion of air and paint mixed within airbrush body 1103 based on a location of end effector 1100 relative to a surface.

Custom software may coordinate actuation of actuators 1107 and 1105 by motors 1111 and 1113. Coordinated control of actuators 1105 and 1107 may regulate a proportion of paint/air that enters airbrush body 1103. Coordinated control of actuators 1105 and 1107 may regulate mixing of paint from two or more reservoirs.

The custom software may control a degree of atomization of paint stored in a reservoir. The custom software may control any suitable aspect of airbrush end effector 1100 to produce a desired mark on a surface.

Figure 12:
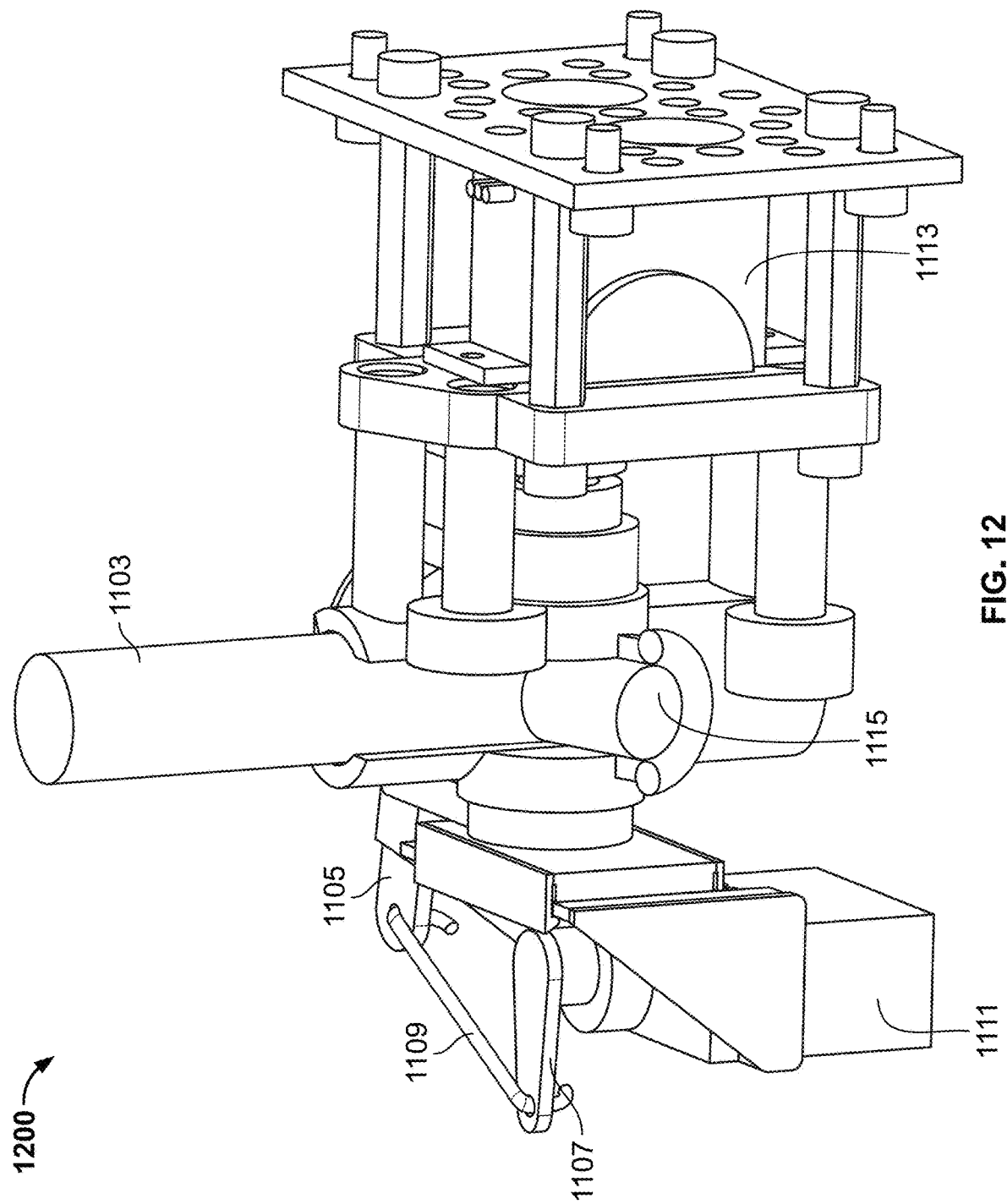
FIG. 12 shows illustrative apparatus in accordance with principles of the disclosure.

FIG. 12 shows an illustrative view 1200 of end effector 1100 (shown in FIG. 11).

Figure 13:
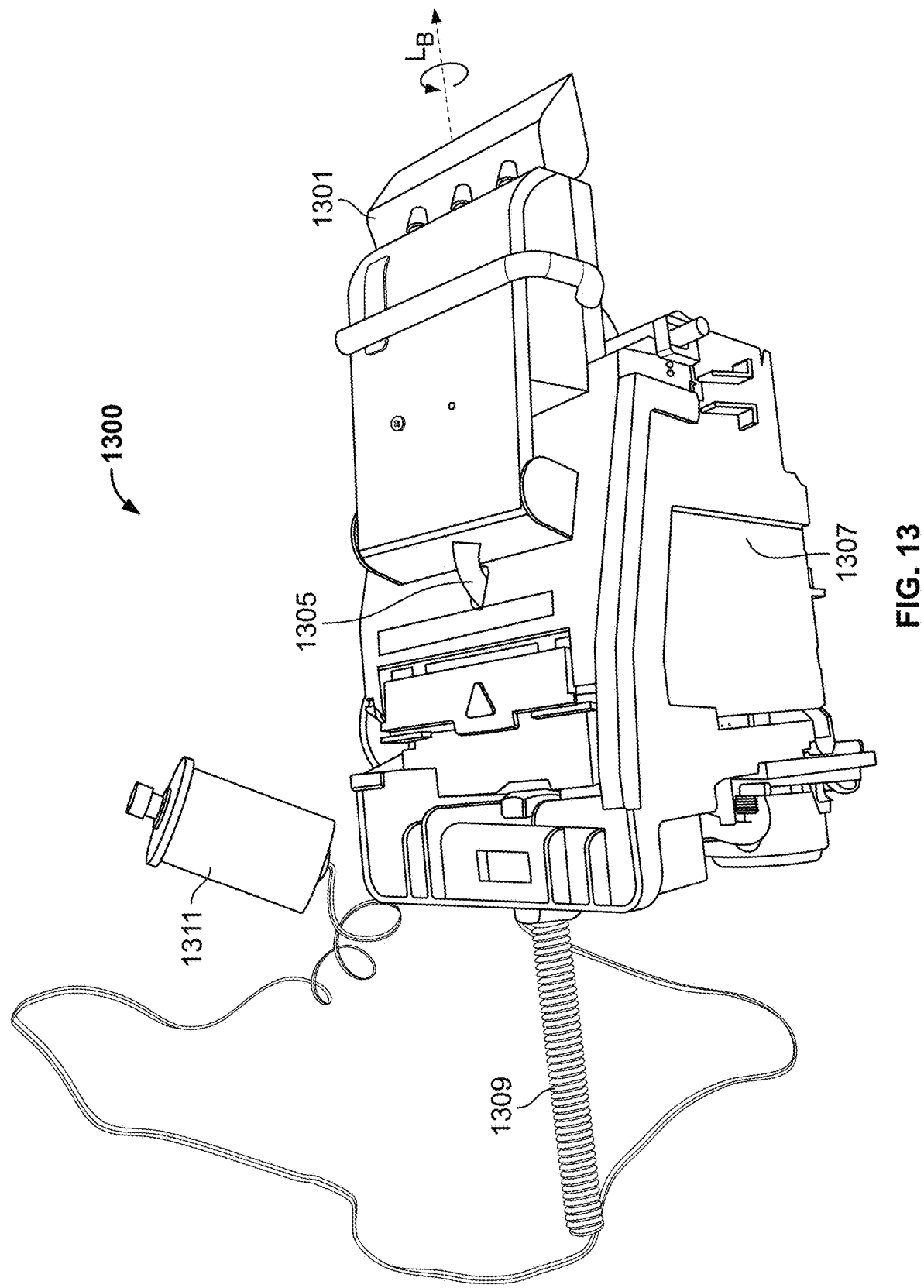
FIG. 13 shows illustrative apparatus in accordance with principles of the disclosure.

FIG. 13 shows illustrative end effector 1300 that includes a paint brush tool. End effector 1300 includes applicator 1301. Applicator 1301 may include bristles. Applicator 1301 may include a foam applicator. End effector 1300 may be configured to rotate about axis LB. End effector 1300 may be configured to rotate during movement over a surface. End effector 1300 may be rotated or moved based on paint/motion plans generated by the custom software.

End effector 1300 includes housing 1307. Housing 1307 may store a paint reservoir. Paint from the reservoir may be transferred to toe 1301 via conduit 1305. An amount of paint transferred to applicator 1301 may be controlled by the custom software.

End effector 1300 may be affixed to a mounting system via member 1309. The mounting system may move end effector 1300 rotationally or longitudinal, based on paint/motion plans generated by the custom software.

End effector 1300 includes actuator 1311. Actuator 1311 may allow a creator to dynamically change a behavior of end effector 1300 while end effector is operating under control of the custom software. For example, using actuator 1311, a creator may add more paint to applicator 1301. Using actuator 1311, a creator may suspend application of paint by applicator 1301. While application of paint is suspended, end effector 1311 may continue to follow a motion plan computed by the custom software. Using actuator 1311, a creator may change a color of paint applied by applicator 1301.

Figure 14:
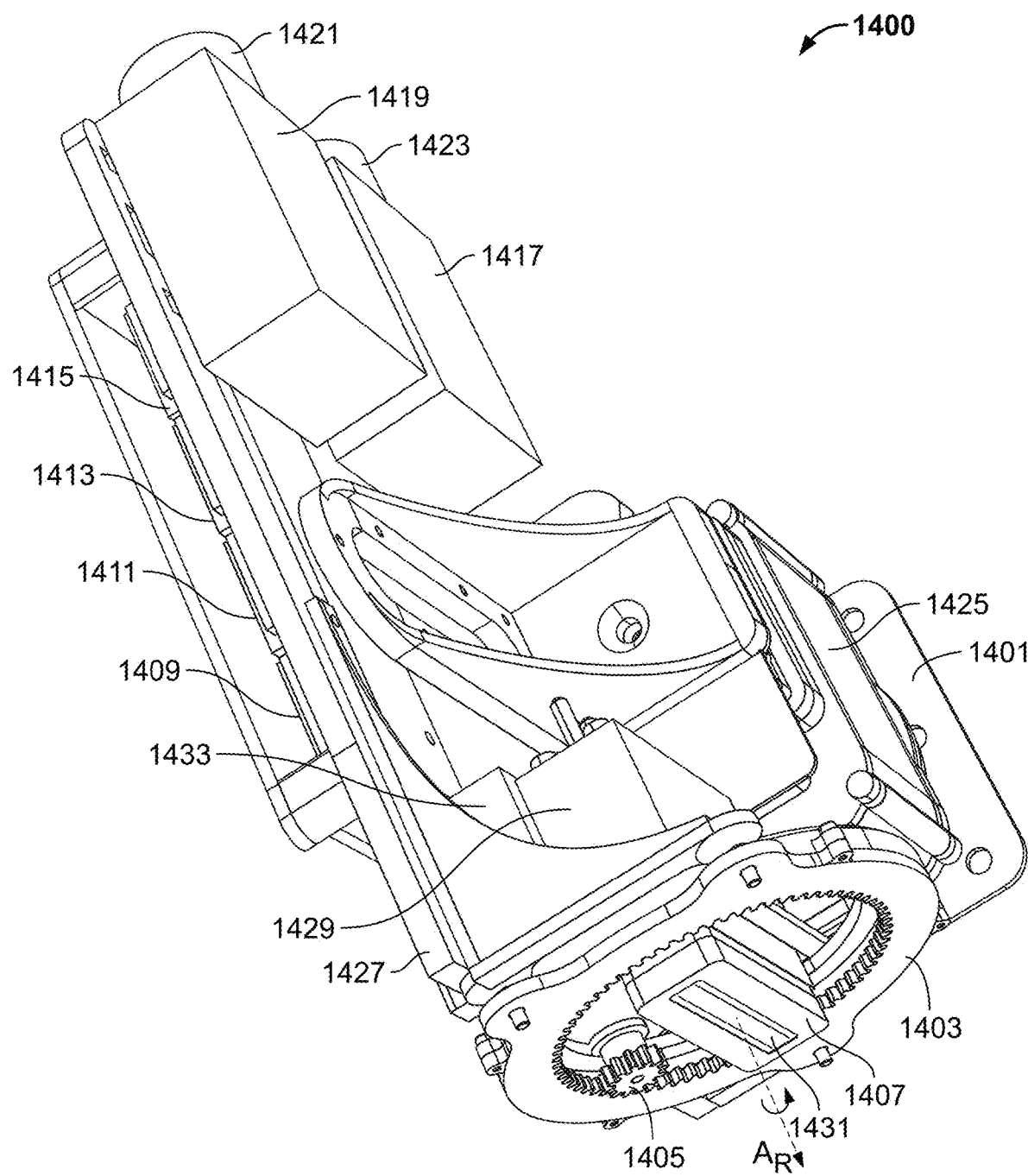
FIG. 14 shows illustrative apparatus in accordance with principles of the disclosure.

FIG. 14 shows illustrative end effector 1400 that includes inkjet head 1407. Inkjet head 1407 includes nozzle array 1431. Nozzle array 1431 may include any suitable number or arrangement of nozzles that release paint/ink from inkjet head 1407 onto a surface. End effector 1400 may include paint reservoirs 1419 and 1417. Each paint reservoir may store paint.

End effector 1400 may include a multiplexing mechanism for selecting a source of paint (or other chemical) from one of many reservoirs. The multiple reservoirs may be multiplexed via a mechanical mechanism controlled by a computer or human creator.

Pump 1421 may regulate pressure within reservoir 1419. Pump 1423 may regulate pressure within reservoir 1417. In some embodiments, pressure may be manually adjusted. For example, pressure may be manually adjusted by providing an inlet/outlet port for blowing air or sucking air out of an ink/paint circulation system of end effector 1400. Pressure may be manually adjusted using a syringe inserted into an air inlet/outlet port. Manual adjusting pressure may provide noise that produces a mark having a desired visual effect.

End effector 1400 includes circuit boards 1415, 1413, 1411 and 1409. These circuit boards may include one or more microcontroller units that control operation of inkjet head 1407 and associated nozzle array 1431. For example, circuit boards 1415, 1413, 1411 and 1409 may include one or more of a Print Controller Card and Head Driver Card. One or more of circuit boards 1415, 1413, 1411 and 1409 may receive signals from a motion controller or paint planner. Circuit boards 1415, 1413, 1411 and 1409 may receive wireless signals. Circuit boards 1415, 1413, 1411 and 1409 may be affixed to substrate 1427.

End effector 1400 includes motor 1433. Motor 1433 may rotate inkjet head 1407 about axis $A_R$. End effector 1400 includes a planetary gear 1405. Motor 1433 may turn planetary gear 1405. Planetary gear 1405 includes teeth that engage internal gear 1403 and rotate inkjet head 1407 about axis $A_R$. Inkjet head 1407 may be rotated 360° about axis $A_R$.

Inkjet head 1407 may be rotated using the planetary gear 1405, allowing inkjet head 1407 to be oriented along a changing vector path, similar to a brush stroke made by a human creator.

Inkjet head 1407 may be linked to reservoir 1429. Reservoir 1429 may be in fluid communication with reservoirs 1419 and 1423. Pumps 1421 and 1423 may pressurize paint within reservoir 1429.

End effector 1400 may be affixed to a mounting system via tool plate 1401 and bracket 1425.

Figure 15:
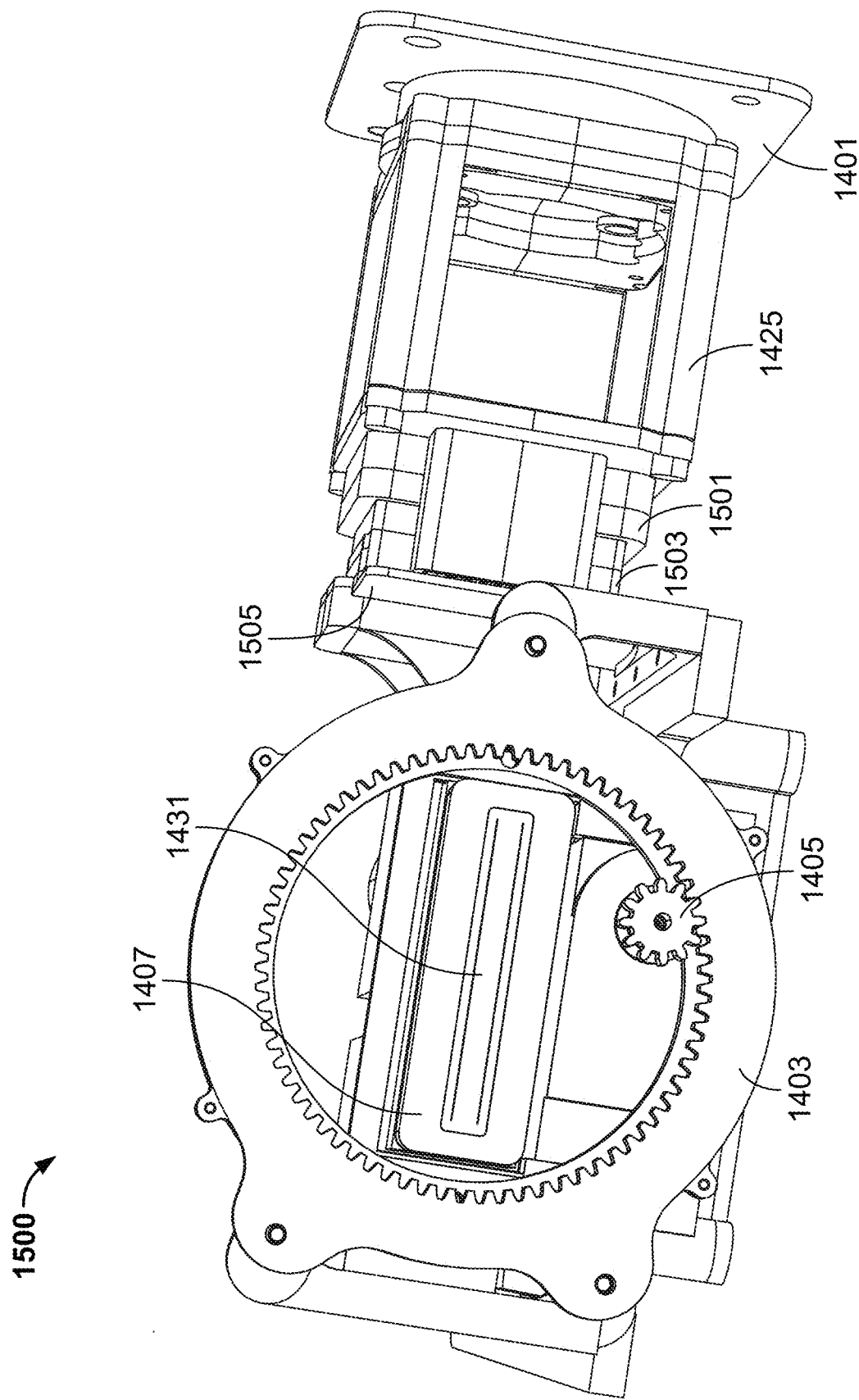
FIG. 15 shows illustrative apparatus in accordance with principles of the disclosure.

FIG. 15 shows illustrative view 1500 of end effector 1400 (shown in FIG. 14). Components 1505, 1503 and 1501 show illustrative adapters that allow an end effector/mounting system to be compatible with interchangeable tools.

Figure 16:
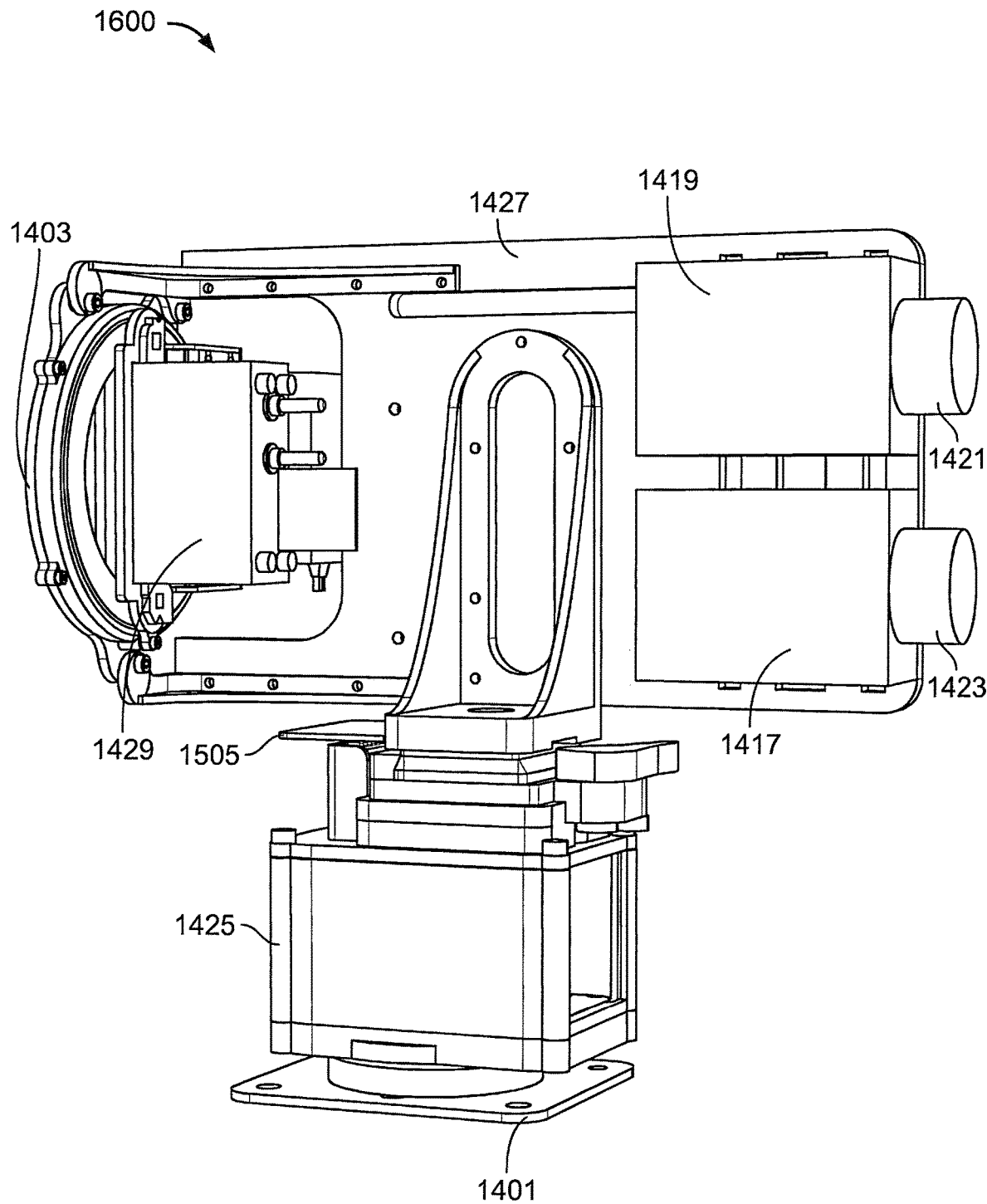
FIG. 16 shows illustrative apparatus in accordance with principles of the disclosure.

FIG. 16 shows another illustrative view 1600 of end effector 1400 (shown in FIG. 14).

Figure 17:
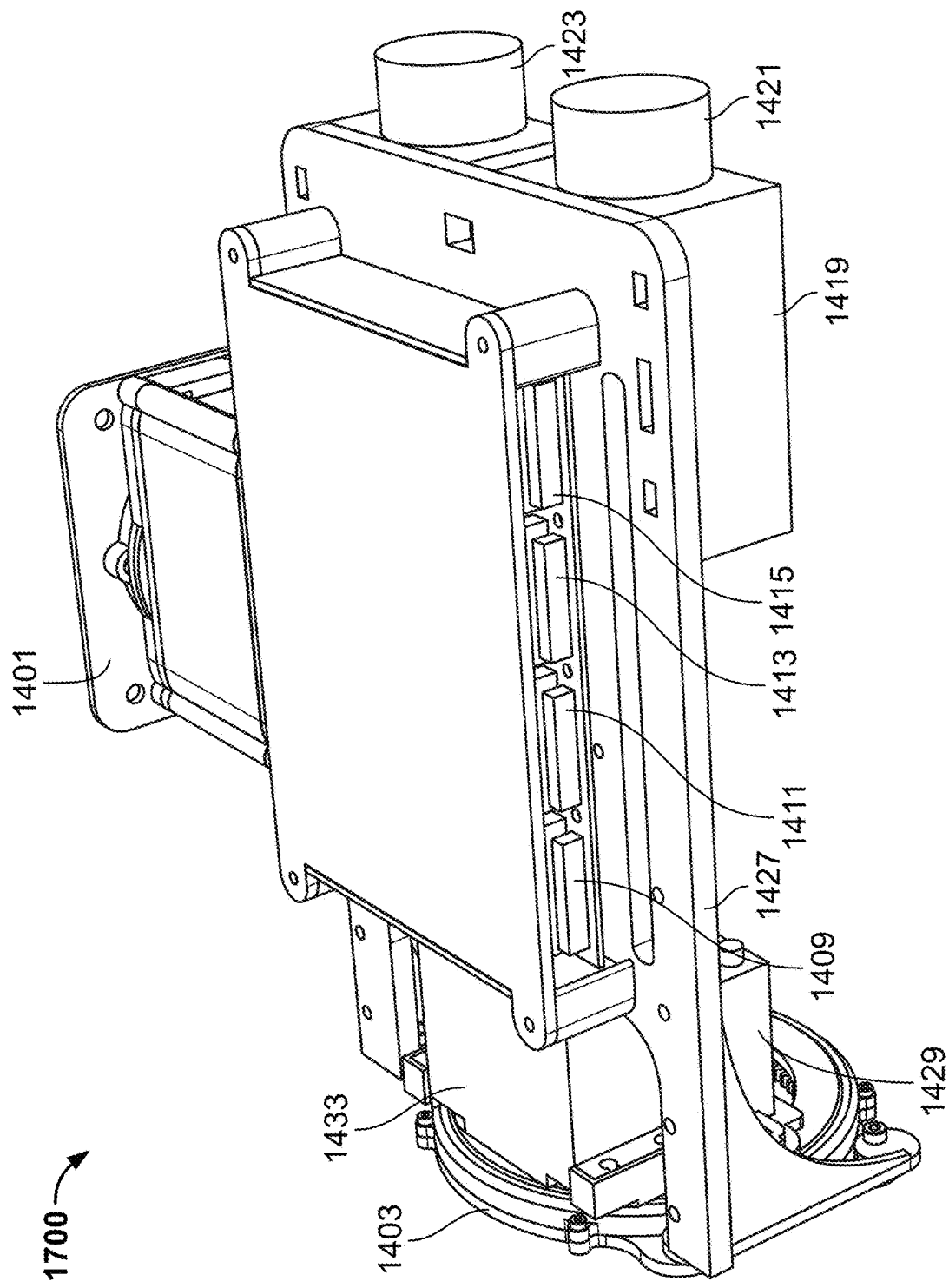
FIG. 17 shows illustrative apparatus in accordance with principles of the disclosure.

FIG. 17 shows yet another illustrative view 1700 of end effector 1400 (shown in FIG. 14).

Figure 18A:
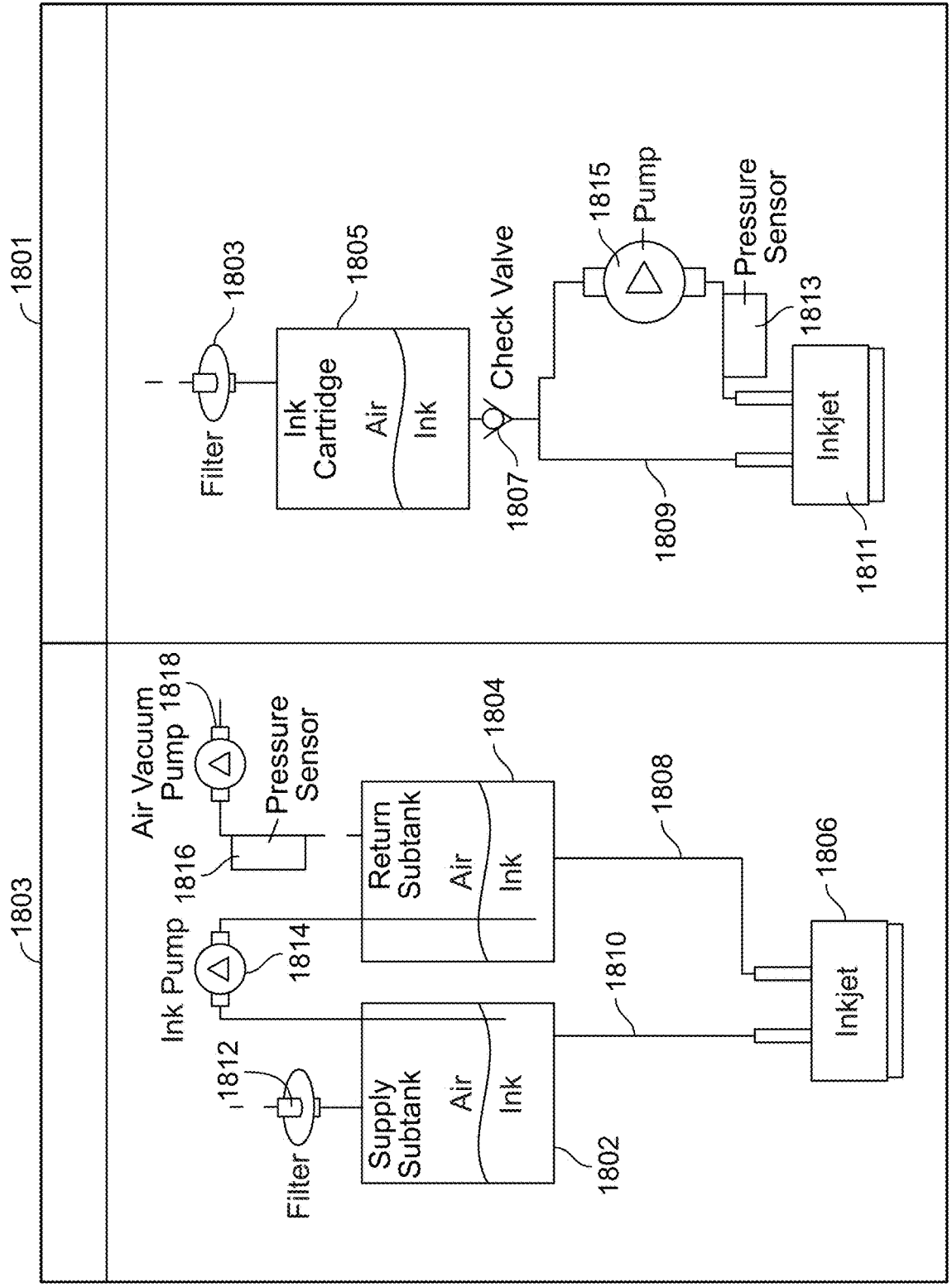
FIG. 18A shows illustrative apparatus in accordance with principles of the disclosure.

FIG. 18A shows illustrative ink circulation systems 1801 and 1803.

System 1803 shows a two reservoir ink circulation system. System 1803 includes reservoir 1802. System 1803 includes reservoir 1804. Ink pump 1814 may move ink from reservoir 1802 to inkjet housing 1806 via conduit 1810. Ink pump 1814 may be configured to move ink through inkjet housing 1806 through conduit 1808 and into reservoir 1804.

Ink pump 1814 may be configured to move ink from reservoir 1804 back into reservoir 1802.

System 1803 includes vacuum pump 1818. Vacuum pump 1818 may be configured to generate pressure within system 1803. Vacuum pump 1818 may generate pressure by extracting air from reservoir 1804. System 1803 includes pressure sensor 1816. Pressure sensor 1816 may monitor pressure generated by vacuum pump 1818. Vacuum pump 1818 may regulate the amount of pressure within system 1803 based on feedback received from pressure sensor 1816.

Inkjet housing 1806 may include an inkjet head (not shown). System 1803 includes filter 1812. Filter 1812 may ensure that ink circulated through inkjet housing 1806 does not contain particles that may clog a nozzle of the inkjet head. Filter 1812 may prevent particles larger than a threshold size from entering reservoir 1802.

FIG. 18A also shows system 1801. System 1801 is an exemplary self-contained ink circulation system. System 1801 may control pressure and ink circulation using pump 1815. Pump 1815 may move ink through conduit 1809.

System 1801 includes reservoir 1805. Ink or other medium may be stored in swap-able reservoirs. Swap-able reservoirs may be added or removed from system 1801.

System 1801 includes valve 1807. Valve 1807 may regulate a flow of ink from reservoir 1805 into conduit 1809. Valve 1807 may regulate the flow of ink from reservoir 1805 into conduit 1809 in response to pressure generated by pump 1815. Pump 1815 may maintain a target pressure in the conduit 1809 and inkjet housing 1811.

System 1801 includes pressure sensor 1813. Pressure sensor 1813 may detect changes in pressure within conduit 1809. Pump 1815 may be responsive to the changes in the pressure detected by pressure sensor 1813. For example, in response to a detected loss of pressure, pump 1815 may increase pressure within conduit 1809 to maintain a target pressure. In response to a detected increase in pressure, pump 1815 may stop pumping or release pressure, to maintain the target pressure.

Pump 1815 may include an Archimedes screw. An Archimedes screw may include a screw within a hollow pipe. Turning the screw moves liquid though the pipe. Conventional pumps rely on mechanisms which move fluid in oscillating bursts. Such bursts may cause pressure waves in an ink circulation system. Such pressure waves may create a turbulent flow which may reduce quality and consistency of painting output using an inkjet head.

An Archimedes screw may provide a fluid pump which induces a constant pressure in conduit 1809 and inkjet housing 1811 and improve a consistency of painting output using an inkjet head included in inkjet housing 1811. The Archimedes screw may be rotated as the armature in an electric motor.

The pump may maintain a target pressure during movement of the receptacle, conduit or end effector. Movement may include rotation of the receptacle, conduit or end effector.

Inkjet housing 1811 may include an inkjet head (not shown). System 1801 includes filter 1803. Filter 1803 may ensure that ink circulated through inkjet housing 1811 does not contain particles that may clog a nozzle of the inkjet head. Filter 1803 may prevent particles larger than a threshold size from entering reservoir 1805.

Figure 18B:
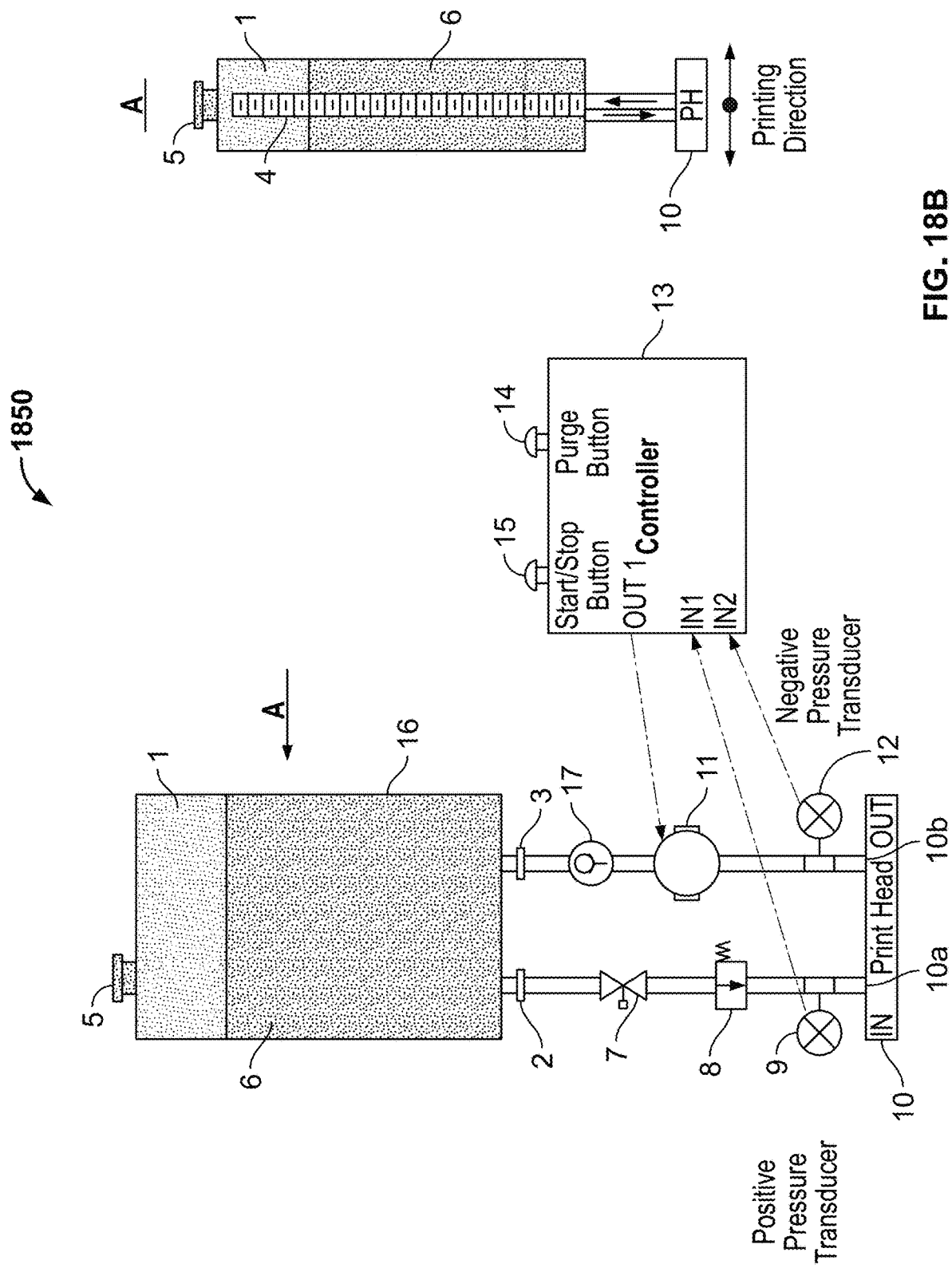
FIG. 18B shows illustrative apparatus in accordance with principles of the disclosure.

FIG. 18B shows system 1850. System 1850 is an exemplary self-contained ink circulation system. Ink cartridge (or reservoir) 16 stores a medium such as ink 6. Ink cartridge (or reservoir) 16 may include a quantity of air 1. Ink cartridge (or reservoir) 16 may be installed above print head 10. Print head 10 may include an arrangement of nozzles. Connections 2 and 3 may mate with ink cartridge 16. Connections 2 and 3 may allow ink cartridge 16 to be swap-able, in or out, of system 1850.

Ink cartridge 16 may include a transparent portion that allows viewing a quantity of ink 6 remaining in ink cartridge 16. For example, view A shows that ink cartridge 16 includes transparent portion 4. Transparent portion 4 also includes marks that correspond to an amount of ink 6 remaining in ink cartridge 16. Transparent portion 4 may also include marks that correspond to an amount of air 1 in ink cartridge 16.

After installing ink cartridge 16 above print head 10, plug 5 may be removed from ink cartridge 16. Removing plug 5 allows ink 6 (inside ink cartridge 16) to be exposed to atmospheric pressure.

In operation, when valve 7 is open, ink 6 flows through damper 8 and positive pressure sensor 9 to print head 10. Ink 6 flows through print head 10 and may fill print head 10.

Suction pump 11 may be activated. Suction pump 11 feed ink through negative pressure sensor 12 back to ink cartridge 16. Suction pump 11 may build a target negative pressure within system 1850. Pressure data received from sensors 9 and 12 are processed and calculated in microcontroller 13. Based on the pressure data, microcontroller may drive appropriate voltages that control operation of pump 11 and maintain a target meniscus pressure.

Preferably, a constant meniscus pressure is maintained. Meniscus pressure is determined, based on pressure at inlet port 10a (measured relative to atmospheric pressure) of print head 10 and pressure at outlet port 10b (measured relative to atmospheric pressure) of print head 10. An illustrative meniscus pressure may be about, or equal to, −10 kPa. However, a target meniscus pressure may be any suitable value for a given print head.

Based positive pressure at inlet port 10a, microcontroller 13 may determine a target negative pressure at outlet port 10b to maintain a target meniscus pressure. A volume of ink 6 inside ink cartridge 16 is a contributor of positive pressure at inlet port 10a and accordingly, influences the meniscus pressure. A volume of ink 6 within ink cartridge 10 may change during operation of a paint machine. Microcontroller 13 may coordinate control of pump 11 to build/maintain the target meniscus pressure.

Using system 1850, ink flow through print head 10 may vary without effecting painting quality as long as a target meniscus pressure is maintained. For example, ink flow may vary from 30 to 100 mL/min.

System 1850 may provide an ink circulation/pressure system that allows a print head to be rotated, twisted, turned (including turning print head 10 upside down) or otherwise moved in any fashion a mounting system is capable of providing, to produce a mark defined in an electronic input data.

System 1850 may allow print head 10 to predictably, consistently and reliably produce a mark on surface, regardless of an orientation of print head 10. An end effector that includes system 1850 may predictably, consistently and reliably produce the mark, as defined by the electronic input data.

For example, if a mark is defined by a non-linear pathway that includes 360° rotation (about any axis), twisting, turning, or any other movement a mounting system is capable of providing, an end effector that includes system 1850 may predictably, consistently and reliably produce the mark, as defined by the electronic input data.

Ink cartridge 16 may include a volume of ink 6 that is in acceleration and causes pressure blows. A design of ink cartridge 16 may reduce pressure blows. Preferably, ink cartridge may have a narrow base in relation to an acceleration axis.

Microcontroller 13 may include push button 14. Button 14 may trigger a purging of print head 10. Microcontroller 13 may include button 15. Button 15 may trigger a shutdown of system 1850. Button 15 may stop operation of pump 11 and close valve 7.

Suction pump 11 may be peristaltic. Suction pump 11 may be an Archimedes screw. When suction pump 11 is non-peristaltic, a valve 17 may be added to system 1850. Valve 17 may be a non-return valve that prevents ink 6 from leaking out of print head 10 when system 1850 is powered off or in the event of a power failure. Actuation of button 15 may trigger closing of valve 17.

Figure 18C:
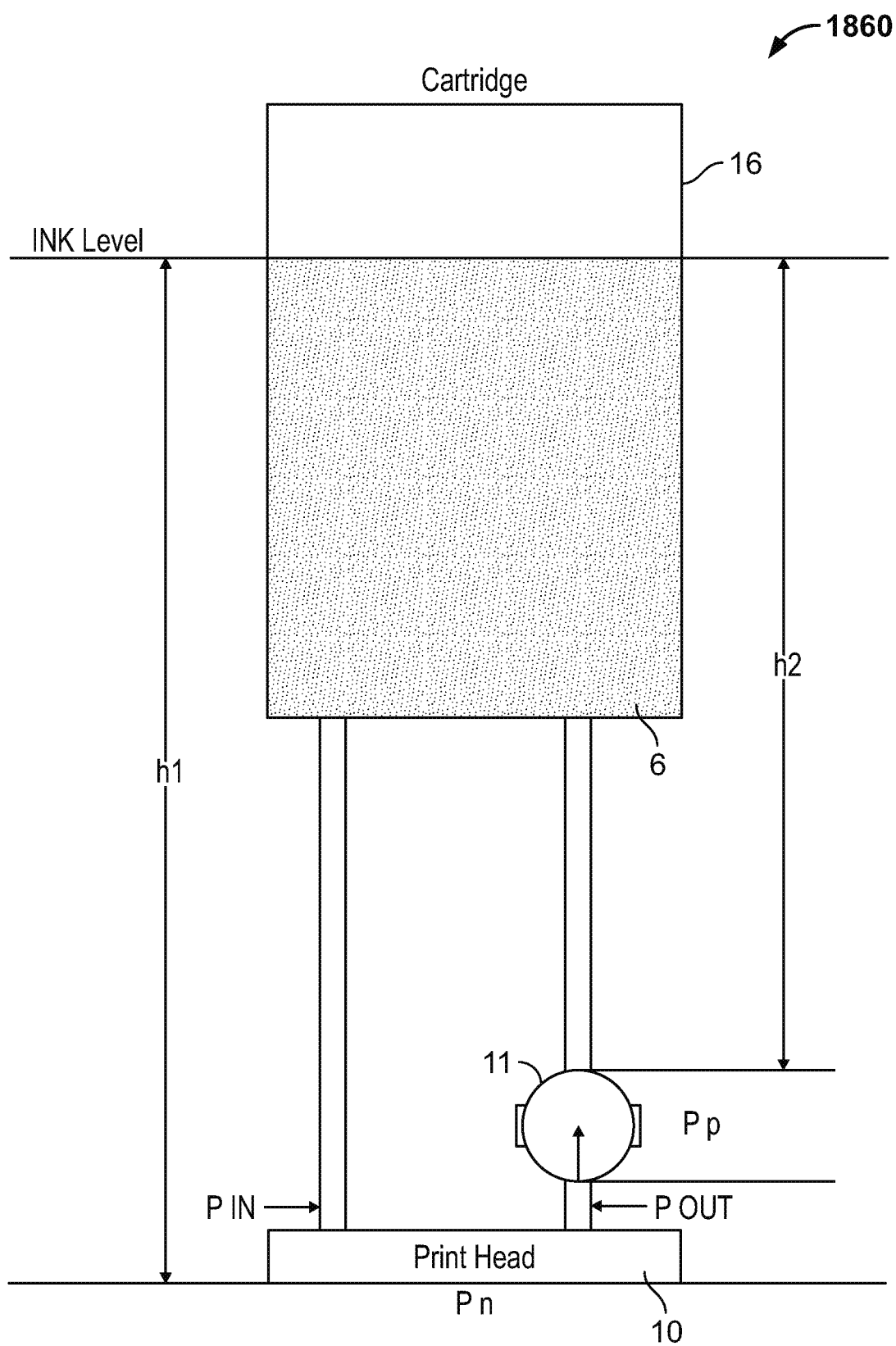
FIG. 18C shows illustrative apparatus in accordance with principles of the disclosure.

FIG. 18C shows illustrative criteria 1860 for determining a meniscus pressure. A meniscus pressure may be determined based on assuming that a flow channel resistance is similar at both Pin and Pout. A meniscus pressure may be determined at time the print head is not printing/painting.

Criteria 1860 include:
Pn—nozzle pressure in kPa;
Sp—ink specific gravity in kg/m3;
g—Earth gravity 9.8 m/s2;
h1—positive-pressure ink height (in mm);
h2—negative-pressure ink height (in mm); and
Pp—pump pressure in kPa.

Based on criteria 1860, microcontroller 13 may determine a meniscus pressure based on the following: Pp=2*Pn−Sg*g(h1+h2)*10E-6.

Figure 18D:
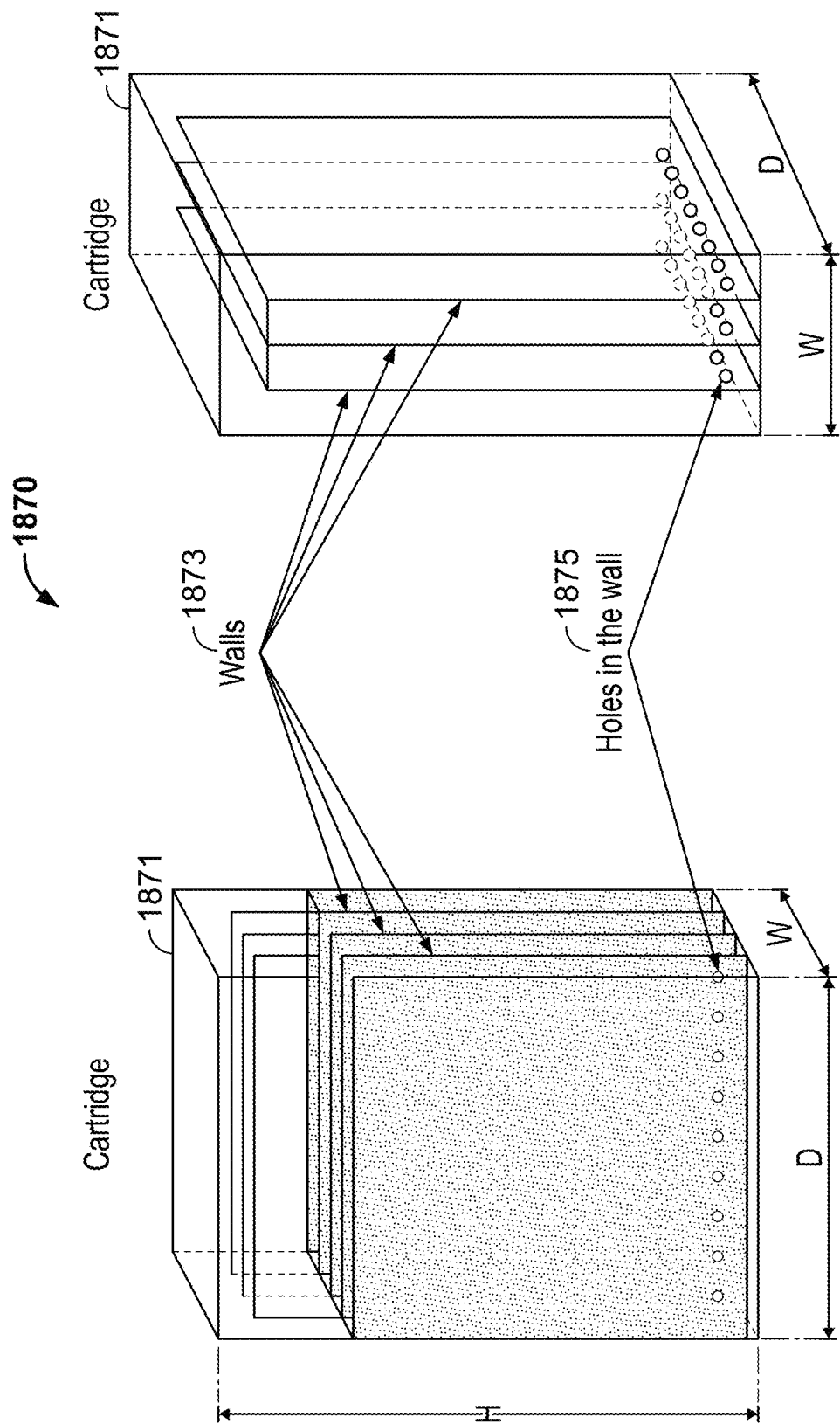
FIG. 18D shows illustrative apparatus in accordance with principles of the disclosure.

FIG. 18D shows illustrative views 1870 of ink cartridge 1871. Ink cartridge 1871 may include one or more features of ink cartridge 16 (shown in FIG. 18B). A volume of ink (or other medium) 6 contained within ink cartridge 1870 may be defined by H*W*D. To reduce pressure blows, it is preferable to decrease W. To maintain a target volume of ink H may be increased. Furthermore, ink cartridge 1870 includes internal walls 1873. Internal walls 1873 may reduce an impact of dynamic wave pressure due to movement of ink 6 within ink cartridge 1871. Holes 1875 in a bottom of internal walls 1873 may provide for static pressure balance between volumes of ink 6 separated by internal walls 1873.

Figure 19:
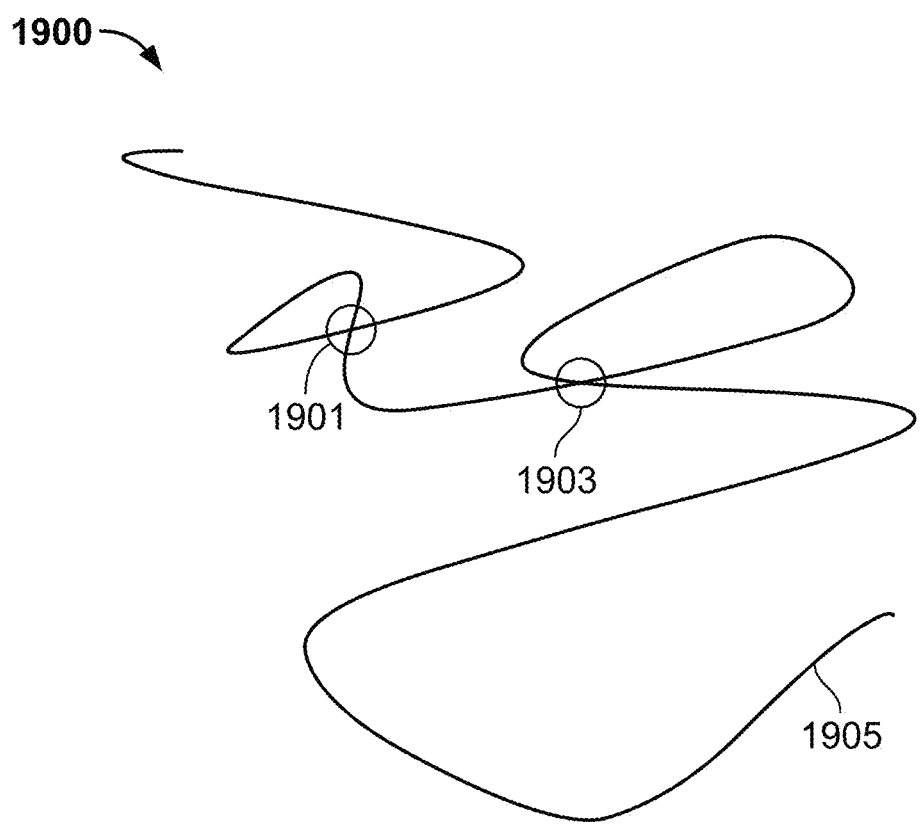
FIG. 19 shows an illustrative painting scenario in accordance with principles of the disclosure.

FIG. 19 shows illustrative mark 1900. Mark 1900 may be defined by electronic input data. Mark 1900 follows a non-linear pathway. Mark 1900 includes overlaps 1901 and 1903. Apparatus and methods described herein may configure an end effector to deposit a medium on a surface by following the non-linear pathway and overlaps associated with mark 1900.

Figure 20:
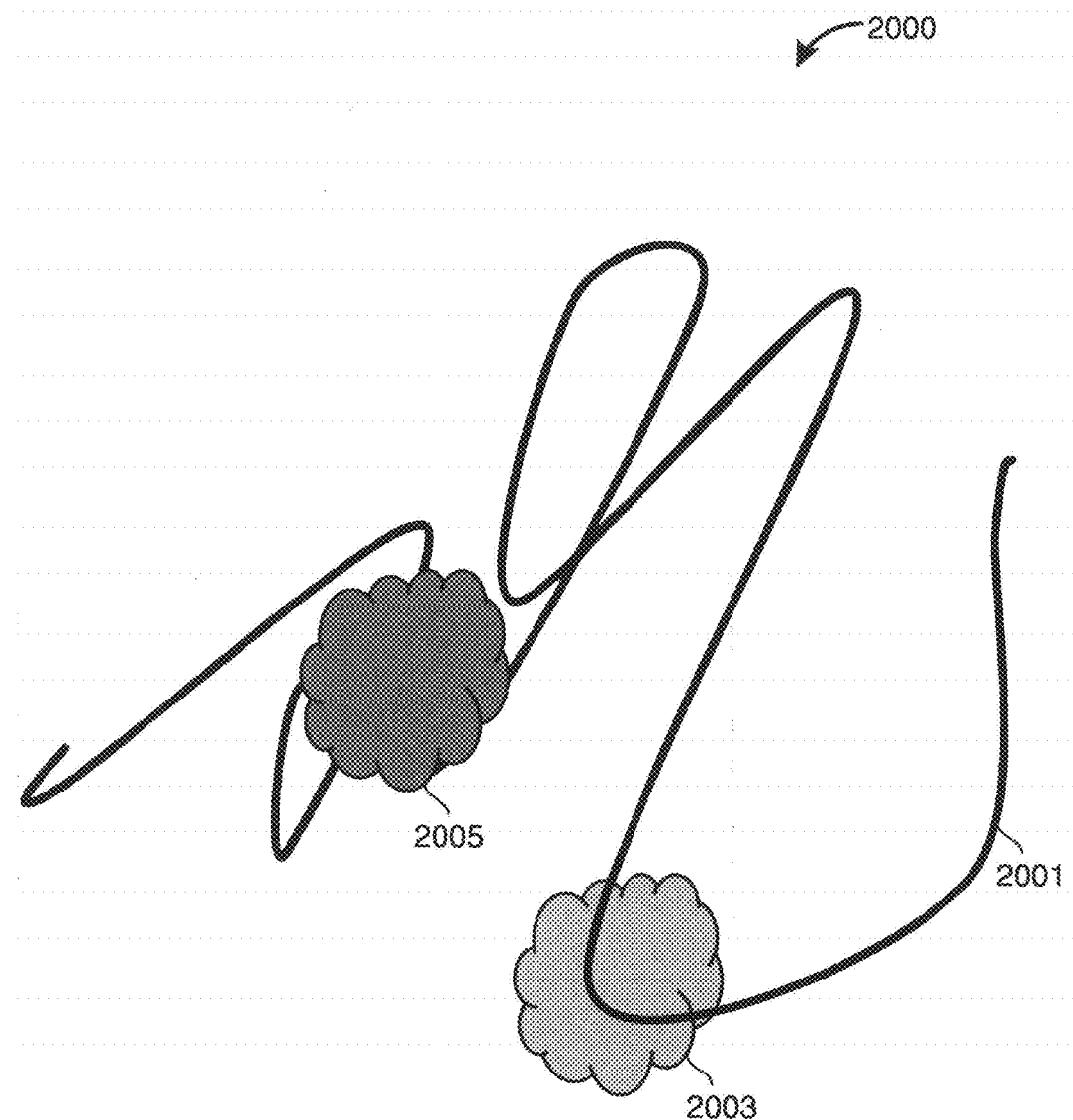
FIG. 20 shows an illustrative painting scenario in accordance with principles of the disclosure.

FIG. 20 shows illustrative mark 2000. Mark 2000 includes marks 2001, 2005 and 2003. Mark 2001 may be generated based on altering properties associated with mark 1900 (shown in FIG. 19). For example, mark 2001 may be generated by rotating the non-linear pathway of mark 1900.

Marks 2005 and 2003 may be added to mark 2001 after mark 2001 is output by an end effector. In a first example, a creator may use traditional painting techniques to add marks 2003 and 2005. A paint machine may include sensors that capture input of the creator and system-generate electronic input data based on the captured input.

In a second example, a creator may generate electronic input data associated with mark 2000 that defines a sequential layering of marks 2001, 2003 and 2005. The electronic input data may include properties that require mark 2001 to be produced on a surface before outputting marks 2003 and 2005. A sequential layering of marks 2001, 2003 and 2005 may preserve a visual effect of traditional mark layering techniques. A painting machine, as described herein, may configure an end effector to produce mark 2000 by sequentially layering medium on a surface, as defined in the electronic input data.

Figure 21:
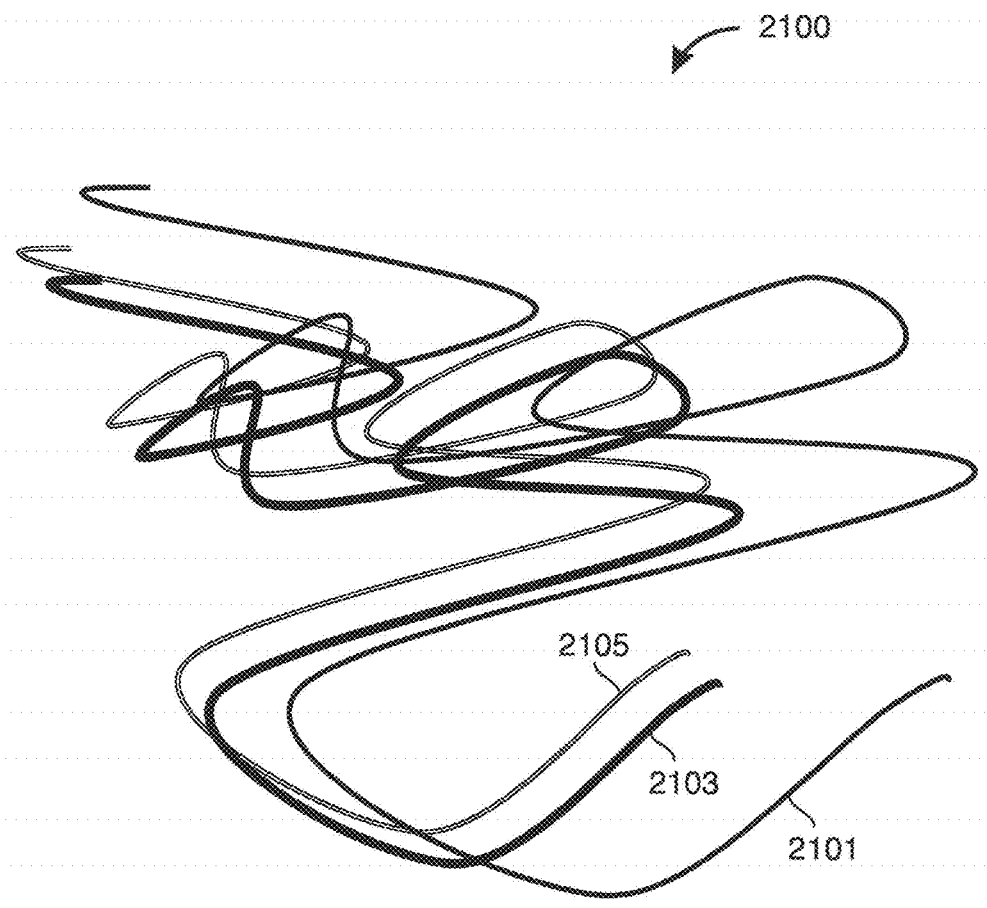
FIG. 21 shows an illustrative painting scenario in accordance with principles of the disclosure.

FIG. 21 shows illustrative mark 2100. Mark 2100 includes marks 2101, 2103 and 2105. Mark 2100 may be generated based on altering properties associated with mark 1900 (shown in FIG. 19). For example, mark 2100 may be generated by duplicating mark 1900 at different locations on a surface.

Electronic input data may define a sequential layering order of marks 2101, 2103 and 2105 to produce composite mark 2100. For example, the sequentially layering order may require mark 2103 be produced first, then mark 2105 and then mark 2101. Each of marks 2101, 2103 and 2105 may be associated with unique properties. For example, marks 2101, 2103 and 2105 may have different widths. Marks 2101, 2103 and 2105 may be associated with different colors or paints of differing viscosities.

To produce a desired visual effect, marks 2101, 2103 and 2105 must be produced by following the sequential layering order. Altering the order may produce a composite mark that does not have the desired visual effect. A painting machine, as described herein, may configure an end effector to produce mark 2100 (and its desired visual effect) by following the sequentially layering order, as defined in the electronic input data for mark 2100.

Figure 22:
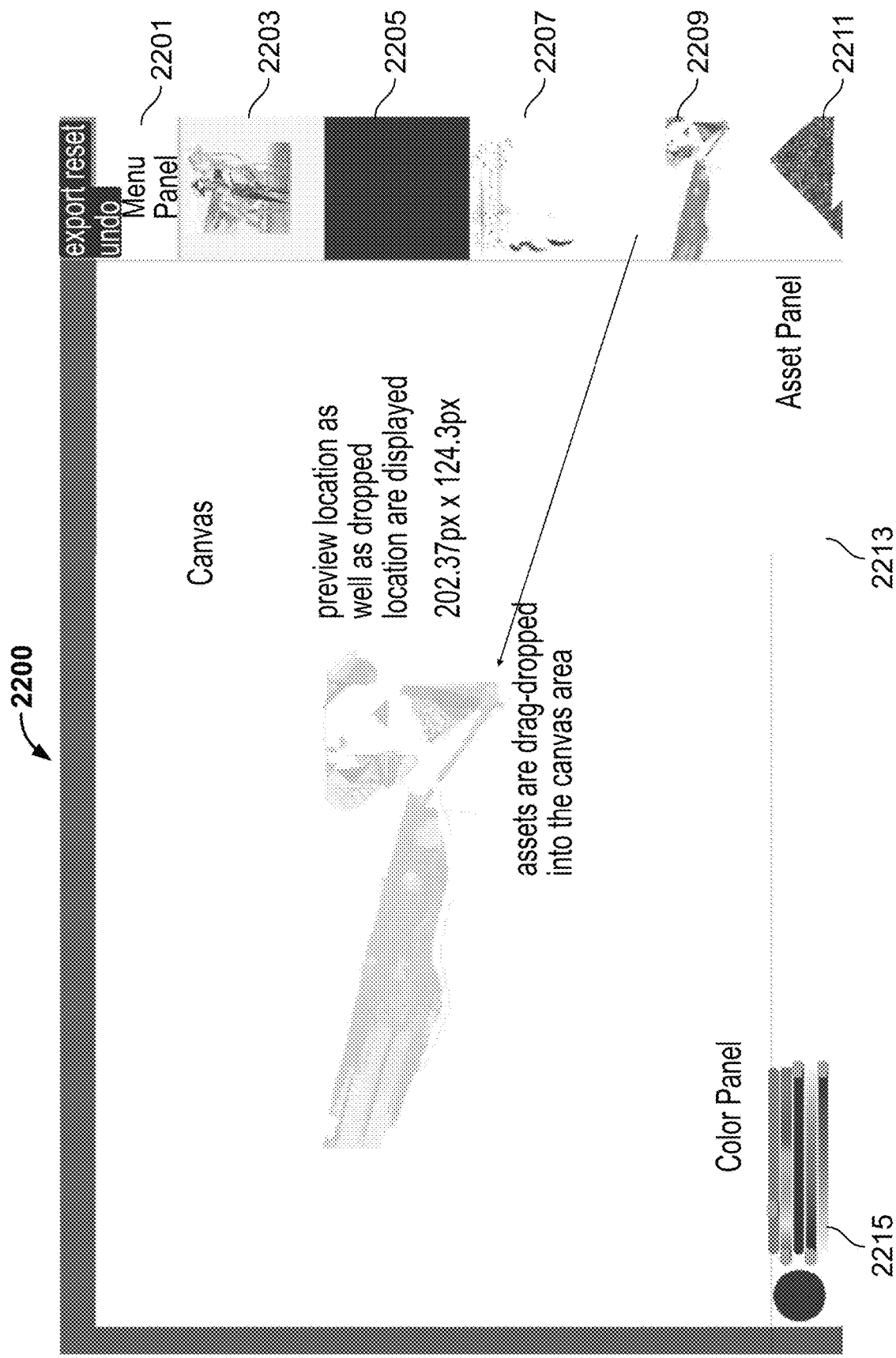
FIG. 22 shows illustrative apparatus in accordance with principles of the disclosure.

FIG. 22 shows illustrative functionality 2200 of a creator interface for a painting machine. The creator interface may include one or more features of GUI 200 shown in FIG. 2. A painting machine, as described herein, may include custom software that receives the electronic input data and controls an end effector to produce output that includes irregularities and chaotic elements defined in the electronic input data.

The painting machine may include a creator interface that calibrates input tools and associated end effector control to generate an output that more accurately depicts a creator's intent and design. Such a creator interface may receive creator input with awareness that an output produced by the end effector includes irregular and chaotic markings.

Functionality 2200 includes menu panel 2201. Menu panel 2201 shows image 2203. The creator interface may segment image 2203 into layers 2205, 2207, 2209 and 2211. A creator may drag one or more of layers 2205, 2207, 2209 and 2211 onto virtual canvas 2213.

The creator may drag and drop one or more of layers 2205, 2207, 2209 and 2211 onto virtual canvas 2213. The creator may assign a sequential layering order for outputting one or more of layers 2205, 2207, 2209 and 2211. The creator may alter one or more of 2205, 2207, 2209 and 2211. For example, using color palette 2215, the creator may change or add color of a layer. On virtual canvas 2213, a creator may create new layers.

The creator interface may digitally simulate visual effects of opaque or translucent variations of colors. The creator interface may digitally simulate visual effects of associated with volumetric components of the layers. The digital simulations may be saved along with associated creator input. The digital simulations may be saved as properties of electronic input data. The painting machine may configure an end effector to produce tangible output that embodies the visual effect digitally simulated by the creator interface.

Figure 23:
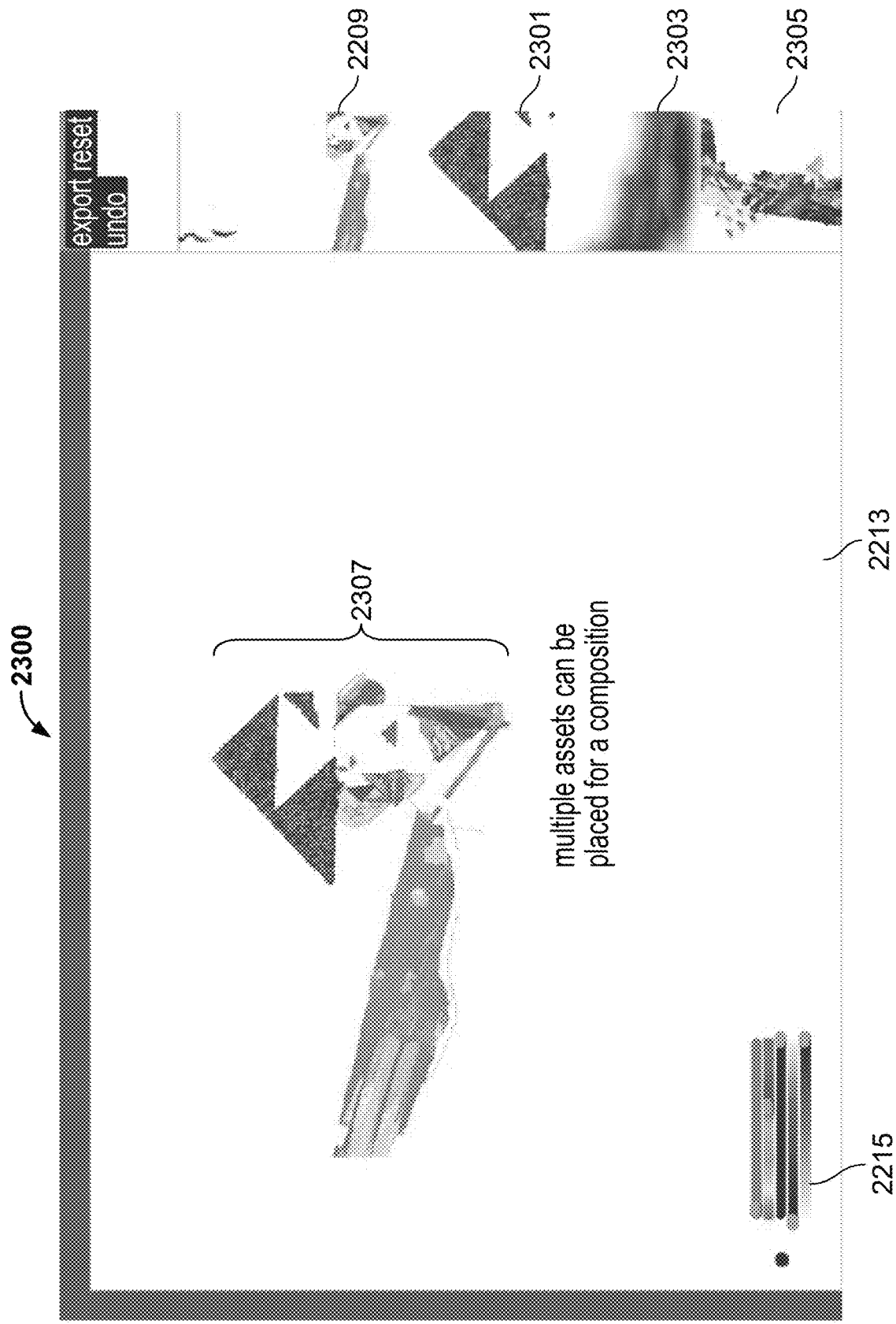
FIG. 23 shows illustrative apparatus in accordance with principles of the disclosure.

FIG. 23 shows illustrative functionality 2300 of the creator interface for the painting machine. Functionality 2300 shows that the creator has created composite mark 2307. Composite mark 2307 has been created by a creator by adding layers 2209 and 2303.

Figure 24:
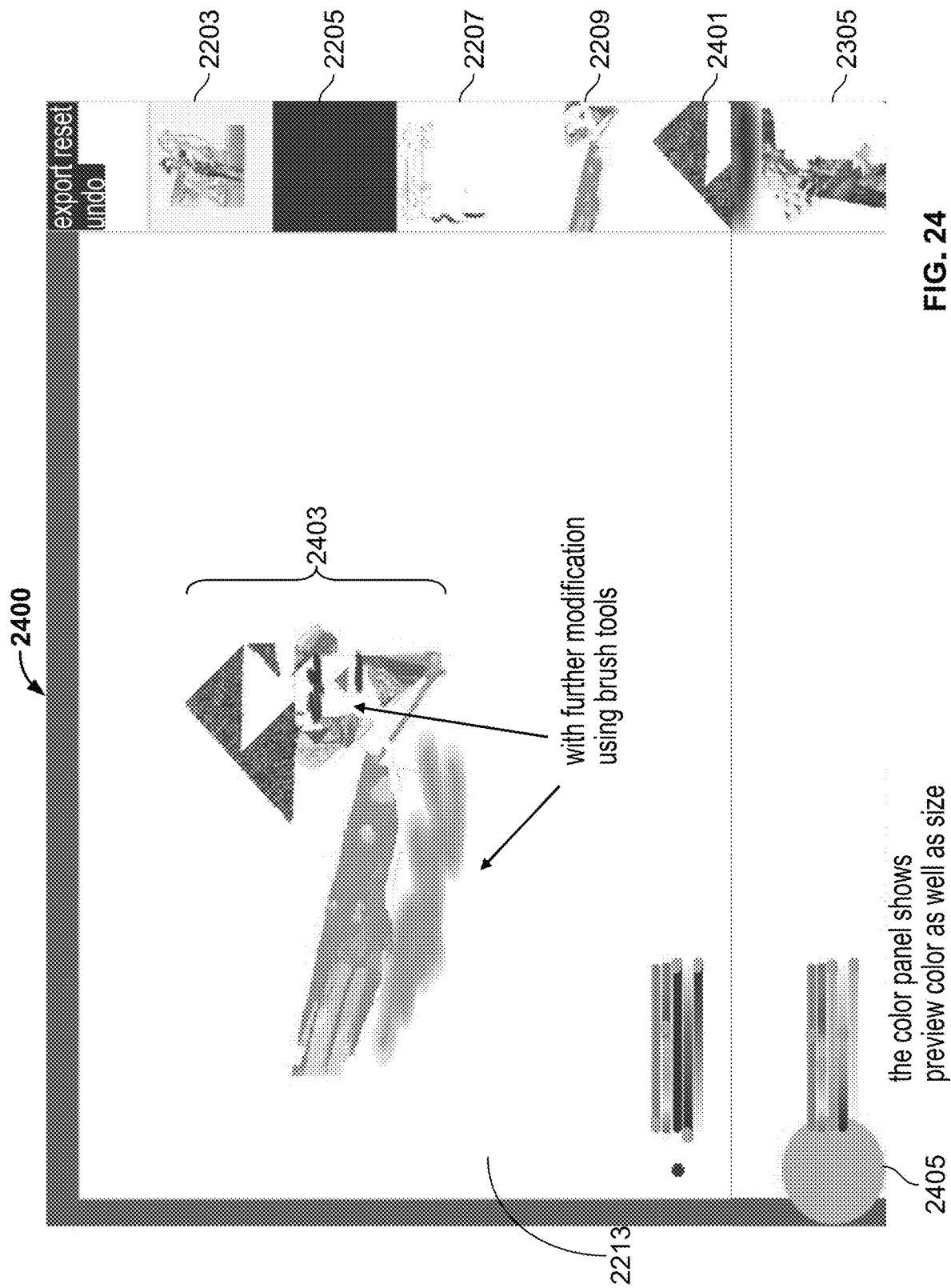
FIG. 24 shows illustrative apparatus in accordance with principles of the disclosure.

FIG. 24 shows illustrative functionality 2400 of the creator interface for the painting machine. Functionality 2400 shows that the creator has modified composite mark 2307 by adding free-hand brush strokes. Composite mark 2307 has been created by a creator by adding layers 2209 and 2303.

Functionality 2400 shows that color panel 2405 may show an active color and a size of an active mark that will be made if the color is applied to virtual canvas 2213.

Figure 25:
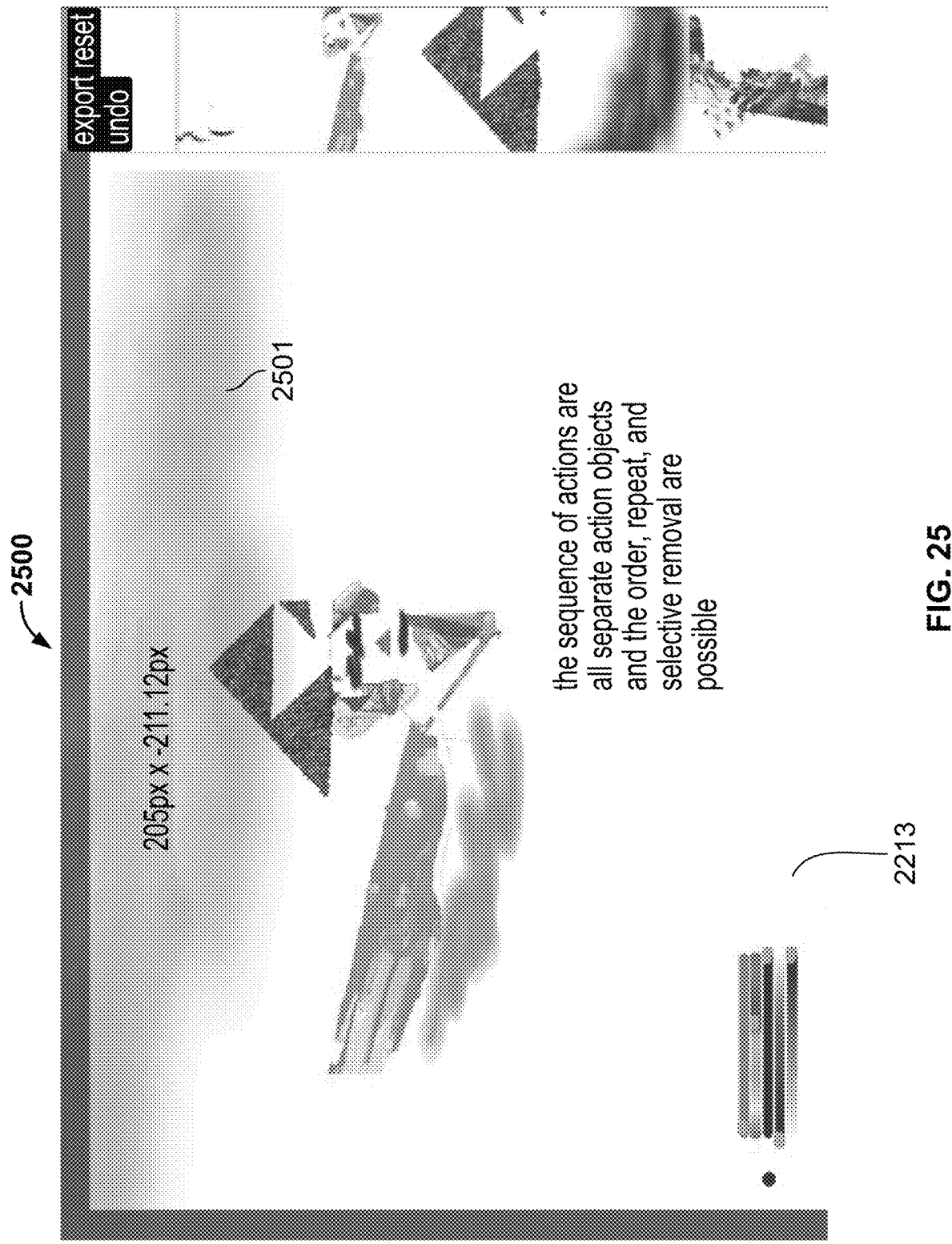
FIG. 25 shows illustrative apparatus in accordance with principles of the disclosure.

FIG. 25 shows illustrative functionality 2500 of the creator interface for the painting machine. Functionality 2500 shows that the creator has added mark 2501 to the virtual canvas. The creator interface may record each mark added (or deleted) by a creator as separate action objects. By sequencing actions performed by the creator, the creator interface may provide functionality for the order, repeat, and selective removal of marks. Each action taken by a creator while working on virtual canvas 2213 may be stored as a separate layer.

Figure 26:
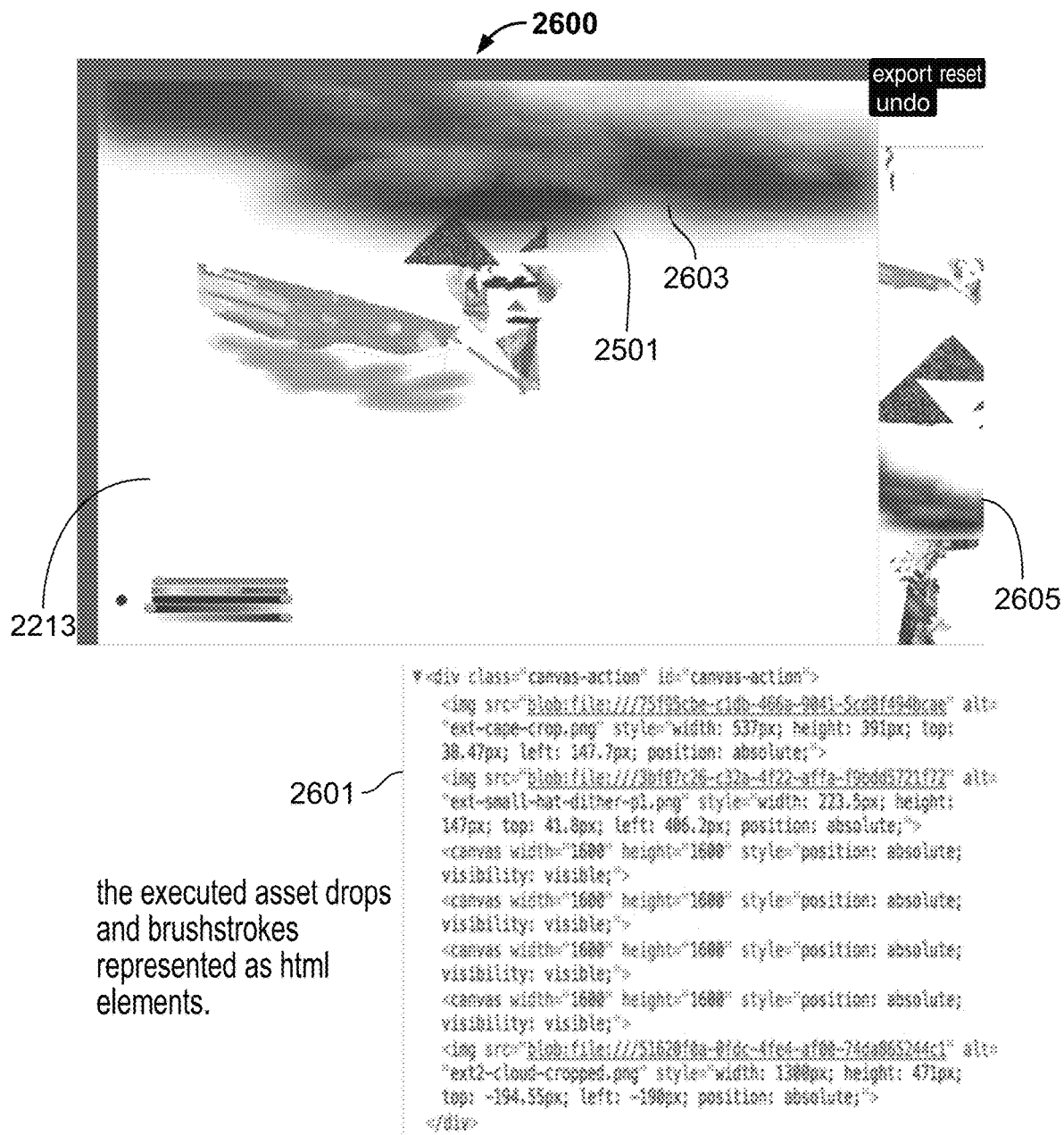
FIG. 26 shows illustrative apparatus in accordance with principles of the disclosure.

FIG. 26 shows illustrative functionality 2600 of the creator interface for the painting machine. Functionality 2600 shows that that a creator has added mark 2603 on top of mark 2501. Functionality 2600 shows that mark 2603 has been added as layer 2605.

Functionality 2600 also shows that actions executed by the creator on virtual canvas 2213 (e.g., layers added and brushstrokes) may be represented as HTML elements 2601. Paint and motion plans may be generated based on HTML elements 2601.

Figure 27:
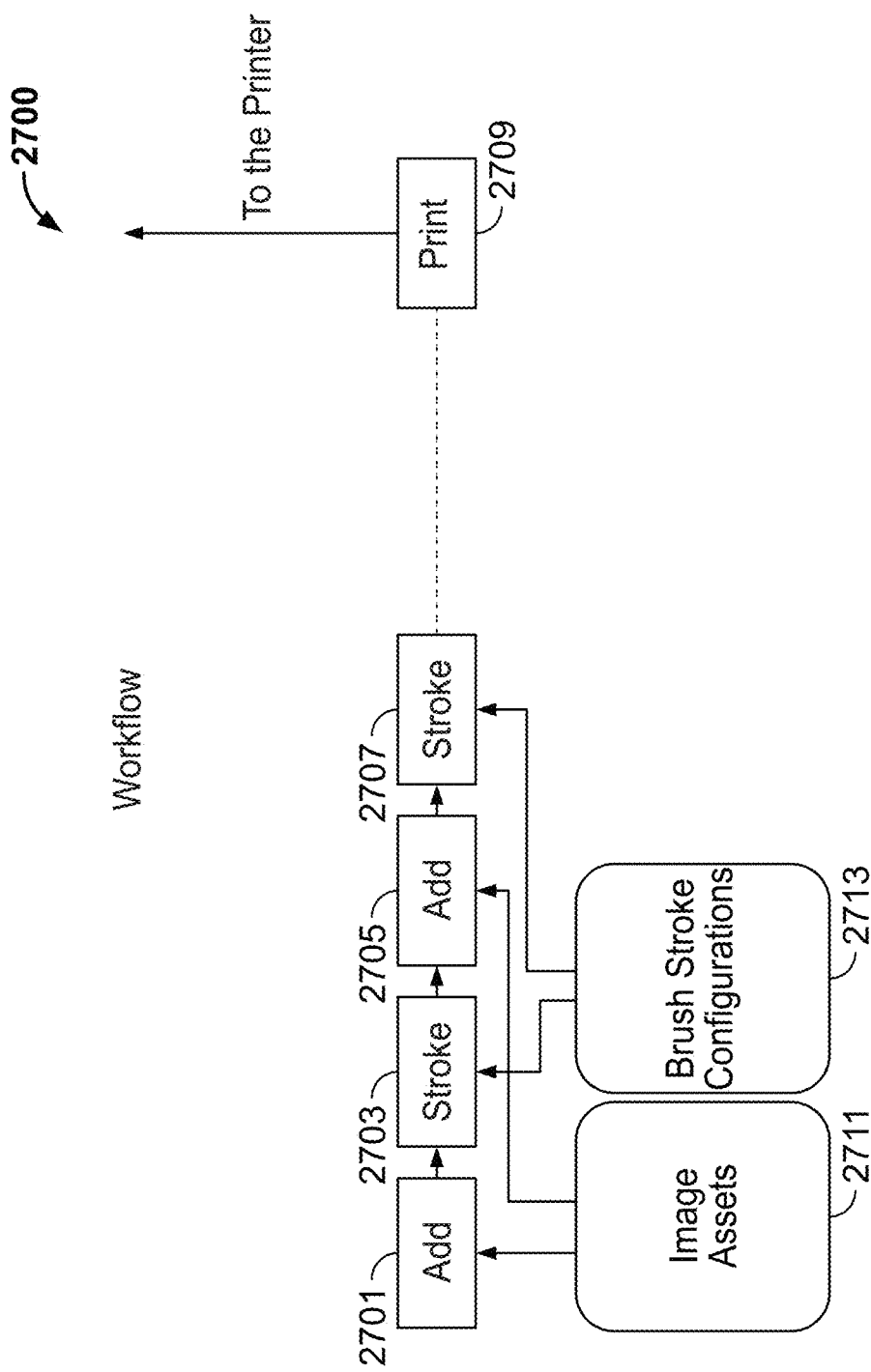
FIG. 27 shows an illustrative process in accordance with principles of the disclosure.

FIG. 27 shows illustrative workflow 2700. Workflow 2700 shows illustrative steps that may be taken by a creator. At step 2701, the creator adds an image to workflow 2700. Adding the image may add image assets 2711 associated with the image. Such assets may include properties stored in electronic input data.

At step 2703, the creator adds strokes (using an artistic tool) to the image. The strokes may be associated with stroke configurations 2713. Illustrative stroke configurations may include a brush type, bristle density, color applied and orientation of the tool as the strokes are applied. Stroke configurations 2713 may include properties stored in electronic input data.

At step 2705, the creator may add another image. At step 2707, the creator adds additional strokes (using an artistic tool) to the images and prior strokes. Steps 2701, 2703, 2705 and 2707 may be stored as electronic input data.

At step 2709 the creator may trigger production of an output based on one or more steps in workflow 2700. The output may be produced by an end effector of the painting machine based on motion control corresponding to the sequential steps of workflow 2700. The output may be produced by an end effector using a 2.5D painting process that maintains a visual effect of layering defined by the sequential steps of workflow 2700.

Figure 28:
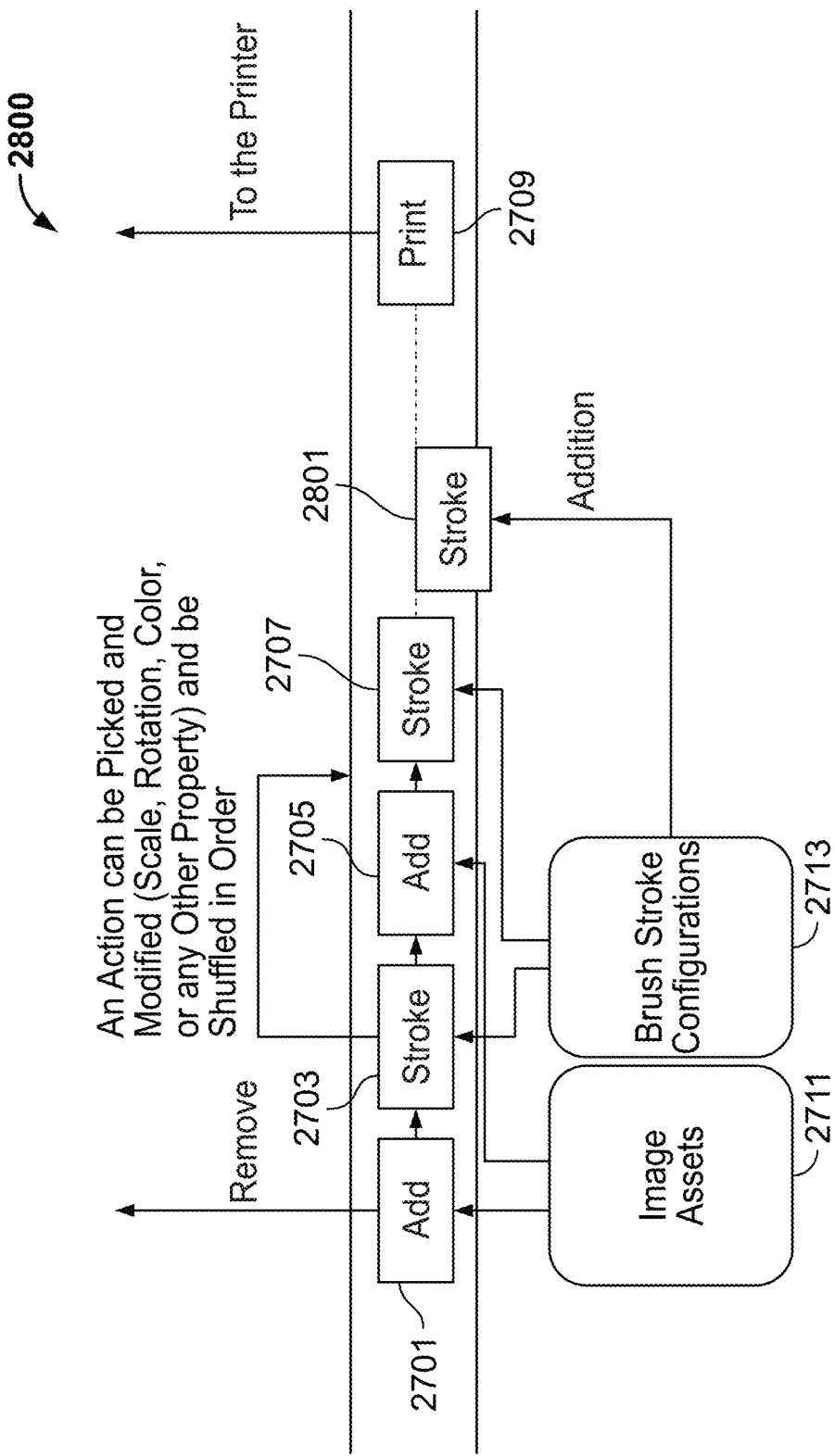
FIG. 28 shows an illustrative process in accordance with principles of the disclosure.

FIG. 28 modification 2800 to illustrative workflow 2700. Modifications 2800 show that a creator has removed the image of step 2701. Removing the image of step 2701 may also remove image assets associated with that image.

Modifications 2800 shows that the creator has added additional strokes at step 2801. Modifications 2800 show that the creator may alter the strokes of step 2703. A creator may alter any suitable property of steps in a workflow created using the creator interface.

Modifications 2800 may form a new electronic input data. The new electronic input data may be produced (in a desired sequential order) by an end effector of the painting machine.

Figure 29:
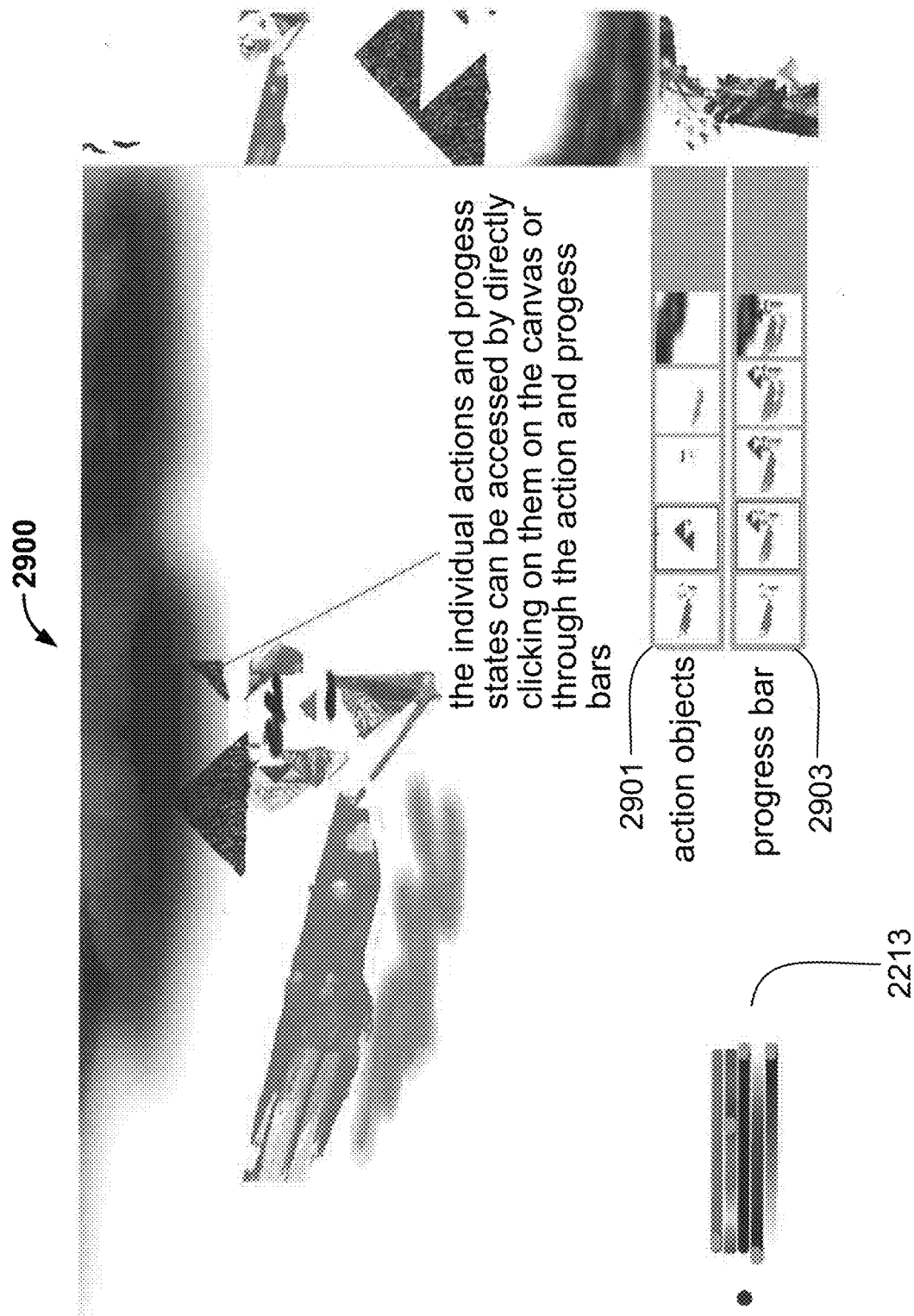
FIG. 29 shows illustrative apparatus in accordance with principles of the disclosure.

FIG. 29 shows illustrative functionality 2900 of the creator interface for the painting machine. Functionality 2900 shows that the individual actions and progress states may be accessed by directly clicking on them on the virtual canvas 2213 or through the action bar 2901 and progress bar 2903.

Action bar 2901 may provide a visual depiction of individual marks added to a work in progress. Progress bar 2903 may provide a visual depiction of a cumulative effect of adding marks to the work in progress.

The computer code included the appendix and custom software referenced herein may be executed by a computer system. The computer system may include a processor circuit. The processor circuit may include a processor for controlling overall operation of the computer system and its associated components. The computer system may include RAM, ROM, an input/output ("I/O") module and a non-transitory or non-volatile memory.

The I/O module may include a microphone, button and/or touch screen which may accept user provided input. The I/O module may include one or more of a speaker for providing audio output and a video display for providing textual, audiovisual and/or graphical output. The video display may include one or more OLEDs.

Software may be stored within the non-transitory memory and/or other storage medium. The software may provide instructions to the processor for enabling the computer system to perform various functions. For example, the non-transitory memory may store software used by the computer system, such as an operating system, application programs, and an associated database. Alternatively, some or all of computer executable instructions of the computer system may be embodied in hardware or firmware components of the computer system.

Application programs, which may be used by the computer system, may include computer executable instructions for invoking user functionality related to communication, such as email, short message service ("SMS"), and voice input and speech recognition applications. Application programs may utilize one or more algorithms that request alerts, process received executable instructions, perform power management routines or other suitable tasks.

The computer system and associated software may operate in a networked environment. The computer system and associated software may support establishing network connections to one or more remote computer systems. Such remote computers may be personal computers or servers. The network connections may include a local area network ("LAN") and a wide area network ("WAN"), and may also include other networks. When used in a LAN networking environment, the computer system may be connected to the LAN through a network interface or adapter. The communication circuit may include the network interface or adapter.

When used in a WAN networking environment, the computer system may include a modem or other means for establishing communications over a WAN, such as the Internet. The communication circuit may include the modem.

It will be appreciated that the network connections shown are illustrative and other means of establishing a communications link between devices may be used. The existence of any of various well-known protocols such as TCP/IP, Ethernet, FTP, HTTP and the like is presumed, and the computer system can be operated in a client-server configuration to permit a user to retrieve web pages from a web-based server. Web browsers can be used to display and manipulate data on web pages.

The computer system may include various other components, such as a battery, speaker, and antennas (not shown). For example, computer system may include portable devices such as a laptop, tablet, smartphone or any other suitable device for receiving, storing, processing, transmitting and/or displaying relevant information.

The computer system may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The computer system may utilize computer-executable instructions, such as program modules, being executed by a computer. Generally, program modules include routines, programs, objects, components, data structures, etc. that perform particular tasks or implement particular abstract data types. The computer system may be operational with distributed computing environments where tasks are performed by remote processing devices that are linked through a communications network. In a distributed computing environment, program modules may be located in both local and remote computer storage media including memory storage devices.

Thus, apparatus and methods for a SELF-CONTAINED MEDIUM CIRCULATION SYSTEM have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. A system for depositing a medium along an arbitrary vector path, the system comprising:
    a rotatable end effector configured to apply the medium to a surface;
    a cartridge that holds the medium applied by the end effector,
        wherein the cartridge comprises a plurality of internal walls that reduces an impact of dynamic wave pressure due to movement of the cartridge via a plurality of holes disposed along a lower half of each internal wall;
    a conduit that transfers the medium from the cartridge to the end effector and from the end effector back into the cartridge;
    a pressure sensor that detects changes in pressure within the conduit;
    only one pump that:
        moves the medium through the conduit; and
        maintains a target meniscus pressure by, in response to the detected changes in the pressure, increasing or decreasing the pressure in the conduit; and
    software that controls movement of the end effector and the cartridge and deposit of the medium, along the arbitrary vector path and relative to the surface;
    wherein the pressure within the conduit is determined based on a first pressure at an inlet port of the end effector and a second pressure at an outlet port of the end effector; and
    wherein the only one pump maintains the target meniscus pressure when the end effector and the cartridge are rotated 360° about a rotational axis.

2. The system of claim 1, wherein the end effector is configured to be rotated about the rotational axis via a planetary gear system.

3. The system of claim 1 further comprising a microcontroller that dynamically maintains the target meniscus pressure despite changes in an amount of medium contained in the cartridge.

4. The system of claim 1 wherein the software regulates a quantity of the medium applied by the end effector to the surface.

5. The system of claim 1, wherein the end effector comprises one or more of:
    an inkjet head;
    an airbrush;
    a paintbrush; and
    a paint roller.

6. The system of claim 1 further comprising a microcontroller that dynamically maintains the target meniscus pressure despite changes in a flow of the medium through the end effector.

7. The system of claim 1 wherein the end effector duplicates a target mark on the surface, regardless of an orientation of the end effector.

8. The system of claim 7 wherein the target mark includes irregular and chaotic elements.

9. The system of claim 1 wherein the software regulates a quantity of the medium deposited by the end effector on the surface.

10. The system of claim 1 wherein the only one pump comprises an Archimedes screw.

* * * * *